(12) United States Patent
Carle et al.

(10) Patent No.: US 12,741,747 B2
(45) Date of Patent: Sep. 22, 2026

(54) AIRCRAFT WITH AN UNDUCTED FAN PROPULSOR

(71) Applicant: General Electric Company, Evendale, OH (US)

(72) Inventors: Sara Elizabeth Carle, Columbus, OH (US); Daniel L. Tweedt, West Chester, OH (US); Syed Arif Khalid, West Chester, OH (US); Andrew Breeze-Stringfellow, Montgomery, OH (US); William Bowden, Cleves, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/345,493

(22) Filed: Sep. 30, 2025

(65) Prior Publication Data

US 2026/0021895 A1 Jan. 22, 2026

Related U.S. Application Data

(63) Continuation-in-part of application No. PCT/US2024/040754, filed on Aug. 2, 2024, which is (Continued)

(51) Int. Cl.

*B64D 27/18* (2006.01)
*B64C 11/48* (2006.01)
*B64D 27/40* (2024.01)

(52) U.S. Cl.

CPC .............. *B64D 27/18* (2013.01); *B64C 11/48* (2013.01); *B64D 27/402* (2024.01)

(58) Field of Classification Search

CPC ............................. B64D 27/18; B64D 27/402; B64D 2027/005; B64C 11/48; B64C 3/32

See application file for complete search history.

(56) References Cited

U.S. PATENT DOCUMENTS 4,446,696 A 5/1984 Sargisson
5,079,916 A 1/1992 Johnson
(Continued)

FOREIGN PATENT DOCUMENTS

FR 3129428 A1 5/2023
FR 3129436 A1 5/2023
(Continued)

OTHER PUBLICATIONS

Jackson, "Optimisation of aero and industrial gas turbine design for the environment," Feb. 1, 2009.
(Continued)

*Primary Examiner* — Joshua J Michener
*Assistant Examiner* — Cindi M Curry
(74) *Attorney, Agent, or Firm* — Fitch, Even, Tabin & Flannery, LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor. The unducted fan propulsors include an engine correlation parameter that is greater than 0.17 and less than 0.83, wherein the engine correlation parameter equals D/N/GR, D is the maximum outer diameter of the rotating blades, N is a stage count of a low-pressure turbine of the unducted fan propulsor, and GR is a gear ratio of a gearbox of the unducted fan propulsor operably coupling the low pressure turbine and the rotating blades.

13 Claims, 27 Drawing Sheets

Related U.S. Application Data a continuation-in-part of application No. 18/652,052, filed on May 1, 2024, now Pat. No. 12,384,522, which is a continuation-in-part of application No. 18/230,609, filed on Aug. 4, 2023, now Pat. No. 12,365,471.

(56) References Cited

U.S. PATENT DOCUMENTS

| | | | | |
|---|---|---|---|---|
| 5,135,185 | A | 8/1992 | Adamson | |
| 5,136,185 | A | 8/1992 | Fleming | |
| 8,689,538 | B2 | 4/2014 | Sankrithi | |
| 8,714,475 | B2 | 5/2014 | Gall | |
| 8,943,796 | B2 | 2/2015 | McCaffrey | |
| 9,242,721 | B2 | 1/2016 | Neuteboom | |
| 9,540,094 | B2 | 1/2017 | Negulescu | |
| 9,567,090 | B2 | 2/2017 | Gallet | |
| 9,759,160 | B2 | 9/2017 | Sankrithi | |
| 9,828,944 | B2 | 11/2017 | Houston | |
| 10,040,559 | B2 | 8/2018 | Hoisington | |
| 10,184,340 | B2 | 1/2019 | Baltas | |
| 10,287,914 | B2 | 5/2019 | Schwarz | |
| 10,399,664 | B2 | 9/2019 | Bowden | |
| 10,442,541 | B2 | 10/2019 | Miller | |
| 10,458,426 | B2 * | 10/2019 | Wilkin, II | F04D 29/325 |
| 10,669,881 | B2 | 6/2020 | Breeze-Stringfellow | |
| 10,760,530 | B2 | 9/2020 | Stretton | |
| 10,794,292 | B2 | 10/2020 | Kupratis | |
| 10,830,153 | B2 | 11/2020 | Schwarz | |
| 10,907,495 | B2 | 2/2021 | Breeze-Stringfellow | |
| 11,136,109 | B2 | 10/2021 | Wood | |
| 11,572,827 | B1 * | 2/2023 | Khalid | F02C 3/067 |
| 12,000,344 | B2 | 6/2024 | Levisse | |
| 12,280,883 | B2 * | 4/2025 | Bowden | B64D 27/402 |
| 12,305,579 | B2 | 5/2025 | Taillant | |
| 12,313,081 | B2 | 5/2025 | Frantz | |
| 12,320,305 | B2 | 6/2025 | Martinez Luque | |
| 12,365,446 | B2 | 7/2025 | Carle | |
| 12,365,471 | B2 | 7/2025 | Carle | |
| 12,378,933 | B2 | 8/2025 | Fefermann | |
| 12,384,522 | B2 | 8/2025 | Carle | |
| 12,448,139 | B2 * | 10/2025 | Bowden | B64D 29/02 |
| 2001/0023582 | A1 | 9/2001 | Nagel | |
| 2008/0142641 | A1 * | 6/2008 | Moore | B64D 27/14 244/119 |
| 2009/0277181 | A1 | 11/2009 | Druon | |
| 2012/0119023 | A1 | 5/2012 | Moore | |
| 2015/0284070 | A1 | 10/2015 | Breeze-Stringfellow | |
| 2015/0291276 | A1 | 10/2015 | Zatorski | |
| 2015/0360773 | A1 | 12/2015 | Allen | |
| 2018/0017019 | A1 * | 1/2018 | Dipietro, Jr. | F01D 9/041 |
| 2018/0080411 | A1 | 3/2018 | Miller | |
| 2018/0118364 | A1 | 5/2018 | Golshany | |
| 2018/0209379 | A1 | 7/2018 | Lord | |
| 2018/0252166 | A1 | 9/2018 | Pointon | |
| 2018/0346108 | A1 | 12/2018 | Sheng | |
| 2018/0362170 | A1 * | 12/2018 | Stuart | B64D 27/404 |
| 2019/0025724 | A1 | 1/2019 | Srinivasan | |
| 2019/0136710 | A1 | 5/2019 | Breeze-Stringfellow | |
| 2019/0185170 | A1 | 6/2019 | Schelfaut | |
| 2020/0116081 | A1 | 4/2020 | Levisse | |
| 2020/0141266 | A1 | 5/2020 | Cooper | |
| 2020/0141333 | A1 | 5/2020 | Renold-Smith | |
| 2020/0149421 | A1 | 5/2020 | Lad | |
| 2020/0200125 | A1 | 6/2020 | Moore | |
| 2020/0224588 | A1 | 7/2020 | Somanath | |
| 2020/0263635 | A1 | 8/2020 | Bemment | |
| 2020/0347749 | A1 | 11/2020 | Kannangara | |
| 2020/0378312 | A1 | 12/2020 | Schwarz | |
| 2020/0400068 | A1 | 12/2020 | Bemment | |
| 2021/0108597 | A1 | 4/2021 | Marion | |
| 2021/0222632 | A1 | 7/2021 | Bemment | |
| 2021/0254454 | A1 | 8/2021 | Pan | |
| 2021/0254555 | A1 | 8/2021 | Spruce | |
| 2022/0056811 | A1 | 2/2022 | Molesini | |
| 2022/0259985 | A1 | 8/2022 | Depuy | |
| 2023/0021836 | A1 | 1/2023 | Riddle | |
| 2024/0410319 | A1 | 12/2024 | Becoulet | |
| 2025/0018895 | A1 | 1/2025 | Howell | |
| 2025/0042537 | A1 | 2/2025 | Carle | |
| 2025/0042538 | A1 | 2/2025 | Carle | |
| 2025/0042558 | A1 | 2/2025 | Carle | |
| 2025/0052165 | A1 | 2/2025 | Becoulet | |
| 2025/0075636 | A1 | 3/2025 | Frantz | |
| 2025/0101930 | A1 | 3/2025 | Auriol | |
| 2025/0116203 | A1 | 4/2025 | Olivier | |
| 2025/0129724 | A1 | 4/2025 | Millier | |
| 2025/0137407 | A1 | 5/2025 | Becoulet | |
| 2025/0188951 | A1 | 6/2025 | Lebeault | |
| 2025/0197014 | A1 | 6/2025 | Gea Aguilera | |
| 2026/0008550 | A1 | 1/2026 | Carle | |
| 2026/0015090 | A1 | 1/2026 | Carle | |

FOREIGN PATENT DOCUMENTS

| | | | |
|---|---|---|---|
| FR | 3129690 | A1 | 6/2023 |
| FR | 3129970 | A1 | 6/2023 |
| FR | 3129972 | A1 | 6/2023 |
| FR | 3130313 | A1 | 6/2023 |
| FR | 3130747 | A1 | 6/2023 |
| FR | 3130874 | A1 | 6/2023 |
| FR | 3130875 | A1 | 6/2023 |
| FR | 3130895 | A1 | 6/2023 |
| FR | 3130897 | A1 | 6/2023 |
| FR | 3132729 | A1 | 8/2023 |
| GB | 2537747 | | 7/2020 |
| WO | 2019232535 | | 12/2019 |
| WO | 2025034565 | | 2/2025 |

OTHER PUBLICATIONS

Larsson et al., "Conceptual design and mission analysis for a geared turbofan and an open rotor configuration," In Turbo Expo: Power for Land, Sea, and Air 54617: 359-370, 2011, Jan. 1, 2011.

"Could an open fan engine cut carbon emissions for more sustainable aviation?"; https://www.airbus.com/en/newsroom/stories/2022-07-could-an-open-fan-engine-cut-carbon-emissions-for-more-sustainable; Jul. 19, 2022; 3 pgs.

Antonov An-70—Price, Specs, Photo Gallery, History—Aero Corner; https://aerocorner.com/aircraft/antonov-an-70/#lg=1&slide=5; Site was known as early as Dec. 2021; 5 pgs.

Attariwala, Joetey; "Coming to a Theatre near You"; published Feb./Mar. 2016 Issue (Oct. 26, 2017); https://www.armadainternational.com/2017/10/airbus-a400m-strategic-turboprop-freighter-programme/; 9 pgs.

* cited by examiner

| Engine | Fan Dia. (ft) | LPT Stages | Gear Ratio | Engine Correlation Parameter (ft) |
|---|---|---|---|---|
| 1 | 10 | 8 | 7.5 | 0.17 |
| 2 | 10 | 4 | 11 | 0.25 |
| 3 | 10 | 3 | 12 | 0.31 |
| 4 | 10 | 6 | 5 | 0.37 |
| 5 | 10 | 5 | 5 | 0.44 |
| 6 | 10 | 3 | 7 | 0.52 |
| 7 | 10 | 3 | 6 | 0.61 |
| 8 | 10 | 4 | 4 | 0.69 |
| 9 | 10 | 3 | 5 | 0.73 |
| 10 | 10 | 3 | 4 | 0.83 |

FIG. 19

| Engine | Fan Dia. (ft) | LPT Stages | Gear Ratio | Engine Correlation Parameter (ft) |
|---|---|---|---|---|
| 11 | 11 | 8 | 8 | 0.17 |
| 12 | 11 | 4 | 11 | 0.25 |
| 13 | 11 | 3 | 12 | 0.31 |
| 14 | 11 | 6 | 5 | 0.37 |
| 15 | 11 | 5 | 5 | 0.44 |
| 16 | 11 | 3 | 7 | 0.52 |
| 17 | 11 | 3 | 6 | 0.61 |
| 18 | 11 | 4 | 4 | 0.69 |
| 19 | 11 | 3 | 5 | 0.73 |
| 20 | 11 | 3 | 4.4 | 0.83 |

FIG. 20

| Engine | Fan Dia. (ft) | LPT Stages | Gear Ratio | Engine Correlation Parameter (ft) |
|---|---|---|---|---|
| 21 | 12 | 7 | 10 | 0.17 |
| 22 | 12 | 5 | 10 | 0.24 |
| 23 | 12 | 4 | 11 | 0.27 |
| 24 | 12 | 5 | 8 | 0.30 |
| 25 | 12 | 6 | 5 | 0.40 |
| 26 | 12 | 6 | 4 | 0.50 |
| 27 | 12 | 4 | 5 | 0.60 |
| 28 | 12 | 4 | 4 | 0.75 |
| 29 | 12 | 3 | 5 | 0.80 |
| 30 | 12 | 3 | 4.8 | 0.83 |

FIG. 21

| Engine | Fan Dia. (ft) | LPT Stages | Gear Ratio | Engine Correlation Parameter (ft) |
|---|---|---|---|---|
| 31 | 13 | 7 | 11 | 0.17 |
| 32 | 13 | 6 | 10 | 0.22 |
| 33 | 13 | 6 | 7 | 0.31 |
| 34 | 13 | 6 | 6 | 0.36 |
| 35 | 13 | 8 | 4.5 | 0.36 |
| 36 | 13 | 7 | 4 | 0.46 |
| 37 | 13 | 4 | 5 | 0.65 |
| 38 | 13 | 5 | 4 | 0.65 |
| 39 | 13 | 3 | 6 | 0.72 |
| 40 | 13 | 3 | 5.25 | 0.83 |

FIG. 22

| Engine | Fan Dia. (ft) | LPT Stages | Gear Ratio | Engine Correlation Parameter (ft) |
|---|---|---|---|---|
| 41 | 14 | 7 | 12 | 0.17 |
| 42 | 14 | 6 | 8 | 0.29 |
| 43 | 14 | 7 | 6 | 0.33 |
| 44 | 14 | 5 | 8 | 0.35 |
| 45 | 14 | 5 | 7 | 0.40 |
| 46 | 14 | 6 | 5 | 0.47 |
| 47 | 14 | 5 | 5 | 0.56 |
| 48 | 14 | 4 | 5 | 0.70 |
| 49 | 14 | 3 | 6 | 0.78 |
| 50 | 14 | 3 | 5.6 | 0.83 |

FIG. 23

| Engine | Fan Dia. (ft) | LPT Stages | Gear Ratio | Engine Correlation Parameter (ft) |
|---|---|---|---|---|
| 51 | 15 | 8 | 11 | 0.17 |
| 52 | 15 | 6 | 9 | 0.28 |
| 53 | 15 | 3 | 12 | 0.42 |
| 54 | 15 | 4 | 8 | 0.47 |
| 55 | 15 | 3 | 10 | 0.50 |
| 56 | 15 | 6 | 5 | 0.50 |
| 57 | 15 | 7 | 4 | 0.54 |
| 58 | 15 | 5 | 5 | 0.60 |
| 59 | 15 | 4 | 5 | 0.75 |
| 60 | 15 | 3 | 6 | 0.83 |

FIG. 24

| Engine | Fan Dia. (ft) | LPT Stages | Gear Ratio | Engine Correlation Parameter (ft) |
|---|---|---|---|---|
| 61 | 16 | 8 | 12 | 0.17 |
| 62 | 16 | 7 | 12 | 0.19 |
| 63 | 16 | 8 | 10 | 0.20 |
| 64 | 16 | 5 | 12 | 0.27 |
| 65 | 16 | 6 | 9 | 0.30 |
| 66 | 16 | 7 | 7 | 0.33 |
| 67 | 16 | 6 | 7 | 0.38 |
| 68 | 16 | 6 | 5 | 0.53 |
| 69 | 16 | 6 | 4 | 0.67 |
| 70 | 16 | 3 | 6.4 | 0.83 |

FIG. 25

AIRCRAFT WITH AN UNDUCTED FAN PROPULSOR

CROSS-REFERENCE TO RELATED APPLICATIONS

This application is a continuation-in-part of International Application No. PCT/US2024/040754, filed Aug. 2, 2024, which claims priority to U.S. patent application Ser. No. 18/230,609, filed on Aug. 4, 2023, and Ser. No. 18/652,052, filed May 1, 2024, the latter of which is a continuation-in-part of the former, the disclosures of which are hereby incorporated by reference in their entireties.

FIELD

The present disclosure relates generally to an aircraft with a fan propulsor.

BACKGROUND

Winged aircraft have undermounted propulsors in the form of a turboprop engine. The addition of a propulsor to a wing can lead to installation penalties, including increased drag. As the size of the undermounted propulsor increases, installation penalties can also increase, such as increased weight.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which:

FIG. 19 is a chart depicting various parameters of several exemplary unducted fan propulsors comprising a 10 foot fan diameter.

FIG. 20 is a chart depicting various parameters of several exemplary unducted fan propulsors comprising an 11 foot fan diameter.

FIG. 21 is a chart depicting various parameters of several exemplary unducted fan propulsors comprising a 12 foot fan diameter.

FIG. 22 is a chart depicting various parameters of several exemplary unducted fan propulsors comprising a 13 foot fan diameter.

FIG. 23 is a chart depicting various parameters of several exemplary unducted fan propulsors comprising a 14 foot fan diameter.

FIG. 24 is a chart depicting various parameters of several exemplary unducted fan propulsors comprising a 15 foot fan diameter.

FIG. 25 is a chart depicting various parameters of several exemplary unducted fan propulsors comprising a 16 foot fan diameter.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word “or” when used herein shall be interpreted as having a disjunctive construction rather than a conjunctive construction unless otherwise specifically indicated.

The terms “coupled,” “fixed,” “attached to,” and the like refer to both direct coupling, fixing, or attaching, as well as indirect coupling, fixing, or attaching through one or more intermediate components or features, unless otherwise specified herein.

The singular forms “a”, “an”, and “the” include plural references unless the context clearly dictates otherwise.

The term “at least one of” in the context of, e.g., “at least one of A, B, and C” refers to only A, only B, only C, or any combination of A, B, and C.

The terms “forward” and “aft” refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

The term “leading edge” refers to components and/or surfaces which are oriented predominately upstream relative to the fluid flow of the system, and the term “trailing edge” refers to components and/or surfaces which are oriented predominately downstream relative to the fluid flow of the system.

“Airfoil section” and “effective quarter chord point (QC)” are defined as follows.

Figure 6A:
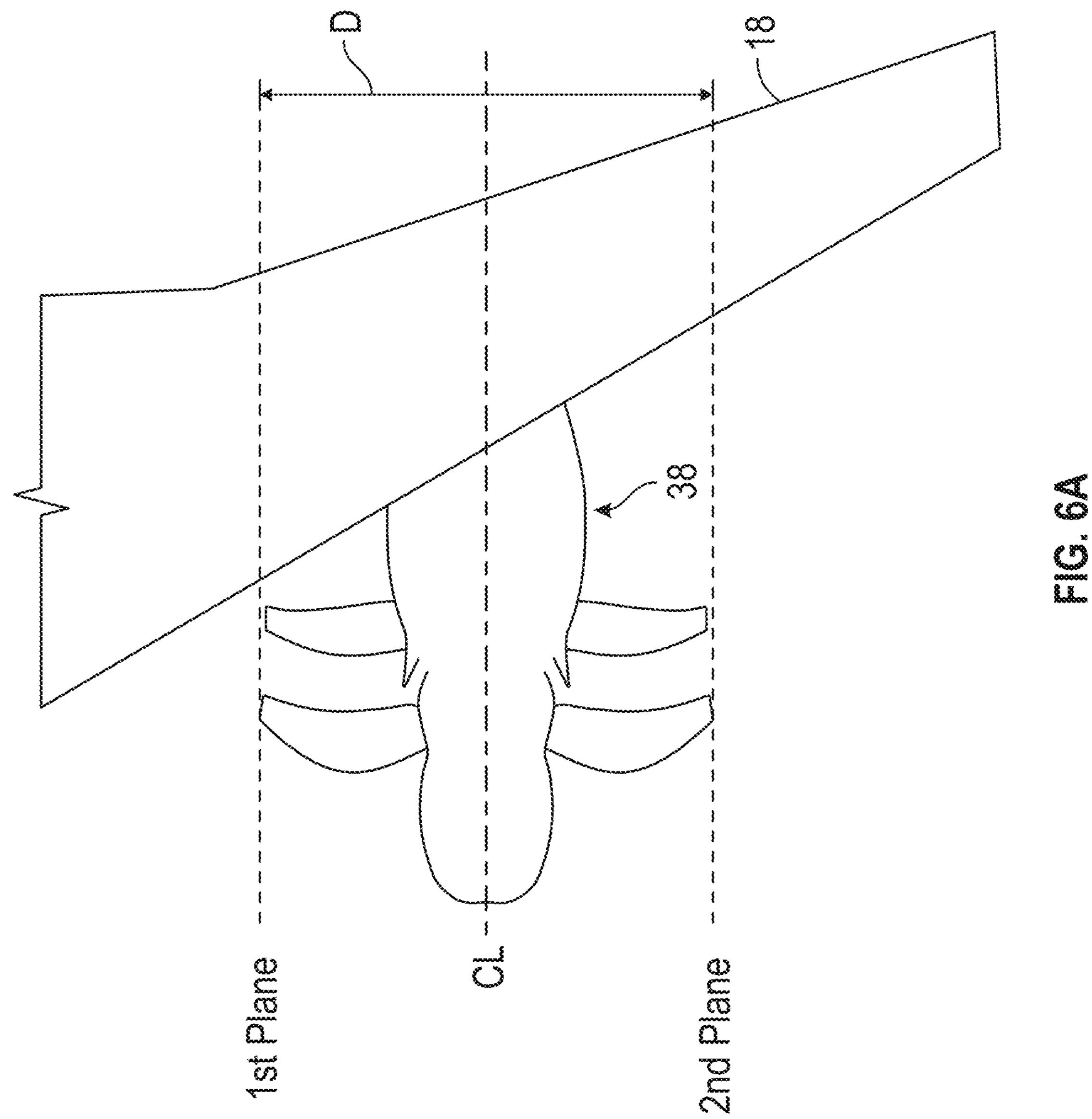
FIG. 6A comprises a top plan view of the propulsor of FIG. 4 and inboard and outboard locations of the wing relative to an unducted fan propulsor centerline, with the inboard and outboard locations in FIG. 6A used to determine a chord length (C) of the airfoil section in FIG. 4.
Figure 6B:
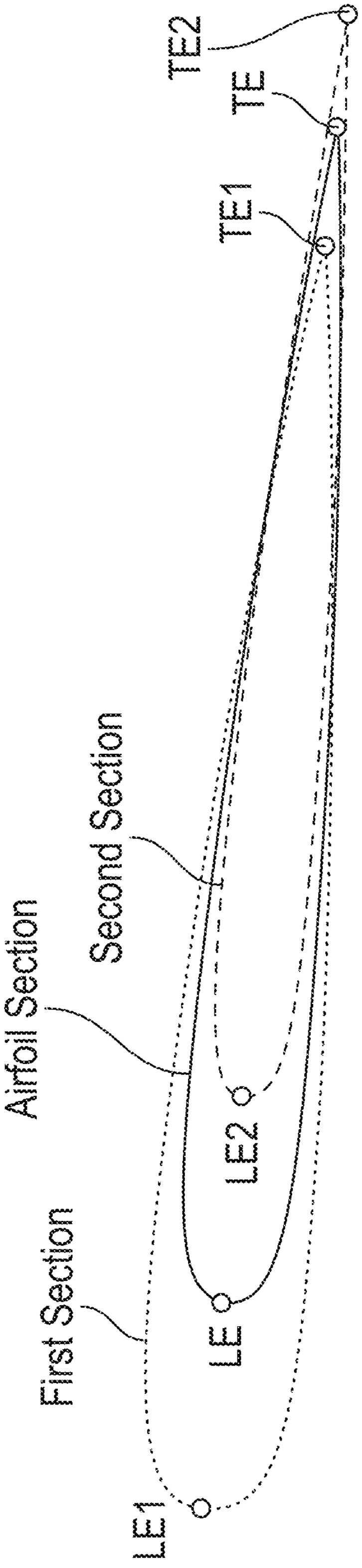
FIG. 6B comprises a schematic side elevation view of a first section and a second section of the aircraft wing, which sections are used to determine an effective quarter chord point (QC) of the airfoil section in FIG. 4.

“Airfoil section” is defined as the average of a first offset plane section and a second offset plane section of an airfoil (e.g., an airfoil associated with a horizontal stabilizer or wing of an aircraft), where the first offset plane section is the section of the airfoil taken at a first plane and the second offset plane section is the section of the airfoil taken at a second plane, the first and second planes each being offset in a direction perpendicular to, and equidistant from a central plane by a distance of ½ of a fan diameter (D) of rotating blades of a propulsor mounted to the portion of the aircraft body associated with the airfoil section (wing or horizontal stabilizer). The first plane is inboard of the central plane (towards the fuselage) and the second plane is outboard of the central plane. When the aircraft is on the ground, both the gravity vector and axis of rotation of the rotating blades lie in the central plane. The intersection of the first offset plane with the airfoil defines a first section having a first section leading edge (LE1) and a first section trailing edge (TE1), with the LE1 at the forward-most point of the first section and the TE1 at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIGS. 6 and 6B. An “Airfoil Section” defined herein has its leading and trailing edges TE, LE determined in this manner. “Effective Quarter-chord point” (“QC”) is defined as ¼ of the distance from the leading edge LE of the airfoil section determined in the foregoing manner, measured along the chord of this airfoil section. QC is dependent on the fan diameter (D) because the airfoil section LE and TE values change if D for the unducted fan propulsor changes.

“Cruise Speed” refers to aircraft speed and applies to a vehicle with a cruising altitude up to approximately 65,000 ft. In certain embodiments, cruise altitude is between approximately 28,000 ft. and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

It is understood that the plurality blades, whether forward or rearward, may have a variation of root forward-most points and root rearward-most points. This can be due to both installed position as well as orientation in the case of variable pitch blades. For purposes of defining the distances TRL, RTL, and VTL it is understood that a rotating blade or rotating array of blades are orientated such that the respective leading edges of the blades are in their most forward position, e.g., a feathered position. The respective trailing edge position is also obtained when the leading edge is in the most forward position. For purposes of defining the distances TRL, RTL, and VTL it is understood that the forward or leading edge or rearward or trailing edge of a stationary blade (or vane) or array of stationary blades (or vanes) is the most forward or leading edge position across the array of vanes or the most rearward or trailing edge position across the array of vanes.

"Blade" can refer to a stationary or rotating blade. "Stationary blade(s)" has the same meaning as "vane(s)".

Figure 3:
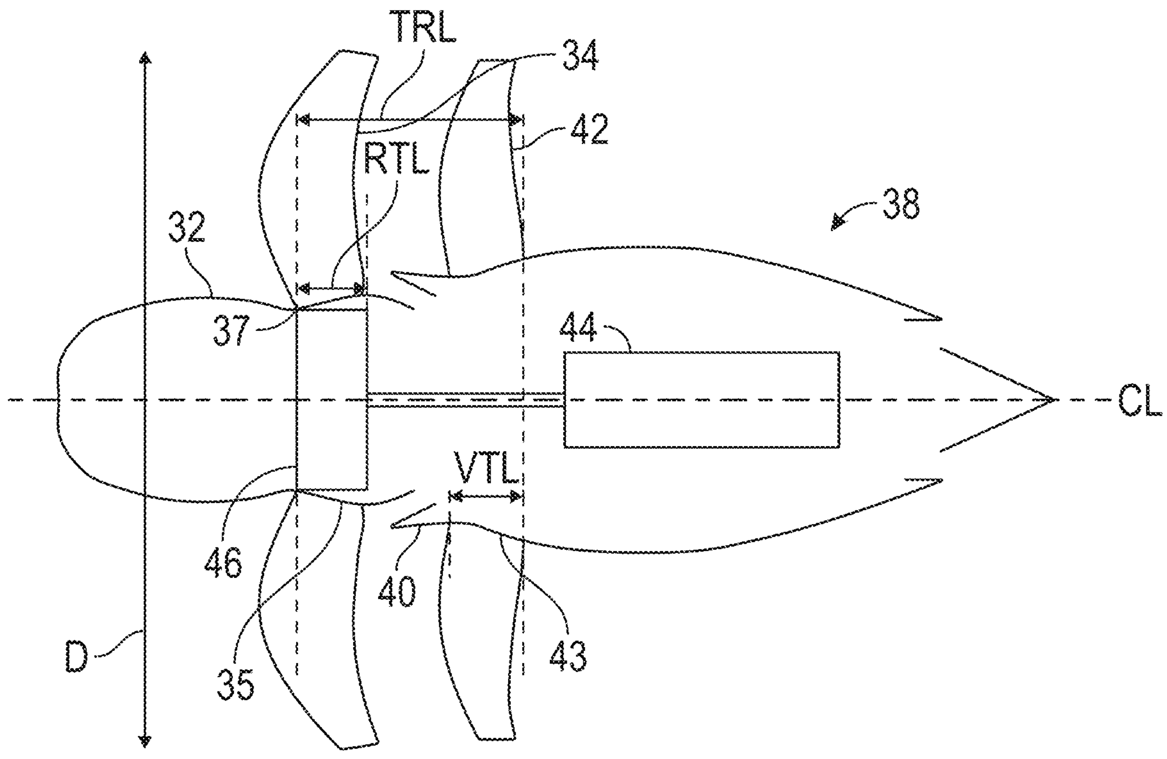
FIG. 3 comprises an elevational cross-sectional view of an exemplary unducted fan propulsor having a plurality of blades arranged in a forward array and a rearward array.
Figure 12:
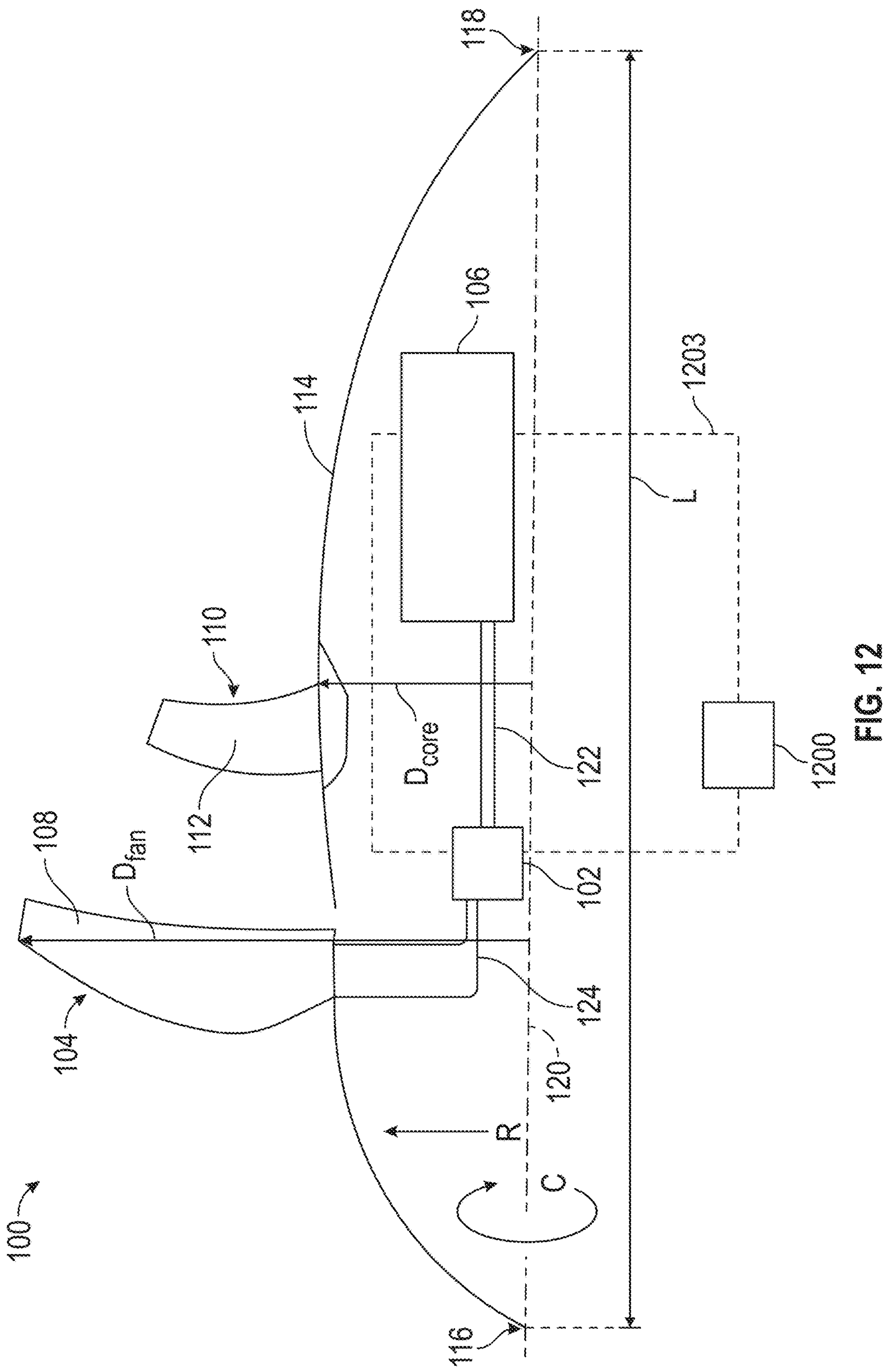
FIG. 12 is a cross-sectional schematic illustration of an unducted fan propulsor configured, according to one example.
Figure 13:
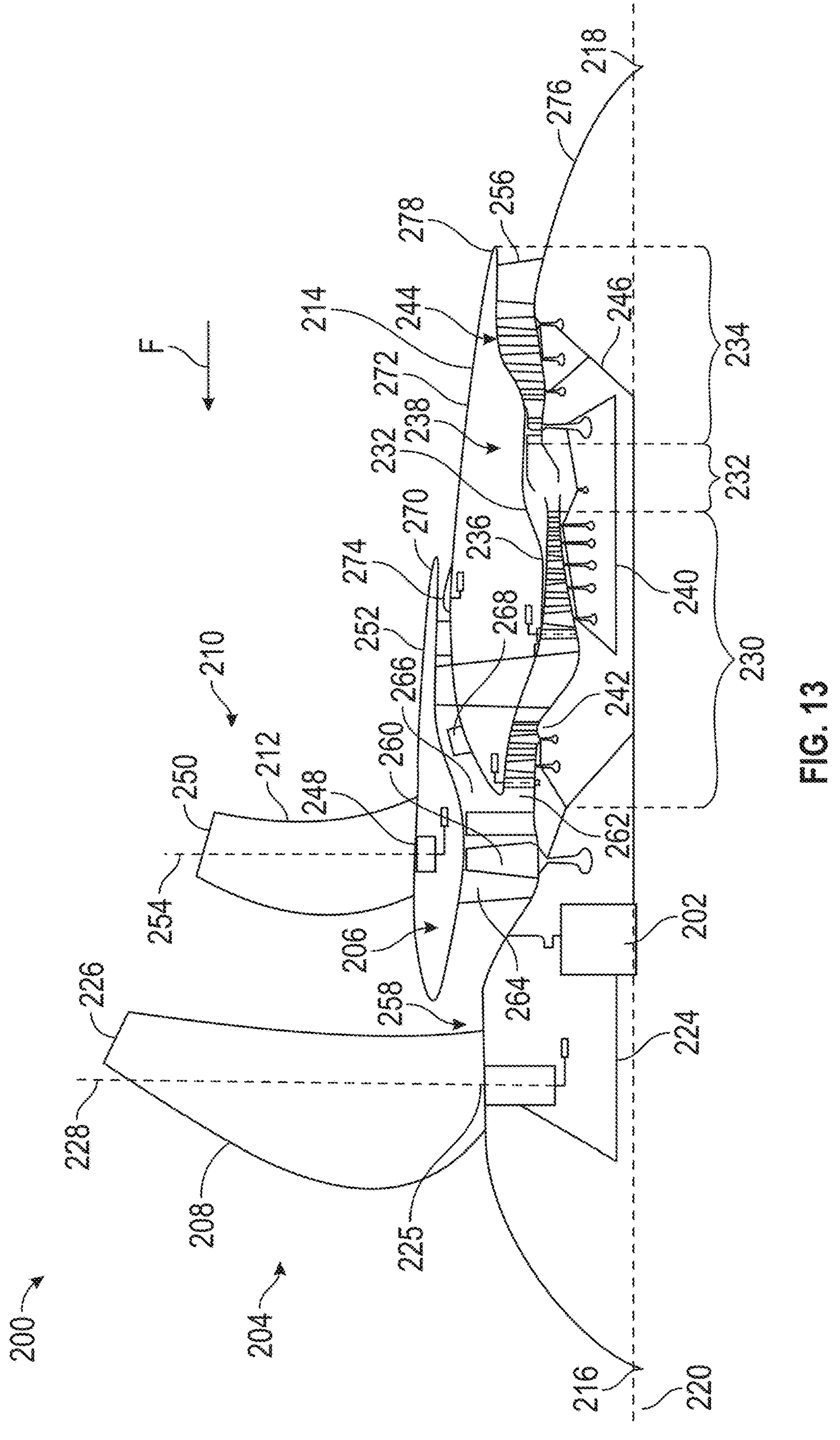
FIG. 13 is a cross-sectional schematic illustration of an unducted fan propulsor comprising a three-stream architecture, according to one example.

"Unducted fan propulsor" as used herein means an aircraft engine characterized by an array of rotating fan blades and static (or non-rotating), outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or fan nacelle. FIGS. 3, 12, 13 depict examples of unducted fan propulsors. Unducted fan propulsors can also be referred to herein as "turbomachinery engines," "unducted turbomachinery engines," or "open rotor turbomachinery engines." Additionally, the term unducted fan propulsor means an unducted, fan driven aircraft engine capable of providing thrust to an aircraft to enable cruise flight speeds between 0.7 Mach and 0.90 Mach, or 0.75 to 0.85 Mach.

"Aircraft" means a vehicle having a wing (and/or horizontal stabilizer), an airfoil defined by the wing (and/or horizontal stabilizer), and one or two unducted fan propulsors mounted to the wing, and the aircraft is operable at cruise flight speeds between 0.7 Mach and 0.90 Mach, or 0.75 to 0.85 Mach.

"Fuselage centerplane" ("FCP") is defined as a plane that is located equidistant from the wingtips, intersecting the fuselage, and containing the gravity vector when the aircraft is on the ground.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

The inventors were faced with a problem of how to improve thrust delivered to an aircraft by an unducted fan propulsor without increasing the required engine power delivered to the unducted fan of the unducted fan propulsor.

It was surprisingly found that the solution to this problem is heavily dependent on the location of the unducted fan propulsor relative to the aircraft wing.

The inventors found that installing an unducted fan propulsor presents the challenge of addressing penalties that can result due to the interaction with the rest of the aircraft. The manner in which these penalties are addressed according to the claimed subject matter is unique for this type of engine.

An unducted fan propulsor is particularly challenged due to the scrubbing and interference drags relative to a ducted turbofan. That additional drag then results in a higher thrust needed from the propulsor. Generally, higher thrust for a ducted turbofan comes with a larger power requirement and thus more fuel flow. For the unducted fan propulsor it was surprisingly found by placing the engine so that it can take advantage of the high pressure flow induced by the wing (and/or a horizontal stabilizer), engine thrust may increase without increasing the power requirement on the engine. This placement of the engine relative to the wing then acts to offset the scrubbing and interference drag, thus not increasing the required fuel (or reducing the increased fuel flow required for a non-optimum engine placement). The inventors found that increased drag effects associated with an unducted fan propulsor, rather than addressed directly, may instead be offset by placing the engine at a more optimal location relative to the wing.

Additionally, the inventors found that the installed engine's improved position also positively influences the noise produced by the wing-engine interaction during flight at cruise conditions.

It was surprisingly found that by adapting a particular location on an unducted fan propulsor relative to an aircraft wing's effective quarter chord point (QC), the desired result of offsetting interference and scrubbing drag without increasing the power delivered to the fan could be achieved for an unducted fan propulsor.

It was also found that the improved position is dependent on the fan blade size of the unducted fan propulsor.

As explained below, after recognizing the novel flow characteristics associated with an unducted fan propulsor installed on an aircraft, taking into account the limitations on where to place this propulsor, the inventors were surprisingly able to establish criteria for positioning the propulsor relative to an aircraft wing to offset interference and scrubbing effects by defining a midpoint (P) location between external output guide vanes (OGV) or input guide vanes (IGV) and a forward or aft rotating array of fan blades, respectively, and additionally defining the distance from the effective quarter chord point (QC) to P. The position of P relative to QC and QC itself were found dependent on the rotating fan diameter. The correlation of these parameters to offset interference and scrubbing effects was not used before and was the surprising finding of the inventors for an unducted fan propulsor. Thus, mounting unducted fan propulsors relative to the effective quarter-chord point (QC) and fan blade size as described in embodiments provided herein offsets interference and scrubbing effects associated with an unducted fan propulsor and is an improvement over other mounting locations, including conventional mounting locations that are more forward of, and more in line with, a wing chord line.

Various aspects of the present disclosure describe aspects of an aircraft characterized in part by a specific relation between an effective quarter chord point (QC) of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 1:
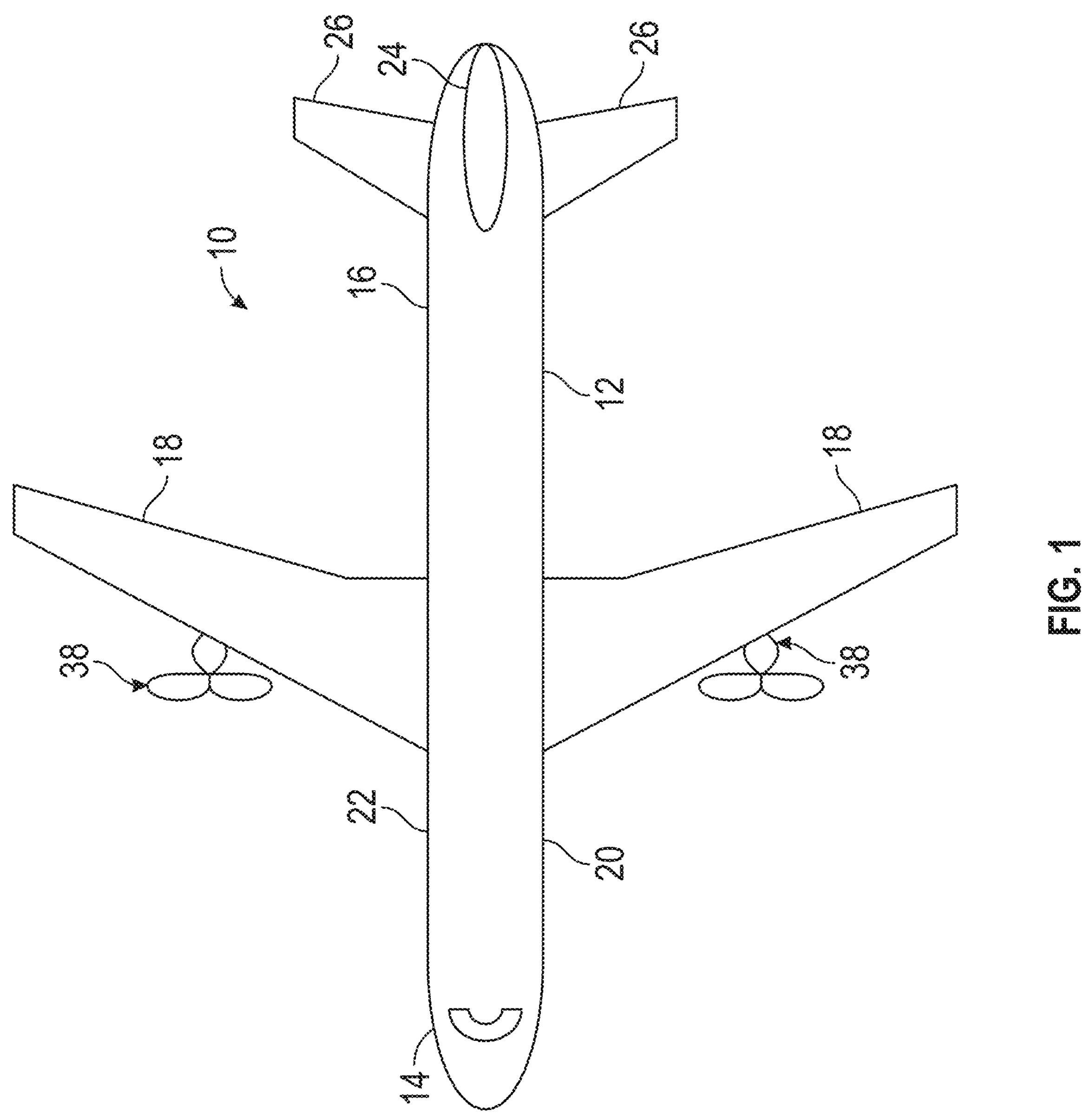
FIG. 1 comprises a top plan view of an aircraft as configured in accordance with various embodiments of these teachings, with undermounted, unducted fan propulsors mounted on forward wings of the aircraft.
Figure 2:
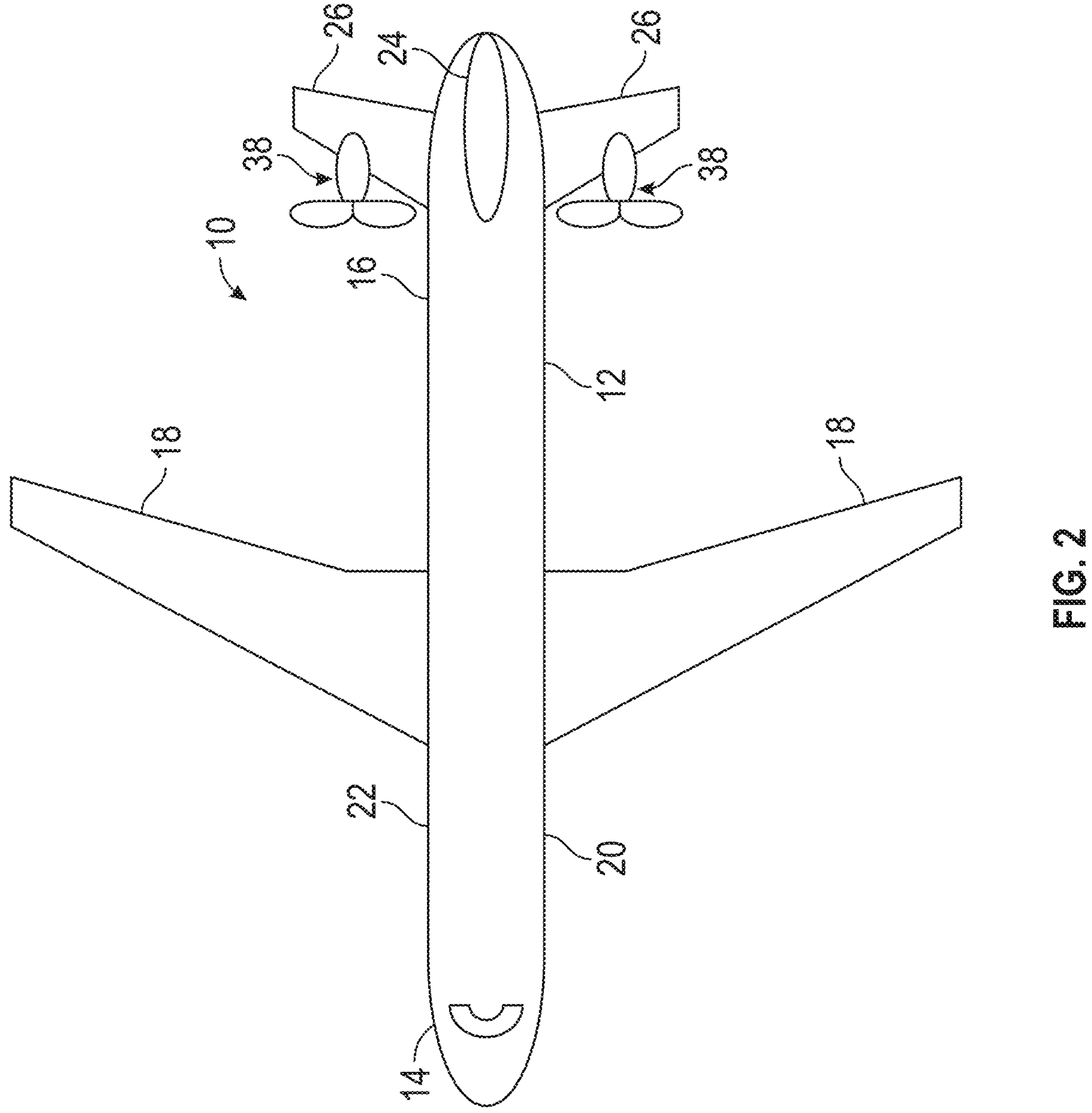
FIG. 2 comprises a top plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. An unducted fan propulsor 38 is undermounted relative to each of the wings 18, as shown in the embodiment of FIG. 1. Alternatively, the unducted fan propulsor 38 is mounted relative to the top of each of the horizontal stabilizers 26, as shown in FIG. 2. In some embodiments, more than one of the unducted fan propulsors 30 or 38 may be mounted to each of the wings 18 or each of the horizontal stabilizers 26.

FIG. 3 shows an elevational cross-sectional view of an embodiment of one of the unducted fan propulsors 38. As is seen from FIG. 3, the unducted fan propulsor 38 takes the form of an open fan propulsion system and has a rotating element in the form of rotatable propeller assembly 32 on which is mounted a first array of blades 34 around a centerline (CL) of the unducted fan propulsor 38. The first array of blades 34 defines a diameter D representing the tip-to-tip diameter of the blades and a maximum radial extent from CL. This diameter D is measured along a radial direction perpendicular to CL at the leading edge of the blades (see, e.g., FIG. 12). The unducted fan propulsor 38 of FIG. 3 includes a second array of blades or vanes, which are non-rotating or static. In some embodiments, a non-rotating stationary element in the form of vane assembly 40 includes an array of vanes 42 disposed around CL.

Each of the blades 34 has a root 35 where the blade 34 is attached to the rotatable propeller assembly 32, and each blade 34 defines a root length (RTL). The root length (RTL) is defined as the axial extent (in a direction parallel to CL) from the radially innermost leading edge (LE) of the blade 34 airfoil, e.g., closest to CL, to the axial location of the radially innermost trailing edge (TE) of the blade 34 airfoil.

Figure 4:
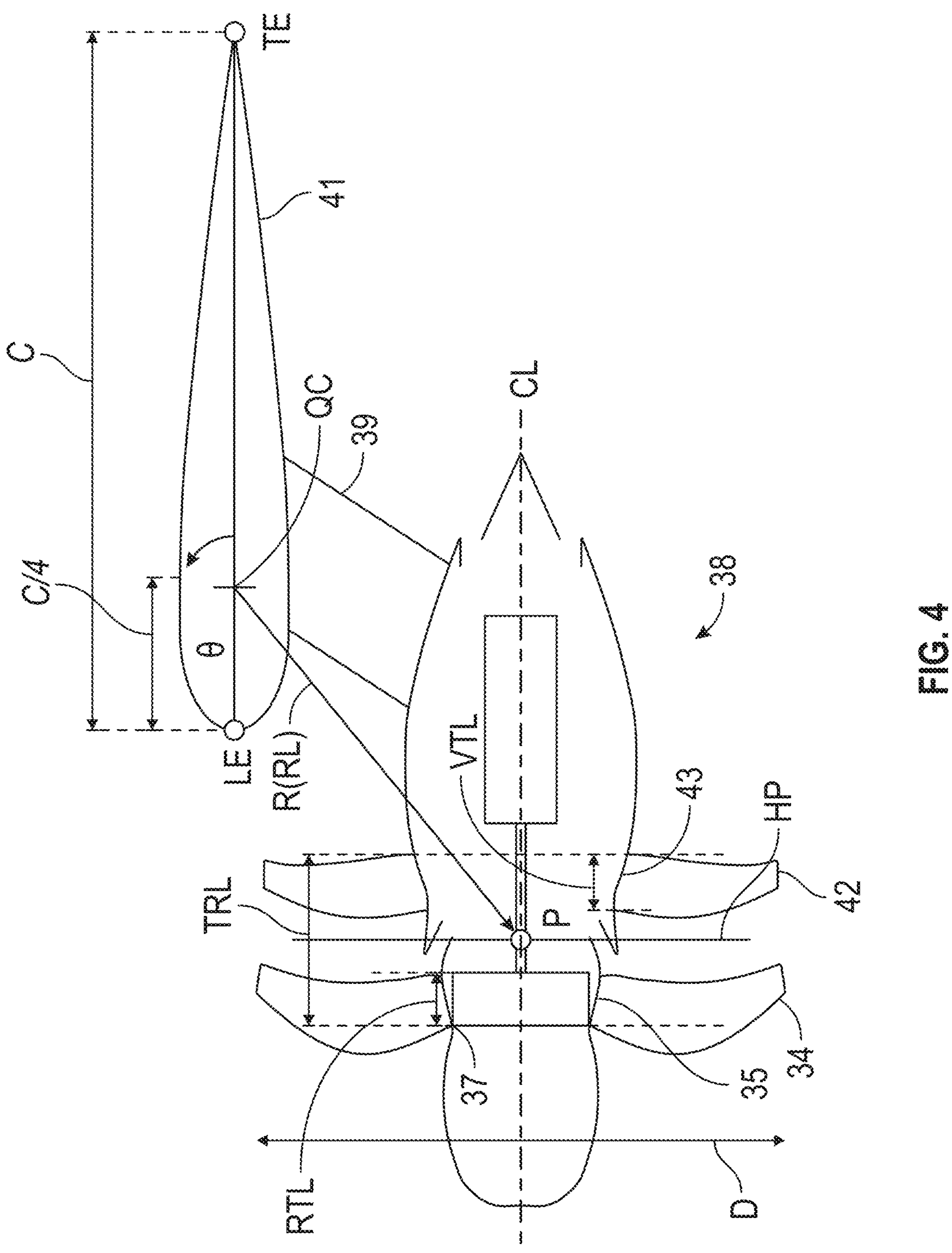
FIG. 4 comprises a schematic side elevation view showing the location of the unducted fan propulsor of FIG. 3 relative to an airfoil section.

Each of the vanes 42 also has a root 43 with a vane root distance VTL where the vane 42 is attached to the non-rotating vane assembly 40. The total root length (TRL) is the distance between the leading edge (LE) of the blade 34 airfoil (radially nearest to CL) of the blades 34 and the trailing edge (LE) of the root 43 of the vanes 42, as shown in FIGS. 3 and 4. TRL is a measured axial distance from the radial innermost LE of the foremost row of blades/vanes and the trailing edge (TE) of the vanes 42. In some embodiments, the second array may instead be a second rotating elements and the TRL is the measured axial distance from the radially innermost LE of the blades 34 of the first rotating element and the TE of the root of the blades of the second rotating elements. In some embodiments, the vanes 42 may be forward of the rotating blades, and the TRL is the distance between the LE edge of the root of the vanes and the TE of the root of the rotating blades. In some embodiments, an unducted fan propulsor having rotating elements (e.g., rotating blades) and stationary elements (e.g. vanes) may be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rearward edge of the root of the aftmost row of blades/vanes of the unducted fan propulsor.

Referring to FIG. 4, for purposes explained more later, the unducted fan propulsor 38 has a point P. For the unducted fan propulsor 38 with a first array of blades or vanes 34 and a second array of blades or vanes 42, as shown in FIGS. 3 and 4, the point P is located at the intersection of CL and a line HP perpendicular to CL and that passes through an axial midpoint of the total root length TRL between a forward end at the root of one of the blades 34 of the forward array and a rearward end at the root of one of the blades 42 of the rearward array when aligned with the one of the blades 34 of the forward array, as shown in FIG. 6. Either the forward or rearward array can be vanes or blades. In other words, the line HP is located equidistant from a forward end of the root of one of the forward vanes or blades 34 and a rearward end of the root of one of the rearward blades or vanes 42. The TRL of an unducted fan propulsor is defined as the distance between the LE of the root of the forward row of blades/vanes and the rearward edge of the root of the aftmost blade/vane.

Referring again to FIG. 3, the exemplary unducted fan propulsor 38 includes a drive mechanism 44 that provides torque and power to the propeller assembly 32 through a transmission 46. The drive mechanism 44 may be a gas turbine engine and associated transmission 46. Transmission 46 delivers torque from the drive mechanism 44 to the propeller assembly 32. The transmission system can be configured as a direct drive engine, transferring power from a power turbine or low pressure turbine (LPT) to the propeller assembly, or an indirect drive system where torque from the LPT is transferred to the propeller assembly 32 through a gearbox. The gearbox reduces a rotation speed of the drive shaft to match a desired rotational speed for the propeller assembly 32. The gas turbine engine includes in serial order a compressor, combustor, high pressure turbine and the LPT. In other embodiments the drive mechanism may generate power partially or fully by an electric motor. In the former case the drive mechanism is a hybrid electric drive mechanism including a gas turbine engine where a drive shaft includes an electric motor-generator for generating torque. In the latter case the drive mechanism is an electric motor.

The unducted fan propulsor 38 is attached relative to the wings 18 or horizontal stabilizer 26 through one or more intermediate components or features, e.g., a pylon 39, as shown in FIG. 4.

Each of the wings 18 shown in FIG. 1, and horizontal stabilizers 26 shown in FIG. 2, has an airfoil section 41 associated with it, where the airfoil section 41 is defined above.

As depicted in FIG. 4, a chord line C of the airfoil section, length C as shown, is a straight line extending from LE to TE of the airfoil section (it will be understood that the airfoil section as shown and defined herein is not meant to indicate any particular camber associated with an aircraft wing). The effective quarter-chord point (QC) of the airfoil section is located on the chord line. QC is located at a distance of C/4 from the LE of the airfoil section 41.

Figure 5A:
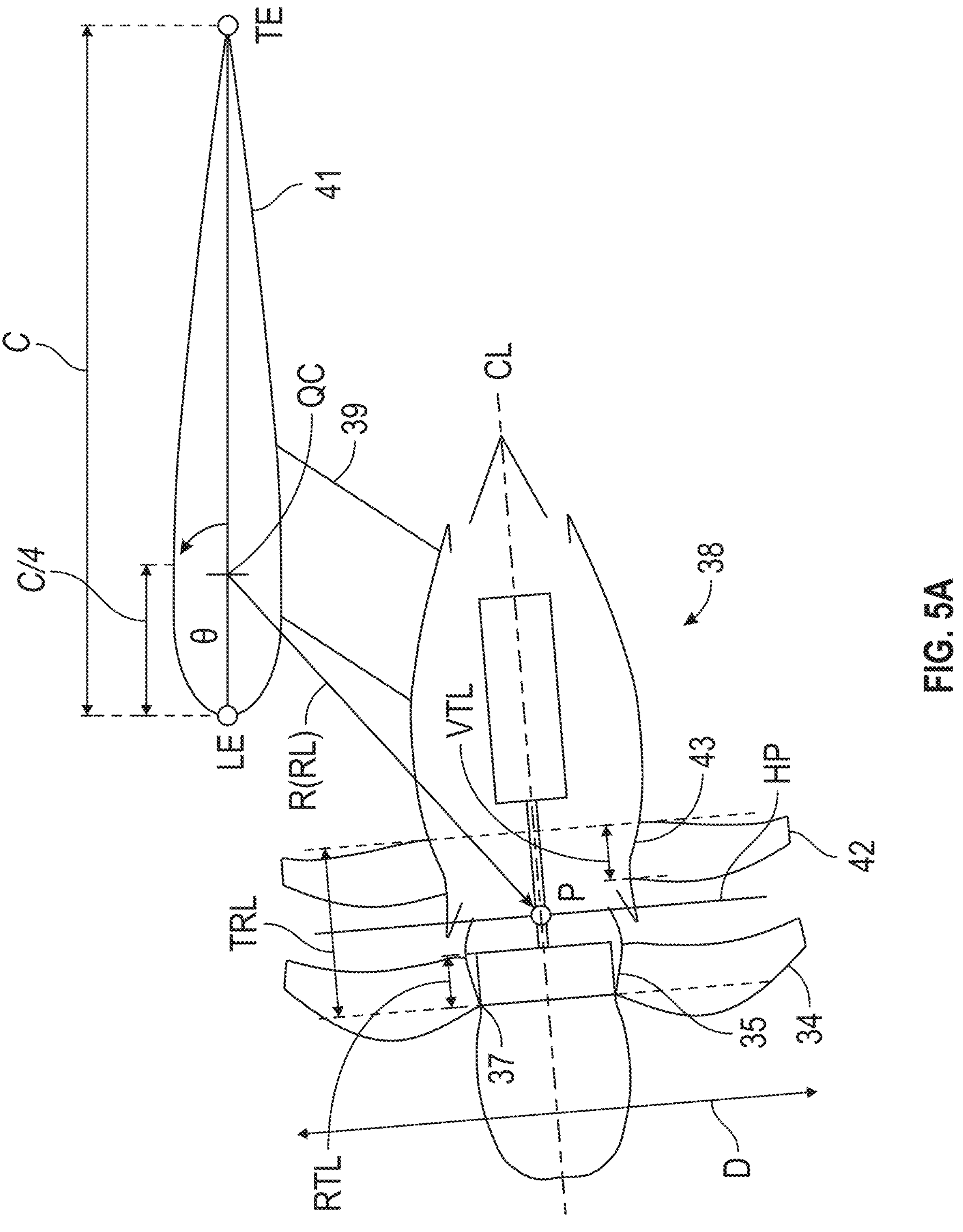
FIG. 5A is a schematic side elevation view similar to FIG. 4 and showing the unducted fan propulsor pitched downward relative to the airfoil section.

As shown in FIG. 4, the CL of the propulsor 38 and the chord line C are parallel to each other, corresponding to a zero pitch of the propulsor relative to the chord line C. The propulsor 38 can be pitched at different angles relative to the chord line, such as pitched downward as shown in FIG. 5A.

Figure 5B:
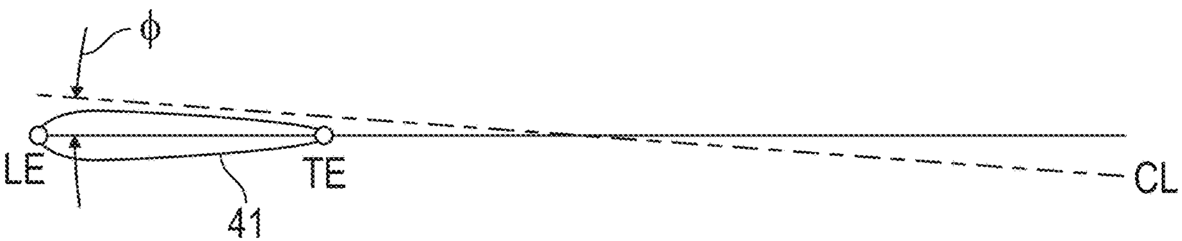
FIG. 5B defines a pitch angle Φ for the unducted fan propulsor relative to a chord line of the airfoil section in FIG. 4.

FIG. 5B defines a pitch angle Φ for the propulsor 38, which is the angle spanned between the propulsor centerline CL and chord line C. Positive pitch corresponds to a clockwise rotation of CL relative to C. The pitch angle Φ can be fixed or variable during flight. For underwing installations, the pitch angle Φ can vary between −5 and +2 degrees, or it can vary between −3 and 0 degrees. During cruise conditions, propulsor pitch and toe angle (FIG. 6E, defined below) provide for an improved installed aerodynamic performance for the unducted fan propulsor in terms of reduced cabin noise and reduced off-axis loading of the unducted fan propulsor's drive shaft. For aft horizontal stabilizer or aft fuselage installations, the angle Φ can vary between −2 and +5 degrees to more align with downwash created by the wing.

The position of the open fan propulsor 38 is defined relative to QC. The airfoil section, as defined above, is the average of a first offset plane section and a second offset plane section of the airfoil (of the wing), where the first offset plane section is the section of the airfoil taken at a first plane and the second offset plane section is the section of the airfoil taken at a second plane, the first and second planes being offset in a direction perpendicular to, and equidistant from a central plane by a distance of ½ the maximum fan diameter (D) for the rotating blades, as shown in FIG. 6A. Both the gravity vector and axis of rotation of the rotating blades of the propulsor lie in this central plane when the aircraft is on the ground.

Figure 6C:
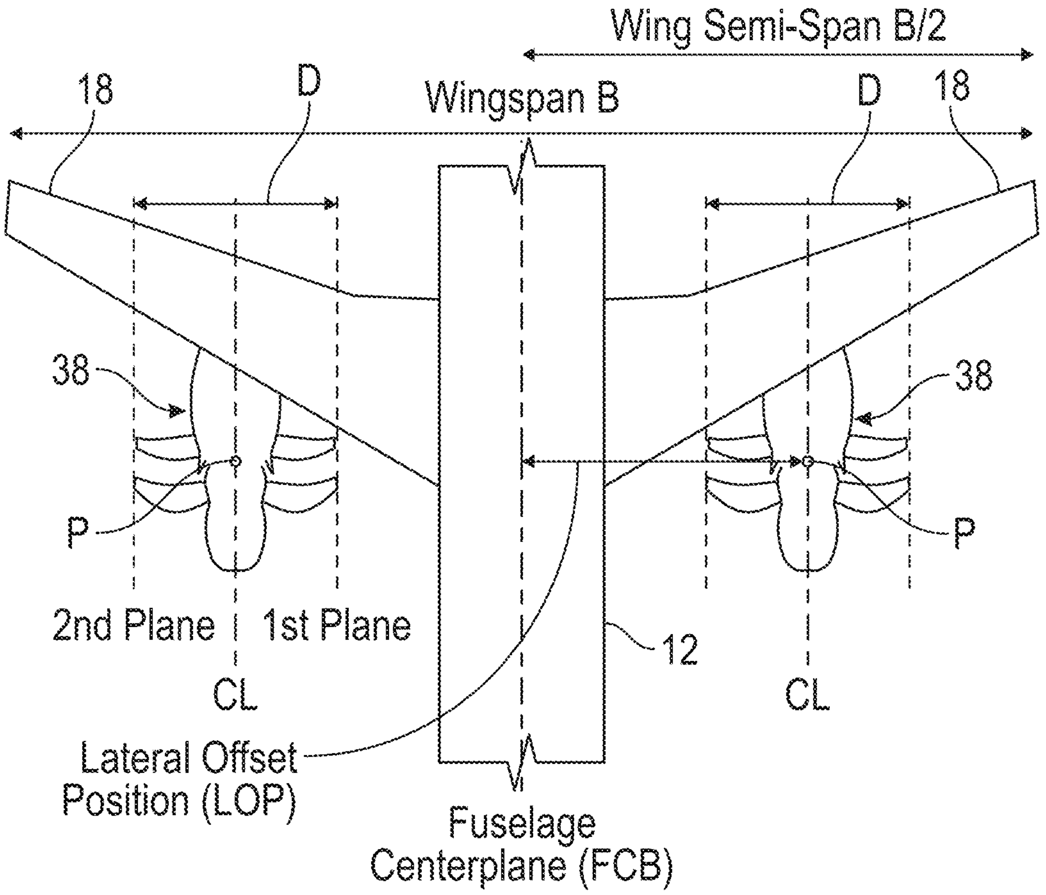
FIG. 6C comprises a schematic top plan view of a portion of an aircraft having a pair of wings extending from the fuselage with the propulsor of FIG. 3 mounted relative to each of the wings.

Referring to FIG. 6C, the propulsor 38—specifically, point P of the propulsor 38—has a spanwise location laterally offset from the fuselage centerplane (FCP) relative to the aircraft's wingspan B. P has a laterally offset position (LOP) between 10% and 80%, 20% and 40%, or between 25% and 35% of B/2 measured from the fuselage centerplane (FCP), as defined above. The location of P is also chosen to avoid interference with the fuselage or an adjacent propulsor if more than one propulsor is mounted relative to the wing. For an aft fuselage installation, the LOP of the propulsor will be closer to the fuselage, but far enough away from the fuselage's boundary layer to reduce or avoid undue interaction with the fuselage boundary layer.

Figure 6D:
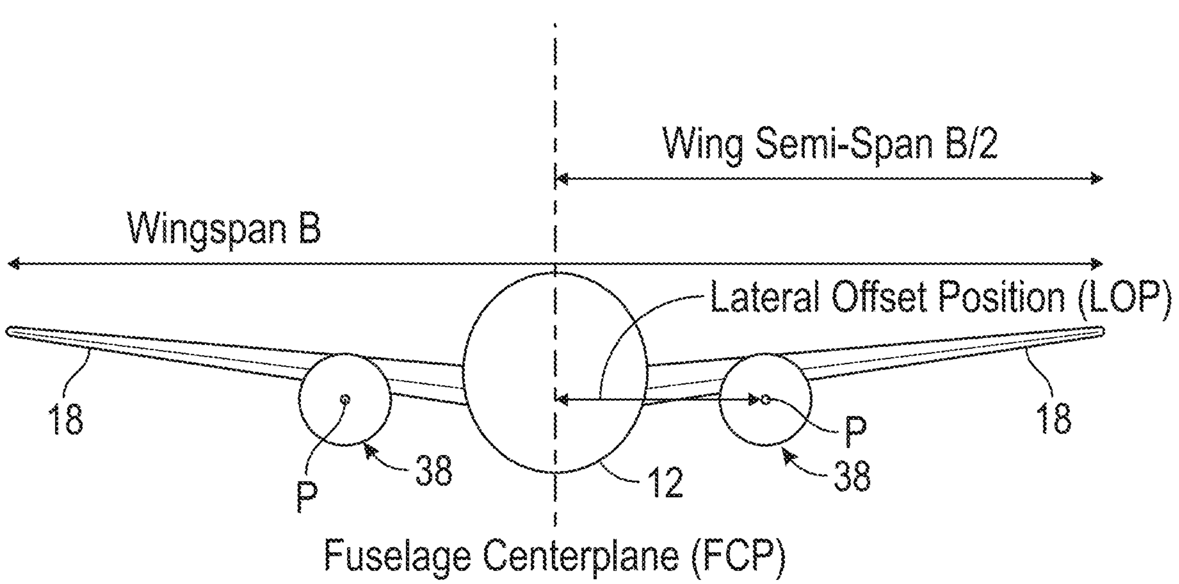
FIG. 6D comprises a schematic front elevation view of the aircraft portion of FIG. 6C.
Figure 6E:
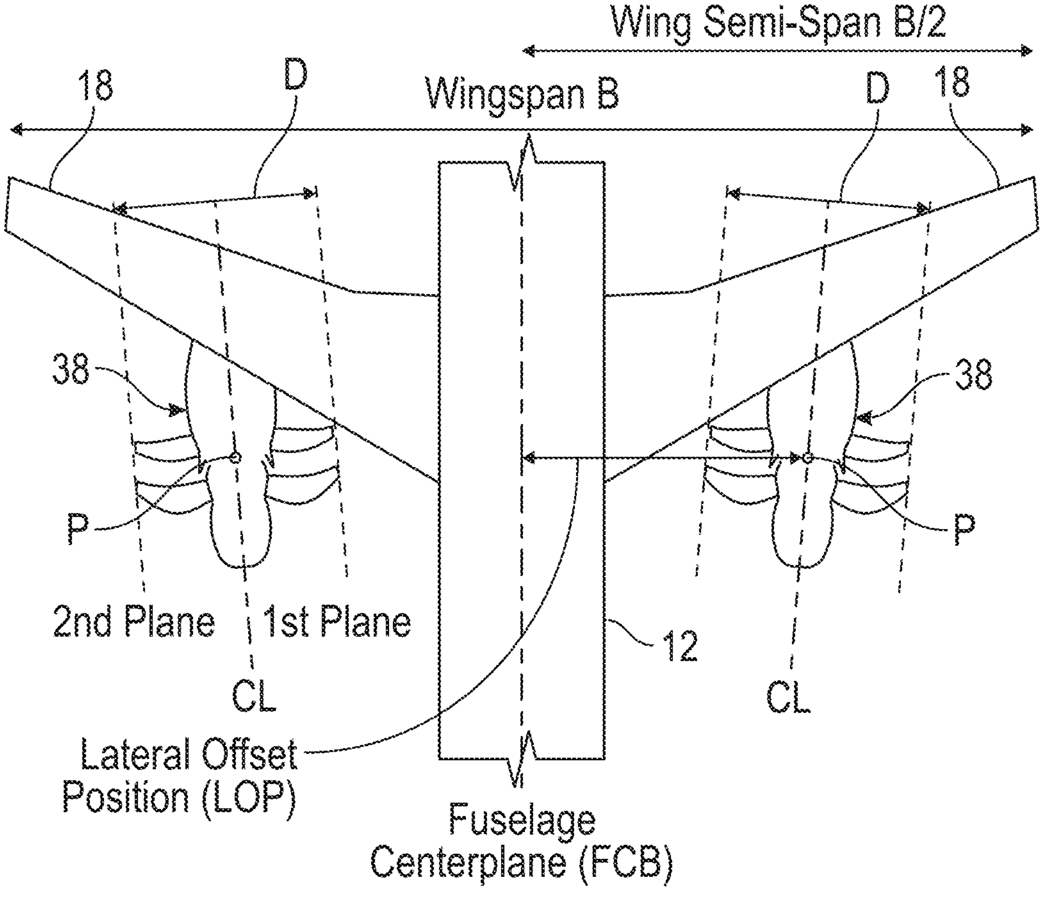
FIG. 6E comprises a schematic top plan view of a portion of an aircraft having a pair of wings extending from the fuselage with the propulsor of FIG. 3 mounted relative to each of the wings, similar to FIG. 6C but showing the propulsors toed inwardly toward the fuselage.

As shown in FIG. 6C, the propulsor centerline CL and the fuselage centerplane (FCP) can be orientated parallel to each other. Referring to FIG. 6D, other angles between propulsor centerline CL and the fuselage centerplane (FCP) are contemplated. For an underwing mounted propulsor, the toc angle can provide added benefit when positive (i.e., the rotor toed-in towards the fuselage with the forward end of the propulsor 38 being more inboard than the aft end). The propulsor can have an inward toe angle of between 0 and 5 degrees, or between 1 and 3 degrees.

There are specific locations that the inventors have found to be advantageous to position the unducted fan propulsor 38 to generate increased thrust using higher pressure air flow, in order to offset the scrubbing and interference drag. The higher pressure air flow can be beneath the wings 18. In the case of a horizontal stabilizer 26, the higher pressure air flow is above the horizontal stabilizer 26. Accordingly, the high-pressure side of an airfoil may refer to the underside of a wing 18 or the top side of a horizontal stabilizer 26.

The aircraft described herein has a fuselage, wings and/or stabilizers, and two or more unducted fan propulsor systems (or propulsors). The unducted fan propulsor system, which is mounted on the pressure side of a wing or horizontal stabilizer, provides thrust to the aircraft. To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. For example, placement can affect loads on and size of the pylon, wing loads, landing gear length and associated forces, weight, and cost.

The teachings described below enable improved balancing of the tradeoffs required in the aircraft design while positioning the unducted fan propulsor relative to the airfoil section's effective quarter chord point QC to offset scrubbing and interference drag loses.

Referring to FIG. 4, the location of an unducted fan propulsor relative to an airfoil section 41 is defined herein using a polar coordinate system having an angular (θ) coordinate and a radial (R) component, with origin located at the effective quarter chord point (QC) of the airfoil section having a chord length (C) as shown. The radial component is referred to herein as a "positioning line (R)". The location of the point P of the unducted fan propulsor 38 relative to the origin (QC) of the polar coordinate system (the origin of the coordinate system is the same as the effective quarter chord point for airfoil section 41) is expressed in terms of a vector having radial component R with magnitude RL and angular component θ. The vector magnitude RL is called a "positioning line length (RL)".

The angle θ is measured relative to a datum that is the airfoil section chord line (e.g., in FIG. 6 the vector R is located by an angle that is between 180 and 270 degrees measured counterclockwise about origin QC relative to the chord line). When viewed looking from an outboard position towards an inboard position (e.g., the fuselage), θ is positive in a counter-clockwise direction when the propulsor is below the airfoil section 41 (wing, FIG. 9), and θ is positive in a clockwise direction when the propulsor is above the airfoil section (horizontal stabilizer, FIG. 10) as indicated in the drawings, respectively, by the direction of the arrow from the origin.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section) of FIGS. 5 and 6 the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θ locating the unducted fan propulsor system relative to the airfoil section tend to offset scrubbing and interference drag for an unducted fan propulsor.

Figure 9:
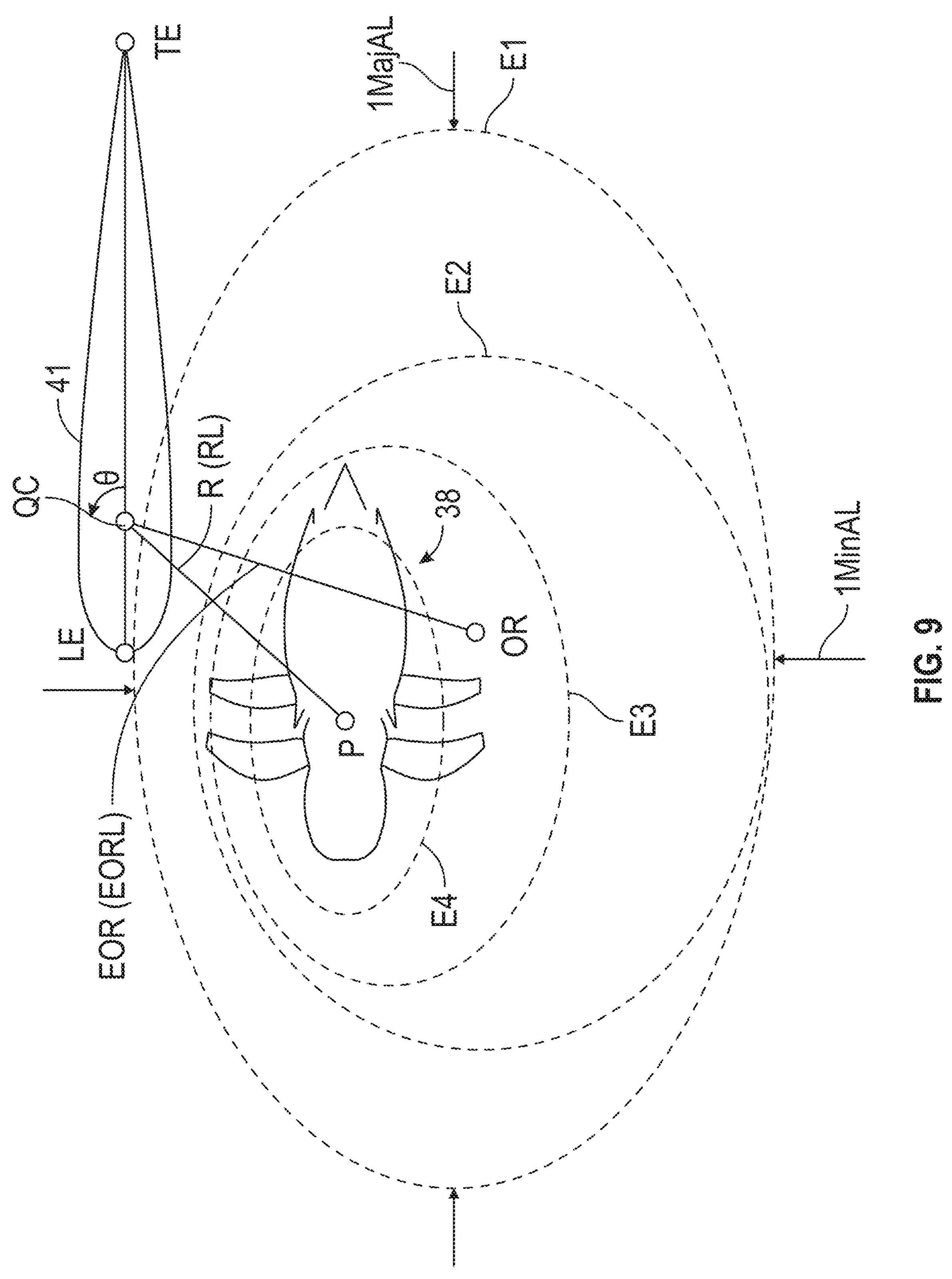
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
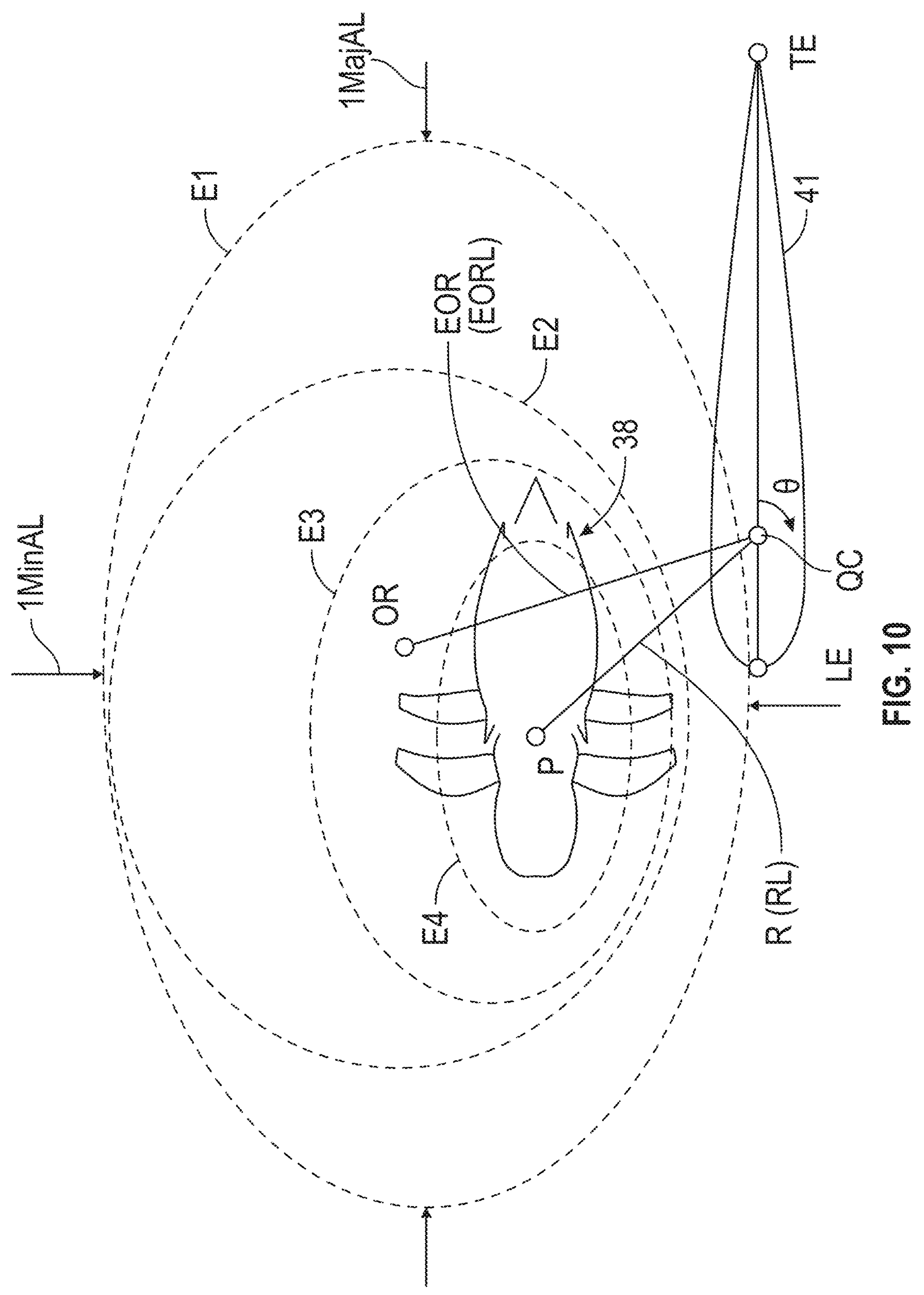
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse defining a region relative to QC where scrubbing and interference drag tends to offset. FIGS. 7-10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The location of OR is expressed relative to QC using the polar coordinate system frame of reference defined earlier. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to QC. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. The angle θ is measured relative to the chord line (as defined earlier) and positive in a clockwise direction when the propulsor is above the airfoil section (horizontal stabilizer, FIG. 10) as indicated in the drawings, respectively, by the direction of the arrow from the origin.

An angle θ for the ellipse origin positioning line EOR is measured from a datum that is the chord line to an ellipse positioning line EOR (e.g., in FIG. 9 the vector EOR is located by an angle that is between 180 and 270 degrees measured counterclockwise about origin QC). A positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 38 is located in a first ellipse E1 with a first ellipse origin defined by EORL/D of 0.938 and θ of 253.6°. The first ellipse E1 also has a first major axis length (1MajAL) and a first minor axis length (1MinAL), where 1MajAL/D is 2.8 and 1MinAL/D is 1.7. A unducted fan propulsor located within E1 tends to offset scrubbing and interference drag.

In a second embodiment, the point P of the unducted fan propulsor 38 is located in a second ellipse E2 having a second ellipse origin defined by EORL/D of 1.051 and θ of 248.8°. The second ellipse E2 has a second major axis length (2MajAL) and a second minor axis length (2MinAL), where 2MajAL/D is 1.86 and 2MinAL/D is 1.56. A unducted fan propulsor located within E2 tends to offset scrubbing and interference drag.

In a third embodiment, the point P of the unducted fan propulsor 38 is located in a third ellipse E3 having a third ellipse origin defined by EORL/D of 0.870 and θ of 239.6°. The third ellipse E3 has a third major axis length (3MajAL) and a third minor axis length (3MinAL), where 3MajAL/D is 1.4 and 3MinAL/D is 0.9. A unducted fan propulsor located within E3 tends to offset scrubbing and interference drag.

In a fourth embodiment, the point P of the unducted fan propulsor 38 is located in a fourth ellipse E4 having a fourth ellipse origin defined by EORL/D of 0.763 and θ of 235.7°. The fourth ellipse E4 has a fourth major axis length (4MajAL) and a fourth minor axis length (4MinAL), where 4MajAL/D is 0.94 and 4MinAL/D is 0.44. A unducted fan propulsor located within E4 tends to offset scrubbing and interference drag.

The location of the unducted fan propulsor system (i.e., point P) relative to the airfoil section may also be expressed in terms of the following expressions:

$$\frac{RL}{D} + \frac{\left(\sqrt{a*\left[b*\sin^2(\theta) - c*\cos^2(\theta) + d*\sin(\theta)*\cos(\theta)\right]} + e*\sin(\theta) + f*\cos(\theta)\right)}{g*\sin^2(\theta) + h*\cos^2(\theta)} > 0$$

and $$\frac{RL}{D} + \frac{\left(-\sqrt{a*\left[b*\sin^2(\theta) - c*\cos^2(\theta) + d*\sin(\theta)*\cos(\theta)\right]} + e*\sin(\theta) + f*\cos(\theta)\right)}{g*\sin^2(\theta) + h*\cos^2(\theta)} < 0$$

where $0.07<RL/D<1.98$ and θ is between 187° and 340°, and where a, b, c, d, e, f, g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |
| g | 1.96 | 0.8649 | 0.49 | 0.2209 |
| h | 0.7225 | 0.6084 | 0.2025 | 0.0484 |

In a sixth embodiment, the point P of the unducted fan propulsor 38 can be defined by the above expression, but where $0.254<RL/D<1.86$ and θ is between 199° and 306°, and where a, b, c, d, e, f, g and h have the values set forth in the above table under the heading "Sixth Emb."

In a seventh embodiment, the point P of the unducted fan propulsor 38 can be defined by the above expression, but where $0.369<RL/D<1.43$ and θ is between 204° and 291°, and where a, b, c, d, e, f, g and h have the values set forth in the above table under the heading "Seventh Emb.".

In an eighth embodiment, the point P of the unducted fan propulsor 38 can be defined by the above expression, but where $0.477<RL/D<0.9455$ and θ is between 211° and 274°, And where a, b, c, d, e, f, g and h have the values set forth in the above table under the heading "Eighth Emb."

Figure 7:
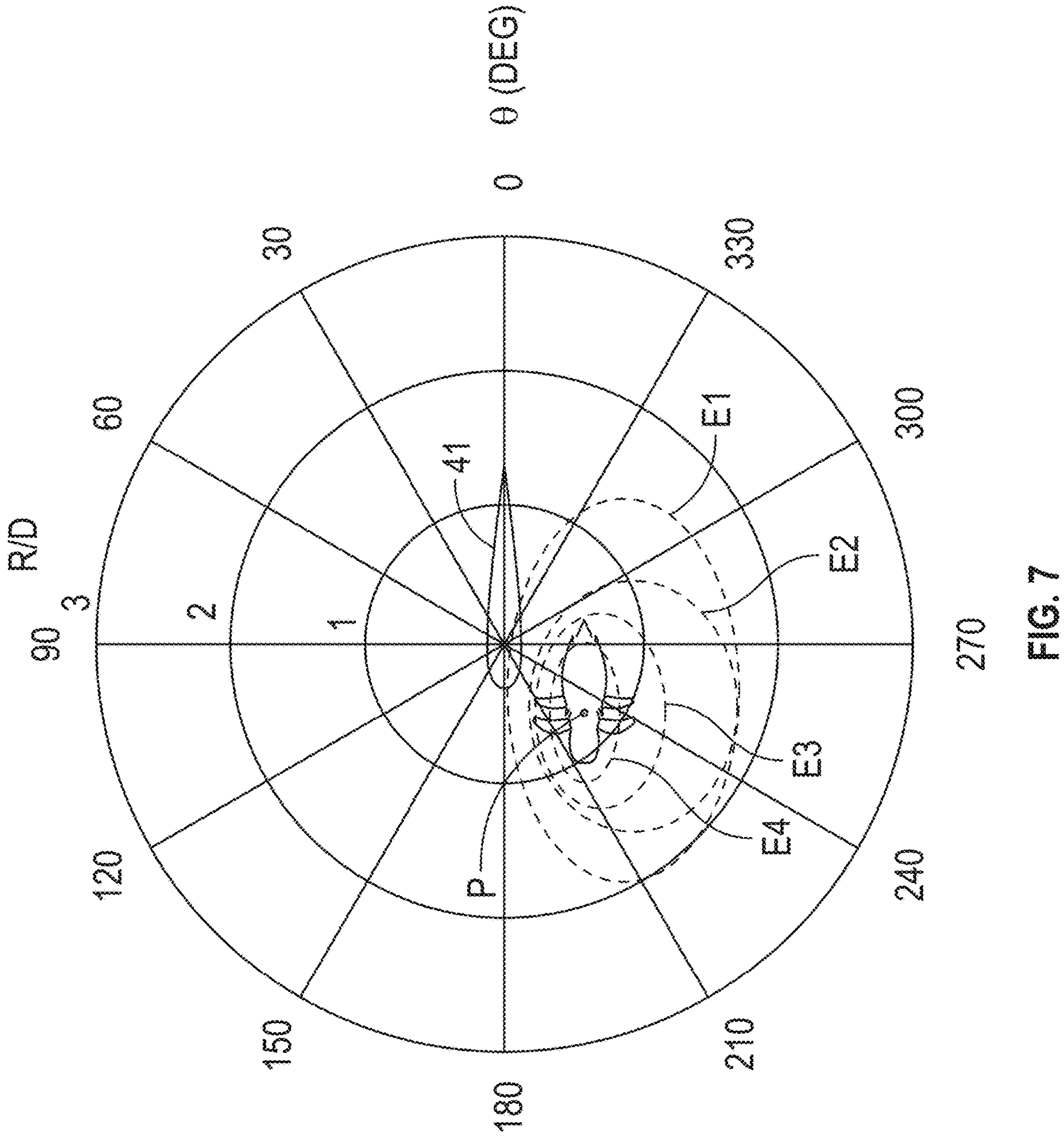
FIG. 7 comprises a schematic side elevation view similar to that of FIG. 4, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system.

Figure 11:
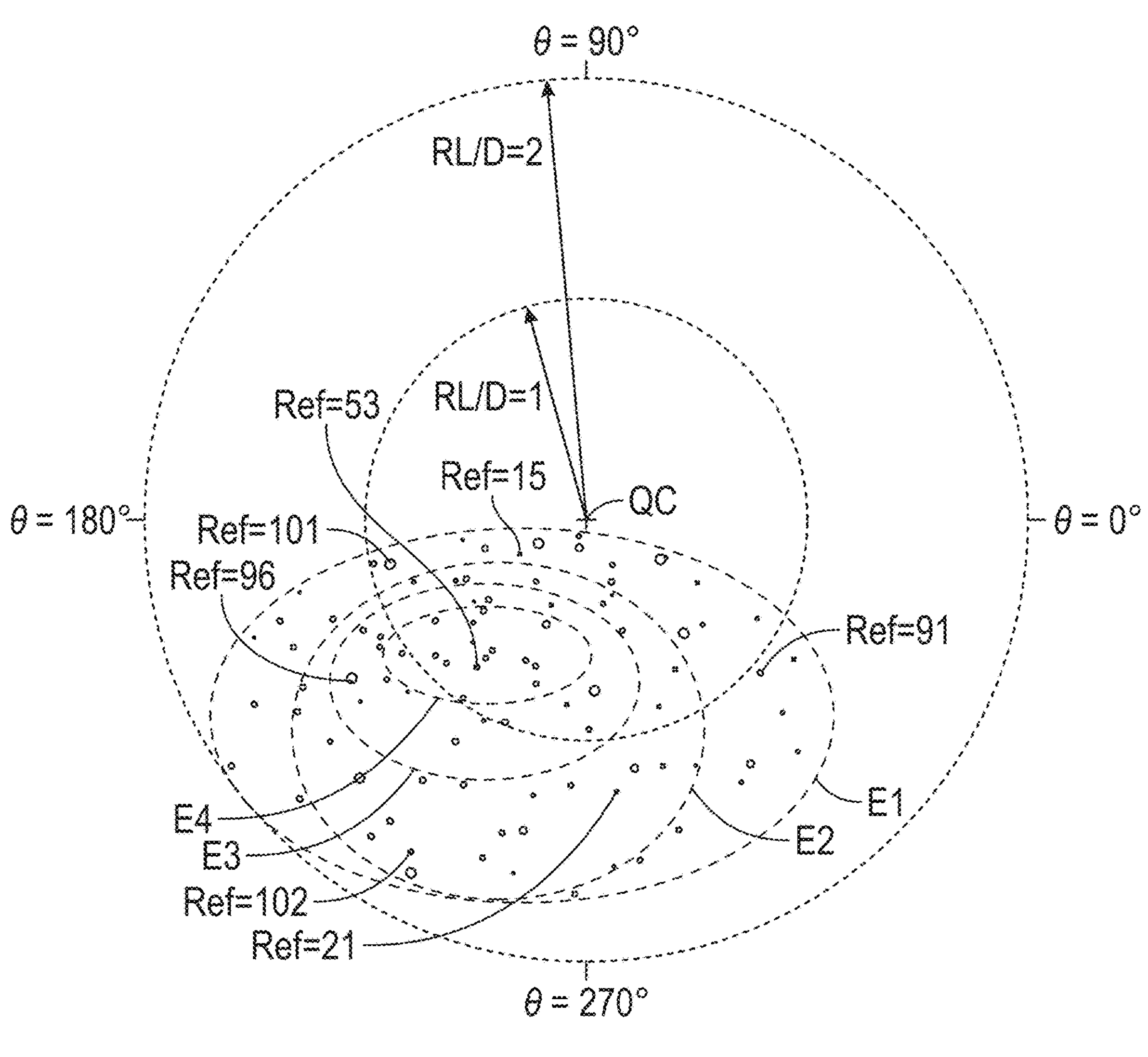
FIG. 11 comprises a schematic representation showing exemplary locations of a point P of one of the unducted fan propulsors, as defined herein, within the first ellipse, the second ellipse, the third ellipse, and the fourth ellipse.

TABLES 1 and 3-6 set forth examples of embodiments of invention. TABLE 1 shows each maximum outer diameter (D) and the location of point P of the unducted fan propulsor relative to the effective quarter chord point, QC, contemplated, where the point P is defined by RL and θ. The term "Ref." refers to the row in Table 1 for reference. The exemplary types of aircraft indicated with reference letters A through I in TABLE 1 are identified in TABLE 2. The point P of the unducted fan propulsor locations from TABLE 1 are shown in FIG. 11 for an under-wing mounted propulsor (for a propulsor mounted above a horizontal stabilizer the maximum outer diameter (D) and the point P of the unducted fan propulsor locations would be mirrored about the chord line of the airfoil section, which, for purposes of explanation, may be thought of as an axis passing through θ=0 deg and θ=180 deg in FIG. 11) relative to the first ellipse (E1), second ellipse (E2), third ellipse (E3), and the fourth ellipse (E4). The size of the points in FIG. 11 represent the relative size of D for the range provided in TABLE 1 (not to scale).

The rotating blades diameter (D) may be between 2-50, 8-16, 10-15, 12-14, or 14-16 feet.

TABLE 1

P-location relative to airfoil section quarter chord point (QC)

| Ref. | Type of aircraft | RL (ft) | D (ft) | θ (deg) | RL/D |
|---|---|---|---|---|---|
| 1 | C I | 2.60 | 2.0 | 220.00 | 1.30 |
| 2 | F I | 1.07 | 2.0 | 189.00 | 0.54 |
| 3 | I | 3.13 | 2.0 | 199.73 | 1.57 |
| 4 | C F I | 2.18 | 3.0 | 319.20 | 0.73 |
| 5 | F I | 2.82 | 3.0 | 242.40 | 0.94 |
| 6 | C I | 1.47 | 4.0 | 293.60 | 0.37 |
| 7 | C I | 2.43 | 4.0 | 217.87 | 0.61 |
| 8 | I | 6.64 | 4.0 | 259.47 | 1.66 |
| 9 | C F I | 4.23 | 5.0 | 265.87 | 0.85 |
| 10 | C H I | 6.57 | 5.0 | 194.40 | 1.31 |
| 11 | F I | 2.03 | 5.0 | 250.93 | 0.41 |
| 12 | C F H I | 8.03 | 5.0 | 275.47 | 1.61 |
| 13 | C | 2.52 | 6.0 | 337.33 | 0.42 |
| 14 | H | 4.44 | 6.0 | 228.53 | 0.74 |
| 15 | C I | 1.88 | 6.0 | 208.27 | 0.31 |
| 16 | C F | 7.14 | 7.0 | 244.53 | 1.02 |
| 17 | B F H | 4.15 | 7.0 | 332.00 | 0.59 |
| 18 | B C I | 6.49 | 7.0 | 292.53 | 0.93 |
| 19 | C G | 8.05 | 8.0 | 216.80 | 1.01 |
| 20 | B F I | 11.89 | 8.0 | 256.27 | 1.49 |
| 21 | C G H | 10.08 | 8.0 | 277.60 | 1.26 |
| 22 | B C G I | 7.31 | 8.0 | 330.93 | 0.91 |
| 23 | C H | 9.97 | 8.0 | 294.67 | 1.25 |
| 24 | G I | 11.57 | 8.0 | 312.80 | 1.45 |
| 25 | B F I | 11.58 | 9.0 | 260.53 | 1.29 |
| 26 | C H | 6.06 | 9.0 | 224.27 | 0.67 |
| 27 | F G H | 3.06 | 9.0 | 233.87 | 0.34 |
| 28 | C I | 12.78 | 9.0 | 204.00 | 1.42 |
| 29 | B H | 10.47 | 10.0 | 210.40 | 1.05 |
| 30 | B I | 5.53 | 10.0 | 221.07 | 0.55 |
| 31 | A B C F G H | 7.00 | 10.0 | 253.07 | 0.70 |
| 32 | I | 2.47 | 10.0 | 306.40 | 0.25 |
| 33 | A C | 15.27 | 10.0 | 222.13 | 1.53 |
| 34 | G | 11.67 | 10.0 | 241.33 | 1.17 |
| 35 | A C F H | 17.13 | 10.0 | 243.47 | 1.71 |
| 36 | A B G I | 18.70 | 11.0 | 210.00 | 1.70 |
| 37 | G | 10.93 | 11.0 | 249.87 | 0.99 |
| 38 | A H | 4.33 | 11.0 | 285.07 | 0.39 |
| 39 | F I | 6.82 | 11.0 | 206.13 | 0.62 |
| 40 | A F H | 11.60 | 12.0 | 272.27 | 0.97 |
| 41 | A B F I | 10.64 | 12.0 | 227.47 | 0.89 |
| 42 | A H | 21.84 | 12.0 | 232.80 | 1.82 |
| 43 | A G | 8.56 | 12.0 | 236.00 | 0.71 |
| 44 | B F H | 0.78 | 12.0 | 263.50 | 0.07 |
| 45 | A F | 10.00 | 12.5 | 200.00 | 0.80 |
| 46 | A B G H I | 15.25 | 12.5 | 268.00 | 1.22 |
| 47 | B | 19.92 | 12.5 | 279.73 | 1.59 |
| 48 | A B F | 15.92 | 12.5 | 316.00 | 1.27 |
| 49 | A B | 6.25 | 12.5 | 270.13 | 0.50 |
| 50 | A F H | 18.42 | 12.5 | 211.47 | 1.47 |
| 51 | F G | 24.25 | 12.5 | 215.73 | 1.94 |
| 52 | A B H | 19.50 | 13.0 | 287.20 | 1.50 |
| 53 | H | 10.66 | 13.0 | 234.93 | 0.82 |
| 54 | B | 14.99 | 13.0 | 326.67 | 1.15 |
| 55 | I | 18.11 | 13.0 | 239.20 | 1.39 |
| 56 | A B F H | 23.49 | 13.0 | 225.33 | 1.81 |
| 57 | A F G H | 10.49 | 13.0 | 302.13 | 0.81 |
| 58 | B I | 3.38 | 13.0 | 231.73 | 0.26 |
| 59 | A B G | 13.95 | 13.0 | 212.53 | 1.07 |
| 60 | A B H | 10.14 | 13.0 | 255.20 | 0.78 |
| 61 | F | 10.80 | 13.5 | 215.00 | 0.80 |
| 62 | A H I | 19.35 | 13.5 | 198.67 | 1.43 |
| 63 | B F | 15.39 | 13.5 | 220.00 | 1.14 |
| 64 | A G H I | 7.83 | 13.5 | 207.20 | 0.58 |
| 65 | B H | 10.30 | 13.5 | 235.70 | 0.76 |
| 66 | A B | 23.49 | 13.5 | 237.07 | 1.74 |
| 67 | A H | 22.05 | 13.5 | 238.13 | 1.63 |
| 68 | F G | 13.08 | 13.5 | 192.00 | 0.97 |
| 69 | A B F | 6.03 | 13.5 | 195.47 | 0.45 |
| 70 | A F | 13.23 | 13.5 | 200.80 | 0.98 |
| 71 | B H | 16.89 | 14.0 | 201.87 | 1.21 |

TABLE 1-continued

P-location relative to airfoil section quarter chord point (QC)

| Ref. | Type of aircraft | RL (ft) | D (ft) | θ (deg) | RL/D |
|---|---|---|---|---|---|
| 72 | B I | 22.68 | 14.0 | 254.13 | 1.62 |
| 73 | A B F H | 24.17 | 14.0 | 269.07 | 1.73 |
| 74 | B E G | 19.69 | 14.0 | 301.07 | 1.41 |
| 75 | A | 12.60 | 14.0 | 223.20 | 0.90 |
| 76 | H I | 23.30 | 15.0 | 214.67 | 1.55 |
| 77 | A B E G H | 10.30 | 15.0 | 248.80 | 0.69 |
| 78 | A B E H | 17.90 | 15.0 | 288.27 | 1.19 |
| 79 | F G | 21.23 | 16.0 | 246.67 | 1.33 |
| 80 | A E | 8.64 | 16.0 | 290.40 | 0.54 |
| 81 | E G | 17.60 | 16.0 | 207.00 | 1.10 |
| 82 | A E | 25.20 | 18.0 | 230.00 | 1.40 |
| 83 | F | 19.80 | 18.0 | 225.00 | 1.10 |
| 84 | A G | 6.84 | 18.0 | 263.73 | 0.38 |
| 85 | A E | 35.64 | 18.0 | 221.00 | 1.98 |
| 86 | A E | 6.17 | 20.0 | 297.03 | 0.31 |
| 87 | F | 30.55 | 21.0 | 259.78 | 1.45 |
| 88 | A D | 10.99 | 22.0 | 252.33 | 0.50 |
| 89 | A E | 21.50 | 22.0 | 237.43 | 0.98 |
| 90 | D | 14.29 | 24.0 | 222.53 | 0.60 |
| 91 | D E | 25.75 | 24.0 | 319.38 | 1.07 |
| 92 | D E | 3.41 | 29.0 | 267.23 | 0.12 |
| 93 | D | 39.42 | 29.0 | 304.48 | 1.36 |
| 94 | E | 38.55 | 33.0 | 282.13 | 1.17 |
| 95 | D | 51.16 | 33.0 | 229.98 | 1.55 |
| 96 | D E | 44.23 | 35.0 | 215.08 | 1.26 |
| 97 | E | 24.18 | 35.0 | 311.93 | 0.69 |
| 98 | D | 8.53 | 40.0 | 207.63 | 0.21 |
| 99 | D | 31.45 | 40.0 | 274.68 | 0.79 |
| 100 | D | 18.19 | 45.0 | 334.28 | 0.40 |
| 101 | D | 42.32 | 48.0 | 192.73 | 0.88 |
| 102 | D | 90.00 | 50.0 | 244.88 | 1.80 |

TABLE 2

| Designator for TABLE 1 | Aircraft Type |
|---|---|
| A | Narrow Body, twin engine |
| B | Narrow Body, 4 engines |
| C | Narrow Body, distributed propulsors (>4 engines) |
| D | Wide Body, twin engine |
| E | Wide Body, 4 engines |
| F | Wide Body, distributed propulsors (>4 engines) |
| G | Regional Jet |
| H | Business Jet |
| I | UAV |

For Aircraft Type A, B, C and G having a Mach flight speed at cruise conditions of between 0.70 and 0.85 the fan diameter (D) is between 8 and 16 feet, or more preferably between 12 feet and 16 feet.

TABLES 3-6 provide exemplary embodiments for EORL and D for each of the first ellipse E1, second ellipse E2, third ellipse E3 and fourth ellipse E4, respectively, relative to the quarter chord point (QC).

TABLE 3

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 2 | 253.6 | 1.876 | 5.6 | 3.4 | 0.938 | 2.8 | 1.7 |
| 3 | 253.6 | 2.814 | 8.4 | 5.1 | 0.938 | 2.8 | 1.7 |
| 4 | 253.6 | 3.752 | 11.2 | 6.8 | 0.938 | 2.8 | 1.7 |
| 5 | 253.6 | 4.69 | 14 | 8.5 | 0.938 | 2.8 | 1.7 |
| 6 | 253.6 | 5.628 | 16.8 | 10.2 | 0.938 | 2.8 | 1.7 |
| 7 | 253.6 | 6.566 | 19.6 | 11.9 | 0.938 | 2.8 | 1.7 |
| 8 | 253.6 | 7.504 | 22.4 | 13.6 | 0.938 | 2.8 | 1.7 |
| 9 | 253.6 | 8.442 | 25.2 | 15.3 | 0.938 | 2.8 | 1.7 |
| 10 | 253.6 | 9.38 | 28 | 17 | 0.938 | 2.8 | 1.7 |
| 11 | 253.6 | 10.318 | 30.8 | 18.7 | 0.938 | 2.8 | 1.7 |
| 12 | 253.6 | 11.256 | 33.6 | 20.4 | 0.938 | 2.8 | 1.7 |
| 12.5 | 253.6 | 11.725 | 35 | 21.25 | 0.938 | 2.8 | 1.7 |
| 13 | 253.6 | 12.194 | 36.4 | 22.1 | 0.938 | 2.8 | 1.7 |
| 13.5 | 253.6 | 12.663 | 37.8 | 22.95 | 0.938 | 2.8 | 1.7 |
| 14 | 253.6 | 13.132 | 39.2 | 23.8 | 0.938 | 2.8 | 1.7 |
| 15 | 253.6 | 14.07 | 42 | 25.5 | 0.938 | 2.8 | 1.7 |
| 16 | 253.6 | 15.008 | 44.8 | 27.2 | 0.938 | 2.8 | 1.7 |
| 18 | 253.6 | 16.884 | 50.4 | 30.6 | 0.938 | 2.8 | 1.7 |
| 20 | 253.6 | 18.76 | 56 | 34 | 0.938 | 2.8 | 1.7 |
| 21 | 253.6 | 19.698 | 58.8 | 35.7 | 0.938 | 2.8 | 1.7 |
| 22 | 253.6 | 20.636 | 61.6 | 37.4 | 0.938 | 2.8 | 1.7 |
| 24 | 253.6 | 22.512 | 67.2 | 40.8 | 0.938 | 2.8 | 1.7 |
| 29 | 253.6 | 27.202 | 81.2 | 49.3 | 0.938 | 2.8 | 1.7 |
| 33 | 253.6 | 30.954 | 92.4 | 56.1 | 0.938 | 2.8 | 1.7 |
| 35 | 253.6 | 32.83 | 98 | 59.5 | 0.938 | 2.8 | 1.7 |
| 40 | 253.6 | 37.52 | 112 | 68 | 0.938 | 2.8 | 1.7 |
| 45 | 253.6 | 42.21 | 126 | 76.5 | 0.938 | 2.8 | 1.7 |
| 48 | 253.6 | 45.024 | 134.4 | 81.6 | 0.938 | 2.8 | 1.7 |
| 50 | 253.6 | 46.9 | 140 | 85 | 0.938 | 2.8 | 1.7 |

TABLE 4

| Second Ellipse E2 Embodiments | | | | | | | |
|---|---|---|---|---|---|---|---|
| D (ft) | θ (deg) | EORL (ft) | 2MajAL (ft) | 2MinAL (ft) | EORL/D | 2MajAL/D | 2MinAL/D |
| 2 | 248.8 | 2.102 | 3.72 | 3.12 | 1.051 | 1.86 | 1.56 |
| 3 | 248.8 | 3.153 | 5.58 | 4.68 | 1.051 | 1.86 | 1.56 |
| 4 | 248.8 | 4.204 | 7.44 | 6.24 | 1.051 | 1.86 | 1.56 |
| 5 | 248.8 | 5.255 | 9.3 | 7.8 | 1.051 | 1.86 | 1.56 |
| 6 | 248.8 | 6.306 | 11.16 | 9.36 | 1.051 | 1.86 | 1.56 |
| 7 | 248.8 | 7.357 | 13.02 | 10.92 | 1.051 | 1.86 | 1.56 |
| 8 | 248.8 | 8.408 | 14.88 | 12.48 | 1.051 | 1.86 | 1.56 |
| 9 | 248.8 | 9.459 | 16.74 | 14.04 | 1.051 | 1.86 | 1.56 |
| 10 | 248.8 | 10.51 | 18.6 | 15.6 | 1.051 | 1.86 | 1.56 |
| 11 | 248.8 | 11.561 | 20.46 | 17.16 | 1.051 | 1.86 | 1.56 |
| 12 | 248.8 | 12.612 | 22.32 | 18.72 | 1.051 | 1.86 | 1.56 |
| 12.5 | 248.8 | 13.1375 | 23.25 | 19.5 | 1.051 | 1.86 | 1.56 |
| 13 | 248.8 | 13.663 | 24.18 | 20.28 | 1.051 | 1.86 | 1.56 |
| 13.5 | 248.8 | 14.1885 | 25.11 | 21.06 | 1.051 | 1.86 | 1.56 |
| 14 | 248.8 | 14.714 | 26.04 | 21.84 | 1.051 | 1.86 | 1.56 |
| 15 | 248.8 | 15.765 | 27.9 | 23.4 | 1.051 | 1.86 | 1.56 |
| 16 | 248.8 | 16.816 | 29.76 | 24.96 | 1.051 | 1.86 | 1.56 |
| 18 | 248.8 | 18.918 | 33.48 | 28.08 | 1.051 | 1.86 | 1.56 |
| 20 | 248.8 | 21.02 | 37.2 | 31.2 | 1.051 | 1.86 | 1.56 |
| 21 | 248.8 | 22.071 | 39.06 | 32.76 | 1.051 | 1.86 | 1.56 |
| 22 | 248.8 | 23.122 | 40.92 | 34.32 | 1.051 | 1.86 | 1.56 |
| 24 | 248.8 | 25.224 | 44.64 | 37.44 | 1.051 | 1.86 | 1.56 |
| 29 | 248.8 | 30.479 | 53.94 | 45.24 | 1.051 | 1.86 | 1.56 |
| 33 | 248.8 | 34.683 | 61.38 | 51.48 | 1.051 | 1.86 | 1.56 |
| 35 | 248.8 | 36.785 | 65.1 | 54.6 | 1.051 | 1.86 | 1.56 |
| 40 | 248.8 | 42.04 | 74.4 | 62.4 | 1.051 | 1.86 | 1.56 |
| 45 | 248.8 | 47.295 | 83.7 | 70.2 | 1.051 | 1.86 | 1.56 |
| 48 | 248.8 | 50.448 | 89.28 | 74.88 | 1.051 | 1.86 | 1.56 |
| 50 | 248.8 | 52.55 | 93 | 78 | 1.051 | 1.86 | 1.56 |

TABLE 5

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 2 | 239.6 | 1.74 | 2.8 | 1.8 | 0.87 | 1.4 | 0.9 |
| 3 | 239.6 | 2.61 | 4.2 | 2.7 | 0.87 | 1.4 | 0.9 |
| 4 | 239.6 | 3.48 | 5.6 | 3.6 | 0.87 | 1.4 | 0.9 |
| 5 | 239.6 | 4.35 | 7 | 4.5 | 0.87 | 1.4 | 0.9 |
| 6 | 239.6 | 5.22 | 8.4 | 5.4 | 0.87 | 1.4 | 0.9 |
| 7 | 239.6 | 6.09 | 9.8 | 6.3 | 0.87 | 1.4 | 0.9 |
| 8 | 239.6 | 6.96 | 11.2 | 7.2 | 0.87 | 1.4 | 0.9 |
| 9 | 239.6 | 7.83 | 12.6 | 8.1 | 0.87 | 1.4 | 0.9 |
| 10 | 239.6 | 8.7 | 14 | 9 | 0.87 | 1.4 | 0.9 |
| 11 | 239.6 | 9.57 | 15.4 | 9.9 | 0.87 | 1.4 | 0.9 |
| 12 | 239.6 | 10.44 | 16.8 | 10.8 | 0.87 | 1.4 | 0.9 |
| 12.5 | 239.6 | 10.875 | 17.5 | 11.25 | 0.87 | 1.4 | 0.9 |
| 13 | 239.6 | 11.31 | 18.2 | 11.7 | 0.87 | 1.4 | 0.9 |
| 13.5 | 239.6 | 11.745 | 18.9 | 12.15 | 0.87 | 1.4 | 0.9 |
| 14 | 239.6 | 12.18 | 19.6 | 12.6 | 0.87 | 1.4 | 0.9 |
| 15 | 239.6 | 13.05 | 21 | 13.5 | 0.87 | 1.4 | 0.9 |
| 16 | 239.6 | 13.92 | 22.4 | 14.4 | 0.87 | 1.4 | 0.9 |
| 18 | 239.6 | 15.66 | 25.2 | 16.2 | 0.87 | 1.4 | 0.9 |
| 20 | 239.6 | 17.4 | 28 | 18 | 0.87 | 1.4 | 0.9 |
| 21 | 239.6 | 18.27 | 29.4 | 18.9 | 0.87 | 1.4 | 0.9 |
| 22 | 239.6 | 19.14 | 30.8 | 19.8 | 0.87 | 1.4 | 0.9 |
| 24 | 239.6 | 20.88 | 33.6 | 21.6 | 0.87 | 1.4 | 0.9 |
| 29 | 239.6 | 25.23 | 40.6 | 26.1 | 0.87 | 1.4 | 0.9 |
| 33 | 239.6 | 28.71 | 46.2 | 29.7 | 0.87 | 1.4 | 0.9 |
| 35 | 239.6 | 30.45 | 49 | 31.5 | 0.87 | 1.4 | 0.9 |
| 40 | 239.6 | 34.8 | 56 | 36 | 0.87 | 1.4 | 0.9 |
| 45 | 239.6 | 39.15 | 63 | 40.5 | 0.87 | 1.4 | 0.9 |
| 48 | 239.6 | 41.76 | 67.2 | 43.2 | 0.87 | 1.4 | 0.9 |
| 50 | 239.6 | 43.5 | 70 | 45 | 0.87 | 1.4 | 0.9 |

TABLE 6

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 2 | 235.7 | 1.526 | 1.88 | 0.88 | 0.763 | 0.94 | 0.44 |
| 3 | 235.7 | 2.289 | 2.82 | 1.32 | 0.763 | 0.94 | 0.44 |
| 4 | 235.7 | 3.052 | 3.76 | 1.76 | 0.763 | 0.94 | 0.44 |
| 5 | 235.7 | 3.815 | 4.7 | 2.2 | 0.763 | 0.94 | 0.44 |
| 6 | 235.7 | 4.578 | 5.64 | 2.64 | 0.763 | 0.94 | 0.44 |
| 7 | 235.7 | 5.341 | 6.58 | 3.08 | 0.763 | 0.94 | 0.44 |
| 8 | 235.7 | 6.104 | 7.52 | 3.52 | 0.763 | 0.94 | 0.44 |
| 9 | 235.7 | 6.867 | 8.46 | 3.96 | 0.763 | 0.94 | 0.44 |
| 10 | 235.7 | 7.63 | 9.4 | 4.4 | 0.763 | 0.94 | 0.44 |
| 11 | 235.7 | 8.393 | 10.34 | 4.84 | 0.763 | 0.94 | 0.44 |
| 12 | 235.7 | 9.156 | 11.28 | 5.28 | 0.763 | 0.94 | 0.44 |
| 12.5 | 235.7 | 9.5375 | 11.75 | 5.5 | 0.763 | 0.94 | 0.44 |
| 13 | 235.7 | 9.919 | 12.22 | 5.72 | 0.763 | 0.94 | 0.44 |
| 13.5 | 235.7 | 10.3005 | 12.69 | 5.94 | 0.763 | 0.94 | 0.44 |
| 14 | 235.7 | 10.682 | 13.16 | 6.16 | 0.763 | 0.94 | 0.44 |
| 15 | 235.7 | 11.445 | 14.1 | 6.6 | 0.763 | 0.94 | 0.44 |
| 16 | 235.7 | 12.208 | 15.04 | 7.04 | 0.763 | 0.94 | 0.44 |
| 18 | 235.7 | 13.734 | 16.92 | 7.92 | 0.763 | 0.94 | 0.44 |
| 20 | 235.7 | 15.26 | 18.8 | 8.8 | 0.763 | 0.94 | 0.44 |
| 21 | 235.7 | 16.023 | 19.74 | 9.24 | 0.763 | 0.94 | 0.44 |
| 22 | 235.7 | 16.786 | 20.68 | 9.68 | 0.763 | 0.94 | 0.44 |
| 24 | 235.7 | 18.312 | 22.56 | 10.56 | 0.763 | 0.94 | 0.44 |
| 29 | 235.7 | 22.127 | 27.26 | 12.76 | 0.763 | 0.94 | 0.44 |
| 33 | 235.7 | 25.179 | 31.02 | 14.52 | 0.763 | 0.94 | 0.44 |
| 35 | 235.7 | 26.705 | 32.9 | 15.4 | 0.763 | 0.94 | 0.44 |
| 40 | 235.7 | 30.52 | 37.6 | 17.6 | 0.763 | 0.94 | 0.44 |
| 45 | 235.7 | 34.335 | 42.3 | 19.8 | 0.763 | 0.94 | 0.44 |
| 48 | 235.7 | 36.624 | 45.12 | 21.12 | 0.763 | 0.94 | 0.44 |
| 50 | 235.7 | 38.15 | 47 | 22 | 0.763 | 0.94 | 0.44 |

Figure 8:
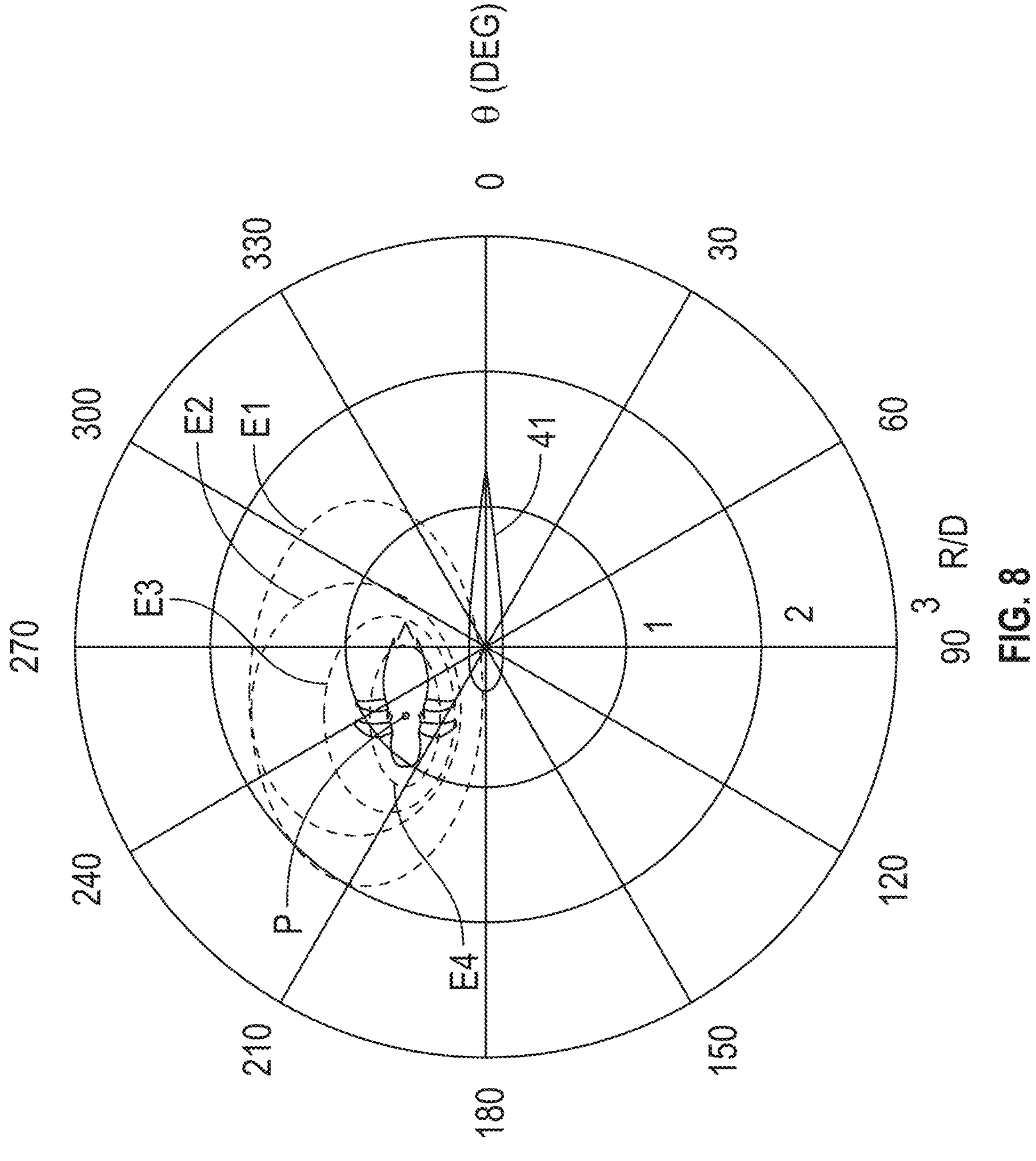
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.

Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section (again, for purposes of explanation, this chord line may be thought of as an axis passing through θ=0 deg and θ=180 deg in FIG. 11) for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

According to the foregoing examples or embodiments, the unducted fan propulsor 38, incorporating the vane assembly described herein, can be incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9. A propulsor that is part of an airplane that operates at a high cruise flight Mach number (e.g., greater than 0.7) encounters velocities near the surfaces of the rotor, vanes, and nacelle that approach or exceed the speed of sound, or Mach 1.0. In general, friction drag increases roughly in proportion to the square of the air velocity. However, as the Mach number increases, a significant contributor to the increase in drag can come from wave drag. Wave drag is a drag resulting from shock waves that form as the flow of air near a surface becomes supersonic (e.g., Mach>1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on the rotor, vanes, and nacelle.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, $\rho_0$ is ambient air density, $V_o$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there may be a particularly beneficial range of a dimensionless cruise fan net thrust parameter normalized by ambient density, cruise flight speed squared, and fan stream tube annular area at fan inlet defined by the following expression:

$$0.15 > \frac{F_{net}}{\rho_0 A_{an} V_0^2} > 0.06$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors wing. While the mounting configuration can be fixed, it is contemplated that the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or any other operating condition.

Described below are unducted fan propulsors 100 and 200 (referred to as engines 100 and 200), which can be mounted to an aircraft as described above with respect to unducted fan propulsor 38.

Referring now to the drawings, FIG. 12 is an exemplary embodiment of an engine 100 including a gear assembly 102 according to aspects of the present disclosure. The engine 100 includes a fan assembly 104 driven by a core engine 106. In various embodiments, the core engine 106 is a Brayton cycle system configured to drive the fan assembly 104. The core engine 106 is shrouded, at least in part, by an outer casing 114. The fan assembly 104 includes a plurality of fan blades 108. A vane assembly 110 extends from the outer casing 114 in a cantilevered manner. Thus, the vane assembly 110 can also be referred to as an unducted vane assembly. The vane assembly 110, including a plurality of stationary outlet guide vanes 112, is positioned in operable arrangement with the fan blades 108 to provide thrust, control thrust vector, abate or re-direct undesired acoustic noise, and/or otherwise desirably alter a flow of air relative to the fan blades 108.

In some embodiments, the fan assembly 104 includes eight (8) to twenty (20) fan blades 108 (which can also be referred to as "propulsor blades"). In particular embodiments, the fan assembly 104 includes ten (10) to eighteen (18) fan blades 108. In certain embodiments, the fan assembly 104 includes twelve (12) to sixteen (16) fan blades 108. In some embodiments, the vane assembly 110 includes three (3) to thirty (30) vanes 112. In certain embodiments, the vane assembly 110 includes an equal or fewer quantity of vanes 112 to fan blades 108. For example, in particular embodiments, the engine 100 includes twelve (12) fan blades 108 and ten (10) vanes 112. In other embodiments, the vane assembly 110 includes a greater quantity of vanes 112 to fan blades 108. For example, in particular embodiments, the engine 100 includes ten (10) fan blades 108 and twenty-three (23) vanes 112.

In certain embodiments, such as depicted in FIG. 12, the vane assembly 110 is positioned downstream or aft of the fan assembly 104. However, it should be appreciated that in some embodiments, the vane assembly 110 may be positioned upstream or forward of the fan assembly 104. In still various embodiments, the engine 100 may include a first vane assembly positioned forward of the fan assembly 104 and a second vane assembly positioned aft of the fan assembly 104. The fan assembly 104 may be configured to desirably adjust pitch at one or more fan blades 108, such as to control thrust vector, abate or re-direct noise, and/or alter thrust output. The vane assembly 110 may be configured to desirably adjust pitch at one or more vanes 112, such as to control thrust vector, abate or re-direct noise, and/or alter thrust output. Pitch control mechanisms at one or both of the fan assembly 104 or the vane assembly 110 may co-operate to produce one or more desired effects described above.

In certain embodiments, such as depicted in FIG. 12, the engine 100 is an un-ducted thrust producing system, such that the plurality of fan blades 108 is unshrouded by a nacelle or fan casing. As such, in various embodiments, the engine 100 may be configured as an unshrouded turbofan engine, an open rotor engine, or a propfan engine. In particular embodiments, the engine 100 is an unducted rotor engine with a single row of fan blades 108. The fan blades 108 can have a large diameter, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally higher cruise speed than aircraft with turboprop engines), and/or relatively low rotational speeds.

The fan blades 108 comprise a diameter ($D_{fan}$). It should be noted that for purposes of illustration only half of the $D_{fan}$ is shown (i.e., the radius of the fan). The fan tip diameter ($D_{fan}$) can be within a range of 8-20 feet. For example, in some embodiments, the $D_{fan}$ is 10-16 feet. In particular embodiments the $D_{fan}$ is 11-14 feet. In certain embodiments, the $D_{fan}$ is 12-13 feet.

In some embodiments, the fan blade tip speed at a cruise flight condition can be 500 to 900 feet per second (fps), or 700 to 800 fps. The fan can rotate at 400-1200 rpm (or 450-1000 rpm) at a cruise flight condition. A fan pressure ratio (FPR) for the fan assembly 104 can be 1.04 to 1.10, or in some embodiments 1.05 to 1.08, as measured across the fan blades at a cruise flight condition.

The fans disclosed herein can comprise a solidity. Solidity is based on average blade chord defined as the blade planform area (surface area on one side of a blade) divided by the blade radial span. The solidity is directly proportional to the number of blades and chord length and inversely proportional to the diameter. For purposes of this disclosure, solidity is equal to the average blade chord (C) times the number of fan blades (N) divided by the product of two (2) times pi ($\pi$) times a reference radius (R_ref), which herein is a radius equal to 0.75 times a tip radius of a rotor blade (Rt) (i.e., $C \times N/(2 \times \pi \times R\_ref)$). Using this formula, a fan can comprise a solidity between 0.5 and 1.0, or more particularly between 0.6 and 1. In other examples, a fan can comprise a solidity between 1.1 and 1.5, or 1.1-1.3 in certain examples.

Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft. and approximately 45,000 ft. In certain embodiments, a cruise speed is within a range of about 0.6-0.9 Mach (or optionally about 0.7-0.9 Mach). In certain embodiments, cruise altitude is expressed in flight levels (FL) based on a standard air pressure at sea level, in which a cruise flight condition is between FL280 and FL650. In another embodiment, cruise flight condition is between FL280 and FL450. In certain embodiments, cruise altitude is defined based at least on a barometric pressure, in which cruise altitude is between approximately 4.85 psia and approximately 0.82 psia based on a sea-level pressure of approximately 14.70 psia and sea-level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea-level pressure and/or sea-level temperature.

The core engine 106 is generally encased in outer casing 114 defining one half of a core diameter ($D_{core}$), which may be thought of as the maximum extent from the centerline axis (datum for R). In certain embodiments, the engine 100 includes a length (L) from a longitudinally (or axial) forward end 116 to a longitudinally aft end 118. In various embodiments, the engine 100 defines a ratio of $L/D_{core}$ that provides for reduced installed drag. In one embodiment, $L/D_{core}$ is at least 2. In another embodiment, $L/D_{core}$ is at least 2.5. In some embodiments, the $L/D_{core}$ is less than 5, less than 4, and less than 3. In various embodiments, it should be appreciated that the $L/D_{core}$ is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the $L/D_{core}$, the fan assembly 104, and/or the vane assembly 110 separately or together configure, at least in part, the engine 100 to operate at a maximum cruise altitude operating speed between approximately Mach 0.55 and approximately Mach 0.85; or between approximately 0.72 to 0.85 or between approximately 0.75 to 0.85. For example, the engine 100 can be configured to operate at a maximum cruise altitude operating speed between approximately Mach 0.6 and approximately Mach 0.9.

Referring still to FIG. 12, the core engine 106 extends in a radial direction (R) relative to an engine centerline axis 120. The gear assembly 102 receives power or torque from the core engine 106 through a power input source 122 and provides power or torque to drive the fan assembly 104, in a circumferential direction C about the engine centerline axis 120, through a power output source 124.

The gear assembly 102 of the engine 100 can include a plurality of gears, including an input and an output. The gear assembly can also include one or more intermediate gears disposed between and/or interconnecting the input and the output. The input can be coupled to a turbine section of the core engine 106 and can comprise a first rotational speed. The output can be coupled to the fan assembly and can have a second rotational speed. In some embodiments, a gear ratio of the first rotational speed to the second rotational speed is greater than 4.1 (e.g., within a range of 4.1-14.0).

The gear assembly 102 (which can also be referred to as "a gearbox") can comprise various types and/or configuration. For example, in some embodiments, the gearbox is an epicyclic gearbox configured in a star gear configuration. Star gear configurations comprise a sun gear, a plurality of star gears (which can also be referred to as "planet gears"), and a ring gear. The sun gear is the input and is coupled to the power turbine (e.g., the low-pressure turbine) such that the sun gear and the power turbine rotate at the same rotational speed. The star gears are disposed between and interconnect the sun gear and the ring gear. The star gears are rotatably coupled to a fixed carrier. As such, the star gears can rotate about their respective axes but cannot collectively orbit relative to the sun gear or the ring gear. As another example, the gearbox is an epicyclic gearbox configured in a planet gear configuration. Planet gear configurations comprise a sun gear, a plurality of planet gears, and a ring gear. The sun gear is the input and is coupled to the power turbine. The planet gears are disposed between and interconnect the sun gear and the ring gear. The planet gears are rotatably coupled to a rotatable carrier. As such, the planet gears can rotate about their respective axes and also collectively rotate together with the carrier relative to the sun gear and the ring gear. The carrier is the output and is coupled to the fan assembly. The ring gear is fixed from rotation.

Figure 14:
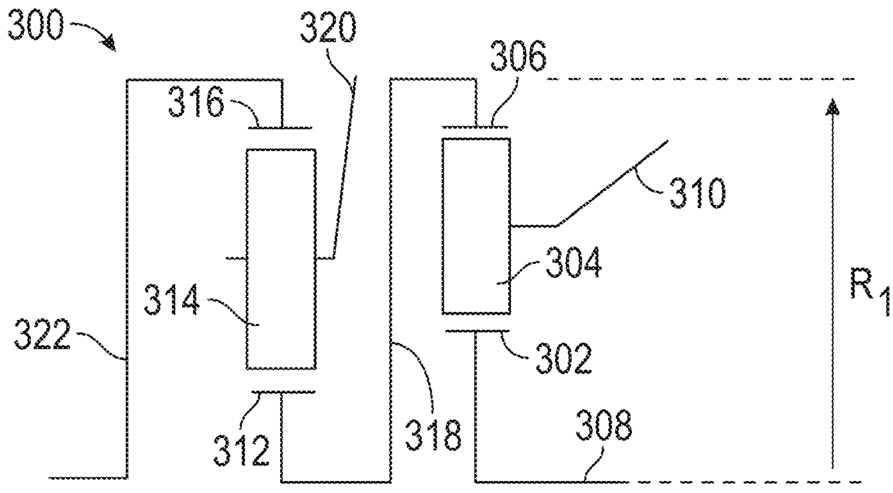
FIG. 14 is a cross-sectional schematic illustration of an exemplary embodiment of a gearbox configuration for an unducted fan propulsor.
Figure 15:
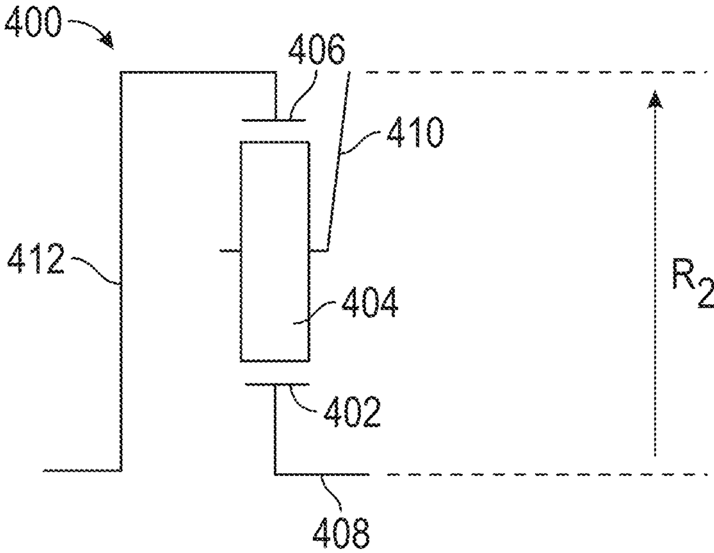
FIG. 15 is a cross-sectional schematic illustration of an exemplary embodiment of a gearbox configuration for an unducted fan propulsor.
Figure 16:
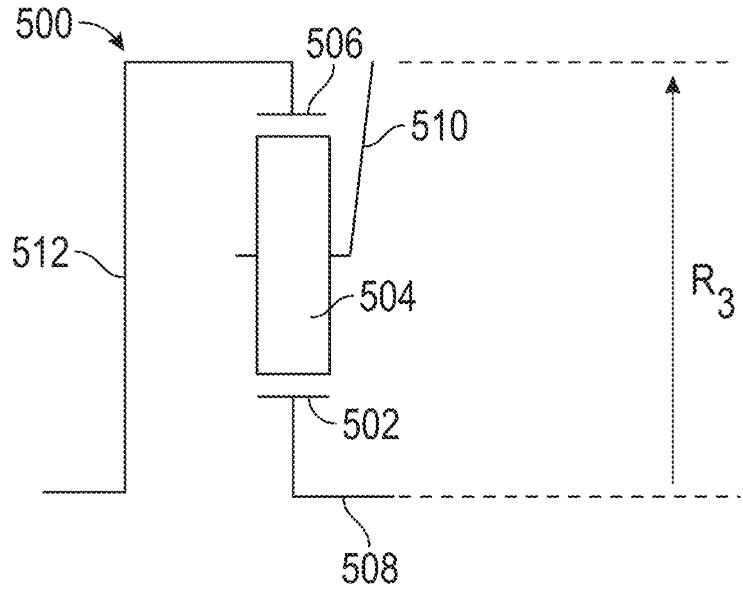
FIG. 16 is a cross-sectional schematic illustration of an exemplary embodiment of a gearbox configuration for an unducted fan propulsor.

In some embodiments, the gearbox is a single-stage gearbox (e.g., FIGS. 15-16). In other embodiments, the gearbox is a multi-stage gearbox (e.g., FIGS. 14 and 17). In some embodiments, the gearbox is an epicyclic gearbox. In some embodiments, the gearbox is a non-epicyclic gearbox (e.g., a compound gearbox-FIG. 18).

As noted above, the gear assembly can be used to reduce the rotational speed of the output relative to the input. In some embodiments, a gear ratio of the input rotational speed to the output rotational speed is greater than 4.1. For example, in particular embodiments, the gear ratio is within a range of 4.1-14.0, within a range of 4.5-14.0, or within a range of 6.0-14.0. In certain embodiments, the gear ratio is within a range of 4.5-12 or within a range of 6.0-11.0. As such, in some embodiments, the fan assembly can be configured to rotate at a rotational speed of 400-1500 rpm at a cruise flight condition, while the power turbine (e.g., the low-pressure turbine) is configured to rotate at a rotational speed of 2,500-15,000 rpm at a cruise flight condition. In particular embodiments, the fan assembly can be configured to rotate at a rotational speed of 450-1200 rpm at a cruise flight condition, while the power turbine is configured to rotate at a rotational speed of 5,000-10,000 rpm at a cruise flight condition.

Various gear assembly configurations are depicted schematically in FIGS. 14-18. These gearboxes can be used any of the engines disclosed herein, including the engine 100. Additional details regarding the gearboxes are provided below.

FIG. 13 shows a cross-sectional view of an engine 200, which is configured as an exemplary embodiment of an open rotor propulsion engine. The engine 200 is generally similar to the engine 100 and corresponding components have been numbered similarly. For example, the gear assembly of the engine 100 is numbered "102" and the gear assembly of the engine 200 is numbered "202," and so forth. In addition to the gear assembly 202, the engine 200 comprises a fan assembly 204 that includes a plurality of fan blades 208 distributed around the engine centerline axis 220. Fan blades 208, in some instances, are circumferentially arranged in an equally spaced relation around the engine centerline axis 220, and each fan blade 208 has a root 225 and a tip 226, and an axial span defined therebetween, as well as a central blade axis 228. In other instances, the fan blades can be non-equally spaced.

The core engine 206 includes a compressor section 230, a combustion section 232, and a turbine section 234 (which may be referred to as "an expansion section") together in a serial flow arrangement. The core engine 206 extends circumferentially relative to an engine centerline axis 220. The core engine 206 includes a high-speed spool that includes a high-pressure compressor 236 and a high-pressure turbine 238 operably rotatably coupled together by a high-speed shaft 240. The combustion section 232 is positioned between the high-pressure compressor 236 and the high-pressure turbine 238.

The combustion section 232 may be configured as a deflagrative combustion section, a rotating detonation combustion section, a pulse detonation combustion section, and/or other appropriate heat addition system. The combustion section 232 may be configured as one or more of a rich-burn system or a lean-burn system, or combinations thereof. In still various embodiments, the combustion section 232 includes an annular combustor, a can combustor, a cannular combustor, a trapped vortex combustor (TVC), or other appropriate combustion system, or combinations thereof.

The core engine 206 also includes a booster or low-pressure compressor positioned in flow relationship with the high-pressure compressor 236. The low-pressure compressor 242 is rotatably coupled with the low-pressure turbine 244 via a low-speed shaft 246 to enable the low-pressure turbine 244 to drive the low-pressure compressor 242. The low-speed shaft 246 is also operably connected to the gear assembly 202 to provide power to the fan assembly 204, such as described further herein.

It should be appreciated that the terms "low" and "high," or their respective comparative degrees (e.g., "lower" and "higher", where applicable), when used with compressor, turbine, shaft, or spool components, each refer to relative pressures and/or relative speeds within an engine unless otherwise specified. For example, a "low spool" or "low-speed shaft" defines a component configured to operate at a rotational speed, such as a maximum allowable rotational speed, lower than a "high spool" or "high-speed shaft" of the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed turbine within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

The compressors and/or turbines disclosed herein can include various stage counts. As disclosed herein the stage count includes the number of rotors or blade stages in a particular component (e.g., a compressor or turbine). For example, in some embodiments, a low-pressure compressor can comprise 1-8 stages, a high-pressure compressor can comprise 8-15 stages, a high-pressure turbine comprises 1-2 stages, and/or a low-pressure turbine comprises 3-8 stages (or optionally 4-8 LPT stages, or optionally 4-6 LPT stages). For example, in certain embodiments, an engine can comprise a one stage low-pressure compressor, an 11 stage high-pressure compressor, a two stage high-pressure compressor, and a 7 stage low-pressure turbine. As another example, an engine can comprise a three stage low-pressure compressor, a 10 stage high-pressure compressor, a two stage high-pressure compressor, and a 7 stage low-pressure turbine. As yet another example, an engine can comprise a three stage low-pressure compressor, a 10 stage high-pressure compressor, a two stage high-pressure compressor, and a 4 stage low-pressure turbine.

In some embodiments, a low-pressure turbine is a counter-rotating low-pressure turbine comprising inner blade stages and outer blade stages. The inner blade stages extend radially outwardly from an inner shaft, and the outer blade stages extend radially inwardly from an outer drum. In particular embodiments, the counter-rotating low-pressure turbine comprises three inner blade stages and three outer blade stages, which can collectively be referred to as a six stage low-pressure turbine. In other embodiments, the counter-rotating low-pressure turbine comprises four inner blade stages and three outer blade stages, which can be collectively be referred to as a seven stage low-pressure turbine.

As discussed in more detail below, the core engine 206 includes the gear assembly 202 that is configured to transfer power from the turbine section 234 and reduce an output rotational speed at the fan assembly 204 relative to the low-pressure turbine 244. Embodiments of the gear assembly 202 depicted and described herein can allow for gear ratios suitable for large-diameter unducted fans (e.g., gear ratios of 4.1-14.0, 4.5-14.0, and/or 6.0-14.0). Additionally, embodiments of the gear assembly 202 provided herein may be suitable within the radial or diametrical constraints of the core engine 206 within the outer casing 214.

Various gearbox configurations are depicted schematically in FIGS. 14-18. These gearboxes can be used in any of the engines disclosed herein, including the engine 200. Additional details regarding the gearboxes are provided below.

Engine 200 also includes a vane assembly 210 comprising a plurality of vanes 212 disposed around engine centerline axis 220. Each vane 212 has a root 248 and a tip 250, and a span defined therebetween. Vanes 212 can be arranged in a variety of manners. In some embodiments, for example, they are not all equidistant from the rotating assembly.

In some embodiments, vanes 212 are mounted to a stationary frame and do not rotate relative to the engine centerline axis 220, but may include a mechanism for adjusting their orientation relative to their axis 254 and/or relative to the fan blades 208. For reference purposes, FIG. 13 depicts a forward direction denoted with arrow F, which in turn defines the forward and aft portions of the system.

As depicted in FIG. 13, the fan assembly 204 is located forward of the core engine 106 with the exhaust 256 located aft of core engine 206 in a "puller" configuration. Other configurations are possible and contemplated as within the scope of the present disclosure, such as what may be termed a "pusher" configuration embodiment where the engine core is located forward of the fan assembly. The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

Left- or right-handed engine configurations, useful for certain installations in reducing the impact of multi-engine torque upon an aircraft, can be achieved by mirroring the airfoils (e.g., 208, 212) such that the fan assembly 204 rotates clockwise for one propulsion system and counter-clockwise for the other propulsion system. Alternatively, an optional reversing gearbox can be provided to permits a common gas turbine core and low-pressure turbine to be used to rotate the fan blades either clockwise or counter-clockwise, i.e., to provide either left- or right-handed configurations, as desired, such as to provide a pair of oppositely-rotating engine assemblies can be provided for certain aircraft installations while eliminating the need to have internal engine parts designed for opposite rotation directions.

The engine 200 also includes the gear assembly 202 which includes a gear set for decreasing the rotational speed of the fan assembly 204 relative to the low-pressure turbine 244. In operation, the rotating fan blades 208 are driven by the low-pressure turbine 244 via gear assembly 202 such that the fan blades 208 rotate around the engine centerline axis 220 and generate thrust to propel the engine 200, and hence an aircraft on which it is mounted, in the forward direction F.

In some embodiments, a gear ratio of the input rotational speed to the output rotational speed is greater than 4.1. For example, in particular embodiments, the gear ratio is within a range of 4.1-14.0, within a range of 4.5-14.0, or within a range of 6.0-14.0. In certain embodiments, the gear ratio is within a range of 4.5-12 or within a range of 6.0-11.0. As such, in some embodiments, the fan assembly can be configured to rotate at a rotational speed of 400-1500 rpm at a cruise flight condition, while the power turbine (e.g., the low-pressure turbine) is configured to rotate at a rotational speed of 5,000-10,000 rpm at a cruise flight condition. In particular embodiments, the fan assembly can be configured to rotate at a rotational speed of 450-1200 rpm at a cruise flight condition, while the power turbine is configured to rotate at a rotational speed of 5,500-9,500 rpm a cruise flight condition.

It may be desirable that either or both of the fan blades 208 or the vanes 212 to incorporate a pitch change mechanism such that the blades can be rotated with respect to an axis of pitch rotation (annotated as 228 and 254, respectively) either independently or in conjunction with one another. Such pitch change can be utilized to vary thrust and/or swirl effects under various operating conditions, including to provide a thrust reversing feature which may be useful in certain operating conditions such as upon landing an aircraft.

Vanes 212 can be sized, shaped, and configured to impart a counteracting swirl to the fluid so that in a downstream direction aft of both fan blades 208 and vanes 212 the fluid has a greatly reduced degree of swirl, which translates to an increased level of induced efficiency. Vanes 212 may have a shorter span than fan blades 208, as shown in FIG. 13. For example, vanes 212 may have a span that is at least 50% of a span of fan blades 208. In some embodiments, the span of the vanes can be the same or longer than the span as fan blades 208, if desired. Vanes 212 may be attached to an aircraft structure associated with the engine 200, as shown in FIG. 13, or another aircraft structure such as a wing, pylon, or fuselage. Vanes 212 may be fewer or greater in number than, or the same in number as, the number of fan blades 208. In some embodiments, the number of vanes 212 are greater than two, or greater than four, in number. Fan blades 208 may be sized, shaped, and contoured with the desired blade loading in mind.

In the embodiment shown in FIG. 13, an annular 360-degree inlet 258 is located between the fan assembly 204 and the vane assembly 210, and provides a path for incoming atmospheric air to enter the core engine 206 radially inwardly of at least a portion of the vane assembly 210. Such a location may be advantageous for a variety of reasons, including management of icing performance as well as protecting the inlet 258 from various objects and materials as may be encountered in operation.

In the exemplary embodiment of FIG. 13, in addition to the open rotor or unducted fan assembly 204 with its plurality of fan blades 208, an optional ducted fan assembly 260 is included behind fan assembly 204, such that the engine 200 includes both a ducted and an unducted fan which both serve to generate thrust through the movement of air at atmospheric temperature without passage through the core engine 206. The ducted fan assembly 260 is shown at about the same axial location as the vane 212, and radially inward of the root 248 of the vane 212. Alternatively, the ducted fan assembly 260 may be between the vane 212 and core duct 262, or be farther forward of the vane 212. The ducted fan assembly 260 may be driven by the low-pressure turbine 244, or by any other suitable source of rotation, and may serve as the first stage of the low-pressure compressor 242 or may be operated separately. Air entering the inlet 258 flows through an inlet duct 264 and then is divided such that a portion flows through a core duct 262 and a portion flows through a fan duct 266. Fan duct 266 may incorporate one or more heat exchangers 268 and exhausts to the atmosphere through an independent fixed or variable nozzle 270 aft of the vane assembly 210, at the aft end of the fan cowl 252 and outside of the engine core cowl 272. Air flowing through the fan duct 266 thus "bypasses" the core of the engine and does not pass through the core.

Thus, in the exemplary embodiment, engine 200 includes an unducted fan formed by the fan blades 208, followed by the ducted fan assembly 260, which directs airflow into two concentric or non-concentric ducts 262 and 266, thereby forming a "three-stream engine architecture" with three paths for air which passes through the fan assembly 204. The "first stream" of the engine 200 comprises airflow that passes through the vane assembly 210 and/or outside the fan cowl 252. As such, the first stream can be referred to as "the bypass stream" since the airflow of the first stream does not pass through the core duct 262. The first stream produces the majority of the thrust of the engine 200 and can thus also be referred to as "the primary propulsion stream." The "second stream" of the engine 200 comprises the airflow that flows into the inlet 258, through the inlet duct 264, through the core duct 262, and exits the core nozzle 278. In this manner, the second stream can be referred to as "the core stream." The "third stream" of the engine 200 comprises the airflow that flows into the inlet 258, through the inlet duct 264, through the fan duct 266, and exits the nozzle 270.

A "third stream" as used herein means a secondary air stream capable of increasing fluid energy to produce a minority of the total thrust of an engine (e.g., the engine 200). Accordingly, in various embodiments, the fan duct 266, having the one or heat exchangers 268 located within the flowpath of the fan duct 266, may be referred to as the "third-stream" of the three-stream engine architecture.

The pressure ratio of the third stream is higher than that of the primary propulsion stream (i.e., the bypass stream). This thrust is produced through a dedicated nozzle (e.g., the nozzle 270) or through mixing of the third stream with a fan stream or a core stream (e.g., into a common nozzle). In certain exemplary embodiments the operating temperature of an airflow through the third stream is less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures facilitate the heat transfer to or from the fluid in the third stream and a secondary fluid stream. Further, in certain exemplary embodiments, the airflow through the third stream may contribute less than 50% of the total engine thrust (and at least, e.g., 2% of the total engine thrust), and at a takeoff condition, or more particularly while operating at a rated takeoff power at sea level, static flight speed, 86 degree Fahrenheit ambient temperature operating conditions. Furthermore, in certain exemplary embodiments the airstream, mixing, or exhaust properties (and thereby the aforementioned exemplary percent contribution to total thrust) of the third stream may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

In the exemplary embodiment shown in FIG. 13, a slidable, moveable, and/or translatable plug nozzle 274 with an actuator may be included in order to vary the exit area of the nozzle 270. A plug nozzle is typically an annular, symmetrical device which regulates the open area of an exit such as a fan stream or core stream by axial movement of the nozzle such that the gap between the nozzle surface and a stationary structure, such as adjacent walls of a duct, varies in a scheduled fashion thereby reducing or increasing a space for airflow through the duct. Other suitable nozzle designs may be employed as well, including those incorporating thrust reversing functionality. Such an adjustable, moveable nozzle may be designed to operate in concert with other systems such as VBV's, VSV's, or blade pitch mechanisms and may be designed with failure modes such as fully-open, fully-closed, or intermediate positions, so that the nozzle 270 has a consistent "home" position to which it returns in the event of any system failure, which may prevent commands from reaching the nozzle 270 and/or its actuator. In other embodiments, a static nozzle may be utilized.

In some embodiments, a mixing device 276 can be included in a region aft of a core nozzle 278 to aid in mixing the fan stream and the core stream to improve acoustic performance by directing core stream outward and fan stream inward.

Since the engine 200 shown in FIG. 13 includes both an open rotor fan assembly 204, a ducted fan assembly 260, and the third stream, the engine's thrust output and work split can be tailored to achieve specific thrust, fuel burn, thermal management, and/or acoustic signature objectives which may be superior to those of a typical ducted or unducted fan gas turbine propulsion assembly of comparable thrust class.

Operationally, the engine 200 may include a control system that manages the loading of the respective open and ducted fans, as well as potentially the exit area of the variable fan nozzle, to provide different thrust, noise, cooling capacity and other performance characteristics for various portions of the flight envelope and various operational conditions associated with aircraft operation. For example, in climb mode the ducted fan may operate at maximum pressure ratio there-by maximizing the thrust capability of stream, while in cruise mode, the ducted fan may operate a lower pressure ratio, raising overall efficiency through reliance on thrust from the unducted fan. Nozzle actuation modulates the ducted fan operating line and overall engine fan pressure ratio independent of total engine airflow. In other embodiments, loading may be managed using a static nozzle.

As noted above, the third stream (e.g., the fan duct 266) may include one or more heat exchangers 268 for removing heat from various fluids used in engine operation (such as an air-cooled oil cooler (ACOC), cooled cooling air (CCA), etc.). Heat exchangers 268 located in the third stream take advantage of the integration into the fan duct 266 (i.e., the third stream) with reduced performance penalties (such as fuel efficiency and thrust) compared with traditional ducted fan architectures, due to not impacting the primary source of thrust which is, in this case, the unducted fan stream. Heat exchangers may cool fluids such as gearbox oil, engine sump oil, thermal transport fluids such as supercritical fluids or commercially available single-phase or two-phase fluids (supercritical CO2, EGV, Slither 800, liquid metals, etc.), engine bleed air, etc. Heat exchangers may also be made up of different segments or passages that cool different working fluids, such as an ACOC paired with a fuel cooler. Heat exchangers 268 may be incorporated into a thermal management system which provides for thermal transport via a heat exchange fluid flowing through a network to remove heat from a source and transport it to a heat exchanger.

Since the fan pressure ratio associated with the third stream is higher for the ducted fan than for the unducted fan, the third stream may provide an environment where more compact heat exchangers may be utilized than would be possible if installed on the outside of the core cowl in the unducted fan stream. Fan bypass air is at a very low fan pressure ratio (FPR) (1.05 to 1.08), making it difficult to drive air through heat exchangers. Without the availability of a fan duct as described herein, scoops or booster bleed air may be required to provide cooling air to and through heat exchangers.

The third stream can also provide other advantages in terms of reduced nacelle drag, enabling a more aggressive nacelle close-out, improved core stream particle separation, and inclement weather operation. By exhausting the fan duct flow over the core cowl, this aids in energizing the boundary layer and enabling the option of a steeper nacelle close out angle between the maximum dimension of the engine core cowl 272 and the exhaust 256. The close-out angle is normally limited by air flow separation, but boundary layer energization by air from the fan duct 266 exhausting over the core cowl reduces air flow separation. This yields a shorter, lighter structure with less frictional surface drag.

In some embodiments, the net thrust T of the engine is within a range of about 10,000-100,000 pounds force at a max takeoff condition. In particular embodiments, the net thrust T of the engine is within a range of about 12,000-35,000 pounds force at a max takeoff condition.

According to some embodiments there is a turbomachinery engine characterized by a high gear ratio. A high gear ratio gearbox means a gearbox with a gear ratio of above about 4:1 to about 14:1 (or about 4.5:1 to about 12:1 in particular embodiments). For example, the engines disclosed herein can include a gearbox configured such the output speed (i.e., the speed of the propulsor) is about 400-1200 rpm at a cruise flight condition, or more particularly 450-1000 rpm at a cruise flight condition.

Various exemplary gear assemblies are shown and described herein. In particular, FIGS. 14-18 schematically depict several exemplary gear assemblies that can be used with the engines 100, 200. The disclosed gear assemblies may be utilized with any of the exemplary engines and/or any other suitable engine for which such gear assemblies may be desirable. In such a manner, it will be appreciated that the gear assemblies disclosed herein may generally be operable with an engine having a rotating element with a plurality of rotor blades and a turbomachinery having a turbine and a shaft rotatable with the turbine. With such an engine, the rotating element (e.g., fan assembly 104) may be driven by the shaft (e.g., low-speed shaft) of the turbomachinery through the gear assembly.

Although the exemplary gear assemblies shown are mounted at a forward location (e.g., forward from the combustor and/or the low-pressure compressor), in other embodiments, the gear assemblies described herein can be mounted at a aft location (e.g., aft of the combustor and/or the low-pressure turbine).

Various embodiments of the gear assembly provided herein may allow for gear ratios of up to 14:1. Still various embodiments of the gear assemblies provided herein may allow for gear ratios of at least 4.1:1 or 4.5:1. Still yet various embodiments of the gear assemblies provided herein allow for gear ratios of 6:1 to 12:1.

FIG. 14 schematically depicts a gearbox 300 that can be used, for example, engines 100, 200. The gearbox 300 comprises a two-stage star configuration.

The first stage of the gearbox 300 includes a first-stage sun gear 302, a first-stage carrier 304 housing a plurality of first-stage star gears, and a first-stage ring gear 306. The first-stage sun gear 302 can be coupled to a low-speed shaft 308, which in turn is coupled to the low-pressure turbine the engine. The first-stage sun gear 302 can mesh with the first-stage star gears, which mesh with the first-stage ring gear. The first-stage carrier 304 can be fixed from rotation by a support member 310.

The second stage of the gearbox 300 includes a second-stage sun gear 312, a second-stage carrier 314 housing a plurality of second-stage star gears, and a second-stage ring gear 316. The second-stage sun gear 312 can be coupled to a shaft 318 which in turn is coupled to the first-stage ring gear 306. The second-stage carrier 314 can be fixed from rotation by a support member 320. The second-stage ring gear 316 can be coupled to a fan shaft 322.

In some embodiments, each stage of the gearbox 300 can comprise five star gears. In other embodiments, the gearbox 300 can comprise fewer or more than five star gears in each stage. In some embodiments, the first-stage carrier can comprise a different number of star gears than the second-stage carrier. For example, the first-carrier can comprise five star gears, and the second-stage carrier can comprise three star gears, or vice versa.

In some embodiments, the radius $R_1$ of the gearbox 300 can be about 16-19 inches. In other embodiments, the radius $R_1$ of the gearbox 300 can be about 22-24 inches. In other embodiments, the radius $R_1$ of the gearbox 300 can be smaller than 16 inches or larger than 24 inches.

FIG. 15 schematically depicts a gearbox 400 that can be used with the engines disclosed herein. The gearbox 400 comprises a single-stage star configuration. The gearbox 400 includes a sun gear 402, a carrier 404 housing a plurality of star gears (e.g., 3-5 star gears), and a ring gear 406. The sun gear 402 can mesh with the star gears, and the star gears can mesh with the ring gear 406. The sun gear 402 can be coupled to a low-speed shaft 408, which in turn is coupled to the low-pressure turbine of the engine. The carrier 404 can be fixed from rotation by a support member 410. The ring gear 406 can be coupled to a fan shaft 412.

In some embodiments, the radius $R_2$ of the gearbox 400 can be about 18-23 inches. In other embodiments, the radius $R_2$ of the gearbox 400 can be smaller than 18 inches or larger than 23 inches.

FIG. 16 schematically depicts another exemplary gearbox 500. The gearbox 500 comprises a single-stage star configuration. The gearbox 500 includes a sun gear 502, a carrier 504 housing a plurality of star gears (e.g., 3-5 star gears), and a ring gear 506. The sun gear 502 can mesh with the star gears, and the star gears can mesh with the ring gear 506. The sun gear 502 can be coupled to a low-speed shaft 508, which in turn is coupled to the low-pressure turbine of the engine. The carrier 504 can be fixed from rotation by a support member 510. The ring gear 506 can be coupled to a fan shaft 512.

The gearbox 500 can comprise a radius $R_3$. In some embodiments, the radius $R_3$ of the gearbox 500 can be about 10-13 inches. In other embodiments, the radius $R_3$ of the gearbox 500 can be smaller than 10 inches or larger than 13 inches.

Figure 17:
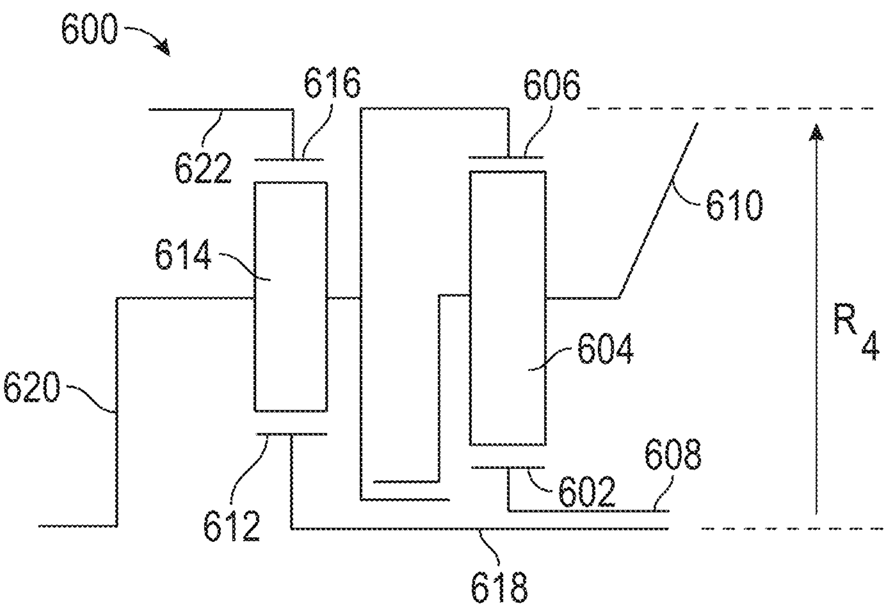
FIG. 17 is a cross-sectional schematic illustration of an exemplary embodiment of a gearbox configuration for an unducted fan propulsor.

FIG. 17 schematically depicts a gearbox 600 that can be used with the engines disclosed herein. The gearbox 600 comprises a two-stage configuration in which the first stage is a star configuration and the second stage is a planet configuration.

The first stage of the gearbox 600 includes a first-stage sun gear 602, a first-stage star carrier 604 comprising a plurality of first-stage star gears (e.g., 3-5 star gears), and a first-stage ring gear 606. The first-stage sun gear 602 can mesh with the first-stage star gears, and the first-stage star gears can mesh with the first-stage ring gear 606. The first-stage sun gear 602 can be coupled to a higher-speed shaft 608 of the low spool, which in turn is coupled to the inner blades of the low-pressure turbine of the engine. The first-stage star carrier 604 can be fixed from rotation by a support member 610.

The second stage of the gearbox 600 includes a second-stage sun gear 612, a second-stage planet carrier 614 comprising a plurality of second-stage planet gears (e.g., 3-5 planet gears), and a second-stage ring gear 616. The second-stage sun gear 612 can mesh with the second-stage planet gears. The second-stage planet carrier 614 can be coupled to the first-stage ring gear 606. The second-stage sun gear 612 can be coupled to a lower-speed shaft 618 of the low spool, which in turn is coupled to the outer blades of the low-pressure turbine of the engine. The second-stage planet carrier 614 can be coupled to the first-stage ring gear 606. The second-stage planet carrier 614 can also be coupled to a fan shaft 620. The second-stage ring gear 616 can be fixed from rotation by a support member 622.

In some embodiments, each stage of the gearbox 600 can comprise three star/planet gears. In other embodiments, the gearbox 600 can comprise fewer or more than three star/planet gears in each stage. In some embodiments, the first-stage carrier can comprise a different number of star gears than the second-stage carrier has planet gears. For example, the first-carrier can comprise five star gears, and the second-stage carrier can comprise three planet gears, or vice versa.

Since the first stage of the gearbox 600 is coupled to the higher-speed shaft 608 of the low spool and the second stage of the gearbox 600 is coupled to the lower-speed shaft 618 of the low spool, the gear ratio of the first stage of the gearbox 600 can be greater than the gear ratio of the second stage of the gearbox. For example, in certain embodiments, the first stage of the gearbox 600 can comprise a gear ratio of 4.1-14, and the second stage of the gearbox 600 can comprise a gear ratio that is less than the gear ratio of the first stage of the gearbox. In particular embodiments, the first stage of the gearbox 600 can comprise a gear ratio of 7, and the second stage of the gearbox 600 can comprise a gear ratio of 6.

In some embodiments, an engine comprising the gearbox 600 can be configured such that the higher-speed shaft 608 provides about 50% of the power to the gearbox 600 and the lower-speed shaft 618 provides about 50% of the power to the gearbox 600. In other embodiments, an engine comprising the gearbox 600 can be configured such that the higher-speed shaft 608 provides about 60% of the power to the gearbox 600 and the lower-speed shaft 618 provides about 40% of the power to the gearbox 600.

In some embodiments, a radius $R_4$ of the gearbox 600 can be about 18-22 inches. In other embodiments, the radius $R_4$ of the gearbox 600 can be smaller than 18 inches or larger than 22 inches.

Figure 18:
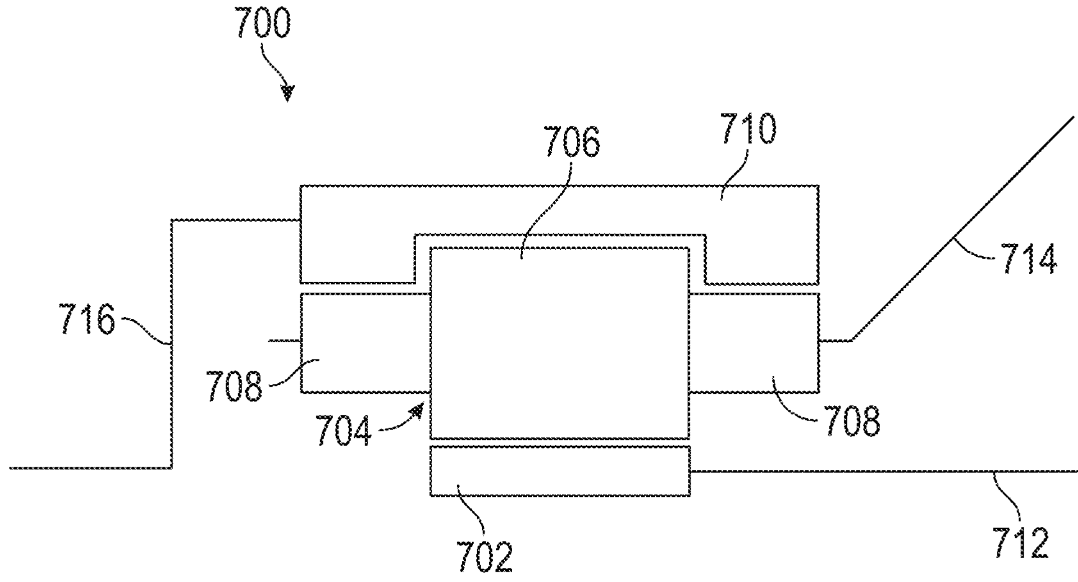
FIG. 18 is a cross-sectional schematic illustration of an exemplary embodiment of a gearbox configuration for an unducted fan propulsor.

FIG. 18 depicts a gearbox 700 that can be used, for example, with the engines disclosed herein (e.g., the engines 100, 200). The gearbox 700 is configured as a compound star gearbox. The gearbox 700 comprises a sun gear 702 and a star carrier 704, which includes a plurality of compound star gears having one or more first portions 706 and one or more second portions 708. The gearbox 700 further comprises a ring gear 710. The sun gear 702 can also mesh with the first portions 706 of the star gears. The star carrier can be fixed from rotation via a support member 714. The second portions 708 of the star gears can mesh with the ring gear 710. The sun gear 702 can be coupled to a low-pressure turbine via the turbine shaft 712. The ring gear 710 can be coupled to a fan shaft 716.

Each of the embodiments of unducted fan propulsors disclosed herein utilize a gearbox. Adoption of a geared, open rotor engine presents unique challenges. One such challenge is finding the appropriate balance between engine performance, engine efficiency, propulsor sizing, and/or acoustics (e.g., noise). For example, if the propulsor is larger than a certain diameter, engine performance may be satisfactory, but the engine will not fit on the airframe. If the fan is smaller, engine performance may be less than desirable. If other criteria are met, the engine may still be too noisy to comply with regulations and/or would create a poor experience for individuals flying on the aircraft.

Starting from this basis, the various demands for an unducted propulsor were calculated. During the process of developing the aforementioned embodiments of turbomachinery incorporating an unducted propulsor and a gearbox, a good approximation for an overall geared, unducted fan propulsor design can be made using only a relatively few engine parameters. This development is based on, among other things, the recognition of a relationship between the propulsor, the LPT, and the gearbox. From this initial recognition and other developments that were the by-product of studying a plurality of engine configurations (including the configurations disclosed herein), it was discovered that a good approximation for overall engine performance, efficiency, sizing, and acoustics could be made based on a relationship among the fan diameter, the number of LPT stages, and the gear ratio of the gearbox. This relationship is referred to as "an engine correlation parameter" (ECP).

ECP is quite beneficial. For example, the ECP can provide an engine that has adequate performance, efficiency, size, and acoustics. Therefore, the ECP can improve the process of developing an unducted engine, which can ultimately result in improved turbomachinery. For example, by defining the engine architecture using the ECP, a better appreciation may be gained for the affected systems or subsystems, reliability or feasibility, and/or range of possible architectures because the ECP imposes practical limits on designs under consideration.

The ECP is defined by the following relationship: D/N/GR, where D is the blade tip diameter measured in feet, where N is the stage count of the low-pressure turbine, and where GR is the gear ratio of the gearbox. The ECP can be used, for example, to configure an engine with greater efficiency and lower noise than typical engines. In some instances, the engines disclosed herein comprising the ECP are lighter, have greater propulsive efficiency, have greater engine efficiency, and/or are quieter than typical engines. The ECP thus provides improved turbomachinery engines and/or can help simplify one or more complexities of geared, open rotor engine development.

The technologies described herein are directed to complementary aspects of unducted fan propulsion systems. One aspect of the disclosure addresses the placement and integration of unducted fan propulsors on an aircraft relative to the wing or stabilizer, with particular attention to positioning the propulsor at defined regions relative to the effective quarter-chord point of the supporting airfoil to offset interference and scrubbing drag, improve thrust efficiency, and reduce noise penalties. Another aspect of the disclosure addresses the internal engine configuration of geared, open rotor turbomachinery engines, and in particular, establishes an engine correlation parameter (ECP) that relates propulsor blade diameter, low pressure turbine stage count, and gearbox ratio to yield improved performance, efficiency, and acoustic characteristics.

Combining these two technologies provides synergistic benefits that go beyond the improvements achieved individually. The optimized gearbox and turbine configuration, characterized by the ECP, identifies desirable engine characteristics for large-diameter unducted propulsors to achieve efficient rotational speeds and desired acoustic performance. At the same time, the defined mounting criteria for unducted fan placement relative to the aircraft's lifting surfaces ensures that such large-diameter, geared propulsors are installed in positions that harness favorable pressure regions to augment thrust without increasing engine power requirements. The integration of these teachings results in an aircraft propulsion system that simultaneously addresses both the internal engine efficiency and the external aerodynamic installation effects, thereby improving overall fuel efficiency, thrust-to-power ratio, and noise abatement.

The combination is particularly advantageous because known approaches treat internal engine architecture (gear ratios, turbine stage counts, propulsor sizing) and external installation (mounting locations relative to aerodynamic surfaces) as separate design problems. The inventors discovered that by correlating engine design parameters through the ECP with specific propulsor mounting envelopes defined relative to the airfoil quarter-chord point, a balance is achieved between engine operability, propulsor aerodynamics, and airframe integration. This enables larger propulsor diameters and higher bypass characteristics than would otherwise be practical, while maintaining compliance with structural, drag, and acoustic constraints.

Additional examples and information regarding ECP are provided below.

[[Further Disclosure from 602322]]

Specifically, an ECP, equal to the propulsor blade tip diameter (in feet) divided by the gear ratio divided by the low pressure turbine stage count, between about 0.17 feet and about 0.83 feet for a single unducted rotor engine (e.g., the engines 100, 200) provides improved results during operation. More specifically, in at least certain examples, a single unducted rotor engine having an ECP between about 0.17 feet and about 0.63 feet may provide for desired results during operation. For simplity, a ECP value my be expressed as unitless value (i.e., omitting "feet"). For example, an ECP of 0.19 feet may simply be expressed as 0.19.

For instance, in one example, a geared, single unducted rotor engine can comprise a propulsor blade diameter of 18 feet, a gear ratio of 10:1, and an LPT stage count equal to 3. In such an example, the ECP is equal to 0.6.

As another example, a geared, single unducted rotor engine can comprise a propulsor blade diameter of 14 feet, may have a gear ratio of 7:1, and an LPT stage count equal to 5. In this example, the ECP is equal to 0.4.

FIGS. 19-25 depict tables with additional exemplary engines and their associated ECPs. The engines disclosed in the tables of FIGS. 19-25 (are elsewhere in this disclosure) are merely examples are not intended to limit the scope of the disclosure.

FIG. 19 depicts various engines (i.e., engines 1-10) each comprising a fan diameter of 10 feet. The LPT stages of each engine 1-10 is within a range of 3-8. The gear ratio of each engine 1-10 is within a range of 4-12. The ECP for each engine 1-10 is within a range of 0.17 and 0.83.

FIG. 20 depicts various engines (i.e., engines 11-20) each comprising a fan diameter of 11 feet. The LPT stages of each engine 11-20 is within a range of 3-8. The gear ratio of each engine 11-20 is within a range of 4-12. The ECP for each engine 11-20 is within a range of 0.17 and 0.83.

FIG. 21 depicts various engines (i.e., engines 21-30) comprising fan diameters of 12 feet. The LPT stages of engines 21-30 are within a range of 3-7. The gear ratios of engines 21-30 are within a range of 4-11. The ECPs for engines 21-30 are within a range of 0.17 and 0.83.

FIG. 22 depicts various engines (i.e., engines 31-40) each comprising a fan diameter of 13 feet. The LPT stages of each engine 31-40 is within a range of 3-8. The gear ratio of each engine 31-40 is within a range of 4-11. The ECP for each engine 31-40 is within a range of 0.17 and 0.83.

FIG. 23 depicts various engines (i.e., engines 41-50) comprising fan diameters of 14 feet. The LPT stages of engines 41-50 are within a range of 3-7. The gear ratios of engines 41-50 are within a range of 5-12. The ECPs for engines 41-50 are within a range of 0.17 and 0.83.

FIG. 24 depicts various engines (i.e., engines 51-60) each comprising a fan diameter of 15 feet. The LPT stages of each engine 51-60 is within a range of 3-8. The gear ratio of each engine 51-60 is within a range of 4-12. The ECP for each engine 51-60 is within a range of 0.17 and 0.83.

FIG. 25 depicts various engines (i.e., engines 61-70) comprising fan diameters of 16 feet. The LPT stages of engines 61-70 are within a range of 3-8. The gear ratios of engines 61-70 are within a range of 4-12. The ECPs for engines 61-70 are within a range of 0.17 and 0.83.

It should be noted that, although the exemplary engines 1-70 comprise fan diameters that are whole numbers (e.g., 10 ft, 11 ft, 12 ft, 14 ft, etc.), an engine can comprise a fan diameter that is not a whole number. For example, a fan can comprise a diameter of 11.5 ft, 12.75 ft, 13.2 ft, 14.1 ft, 15.56 ft, or 16.3 ft.

Figure 26:
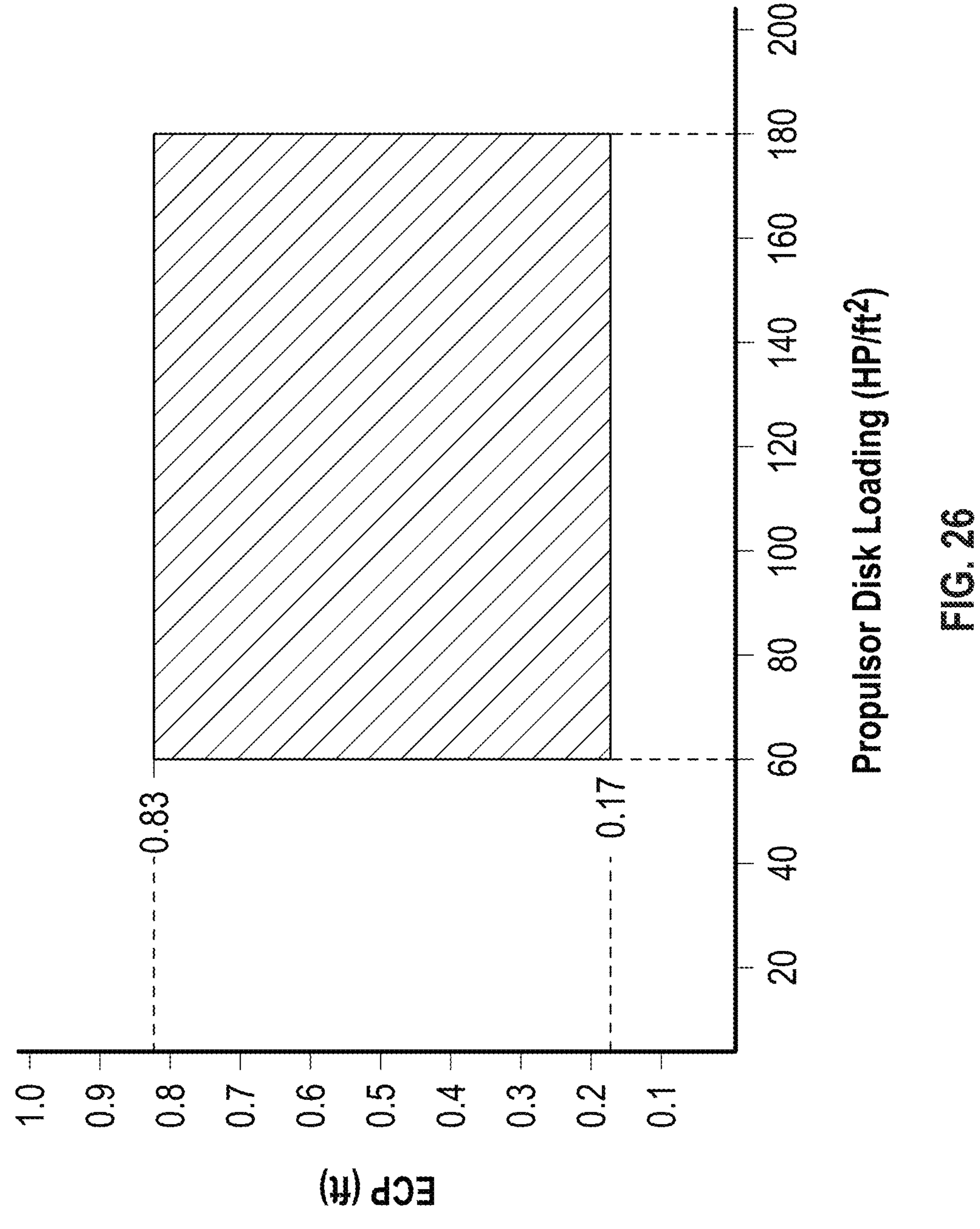
FIG. 26 is a graph depicting an exemplary range of engine correlation parameter relative to an exemplary range of propulsor disk loading for an unducted fan propulsor.
Figure 27:
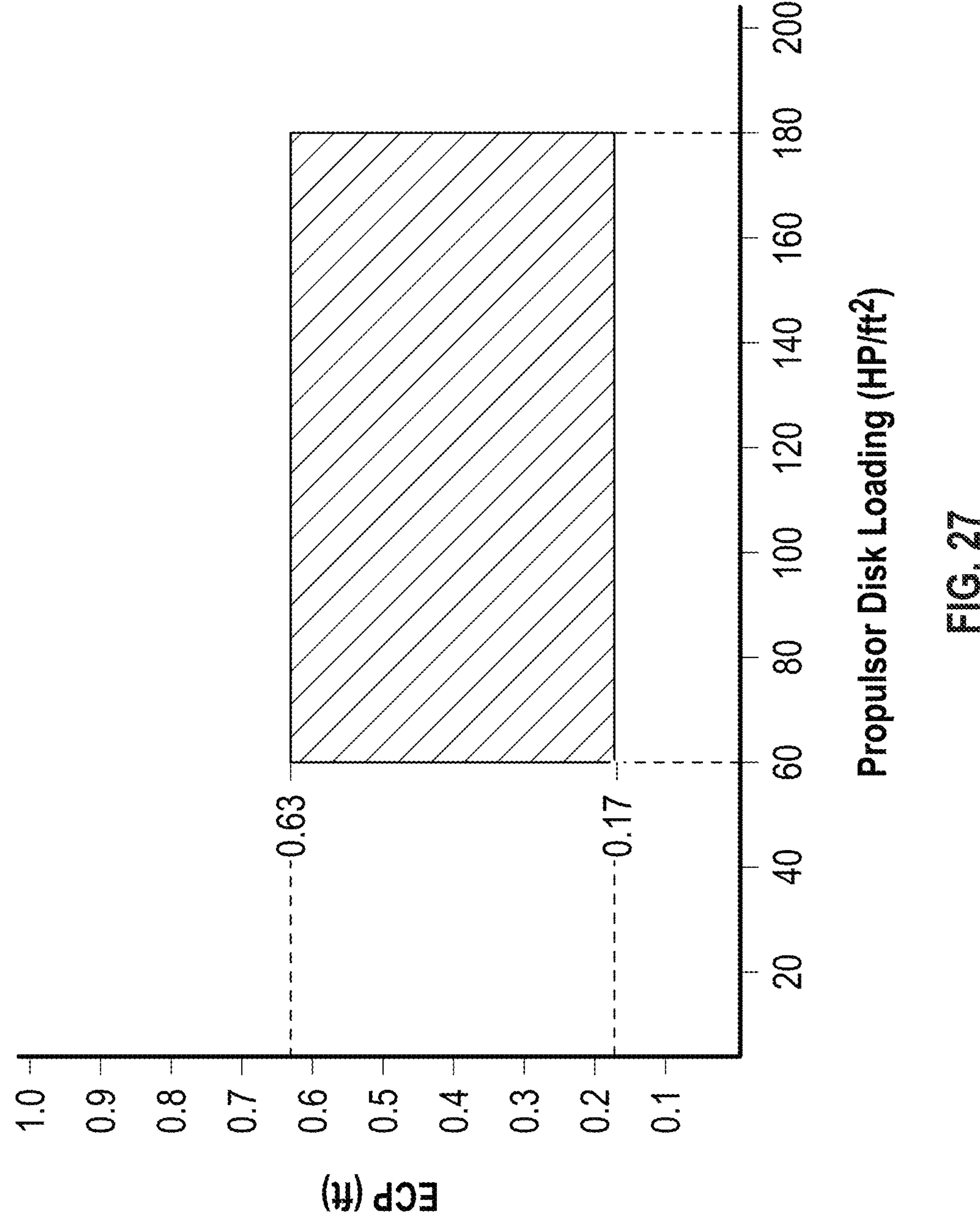
FIG. 27 is a graph depicting an exemplary range of engine correlation parameter relative to an exemplary range of propulsor disk loading for an unducted fan propulsor.

There is also a relationship between ECP and the disk loading of the propulsor. Disk loading is the power at a takeoff flight condition measured in horsepower (HP) divided by the swept area of the propulsor measured in square feet ($ft^2$). For example, it is advantageous for an engine to comprise an ECP of 0.17-0.83 and a propulsor disk loading between 60-180 HP/$ft^2$ at a takeoff flight condition, as depicted in FIG. 26. More particularly, it is particularly advantageous for an engine to comprise an ECP of 0.17-0.63 and a propulsor disk loading between 60-180 HP/$ft^2$ at a takeoff flight condition, as depicted in FIG. 27. An engine with an ECP within a range of 0.17-0.83 ft (or 0.17-0.63 ft) and a propulsor disk loading of 60-180 HP/$ft^2$ at a takeoff flight condition can, for example, advantageously provide improved engine performance and efficiency compared to typical engines, while also satisfying the acoustics requirements.

In some examples, a propulsor assembly of an engine has a disk loading of 60-180 HP/ft$^2$ and a net efficiency within a range of about 0.57-0.75 at a takeoff flight condition, where net efficiency is defined as net thrust times flight speed divided by input power to the propulsor assembly. In certain instances, the net efficiency of the propulsor assembly is within a range of about 0.62-0.75 and the disk loading of the propulsor assembly is within a range of 60-100 HP/ft$^2$ at a takeoff flight condition. In particular examples, the net efficiency of the propulsor assembly is within a range of about 0.57-0.67 and the disk loading of the propulsor assembly is within a range of 160-180 HP/ft$^2$ at a takeoff flight condition. In particular examples, the net efficiency of the propulsor assembly is within a range of about 0.58-0.72 and the disk loading of the propulsor assembly is within a range of 100-160 HP/ft$^2$ at a takeoff flight condition. Net efficiency varies with disk loading, such that the lower limit may be assumed to vary linearly from 0.65 to 0.57 for the disk loading of 60 to 180 HP/ft$^2$ and the upper limit may be assumed to vary linearly from 0.75 to 0.67 for the disk loading 60 to 180 HP/ft$^2$. Referring to TABLE 1, below, the net efficiencies vs. disk loading are shown:

TABLE 1

| Disk Loading (HP/ft$^2$) | 60 | 80 | 100 | 120 | 140 | 160 | 180 |
|---|---|---|---|---|---|---|---|
| Net Efficiency (lower limit) | 0.65 | 0.64 | 0.62 | 0.61 | 0.59 | 0.58 | 0.57 |
| Net Efficiency (upper limit) | 0.75 | 0.74 | 0.72 | 0.71 | 0.70 | 0.68 | 0.67 |

As indicated earlier, turbomachinery engines, such as the engines 100, 200, comprise many variables and factors that affect their performance and/or operation. The interplay between the various components can make it particularly difficult to develop or select one component, especially when each of the components is at a different stage of completion. For example, one or more components may be nearly complete, yet one or more other components may be in an initial or preliminary phase where only one (or a few) parameters is known. Also, each component is subject to change often more than once over the development period, which can often last for many years (e.g., 5-15 years). These complex and intricate individual and collective development processes can be cumbersome and inefficient. For at least these reasons, there is a need for devices and methods that can provide a good estimate of, not only the basic configuration or sizing needed to achieve the desired performance benefits, but also to reflect the penalties or accommodations in other areas in order to realize the desired benefits.

According to another aspect of the disclosure, the ECP can additionally provide a particularly useful indication of the efficiency and effectiveness of the engine during initial development, e.g., as a tool to accept or reject a particular configuration. Thus, the ECP can be used, for example, to guide engine development. For example, the ECP can be used to quickly and accurately determine the suitability of a particular engine without requiring individuals or teams to complete the tedious and time-consuming process of fully developing the engine. Therefore, the ECP can improve the process of developing a turbomachinery engine.

Further aspects of the disclosure are provided by the subject matter of the following clauses:

Clause 1: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

The aircraft of any clause herein, the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The aircraft of any clause herein, the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The aircraft of any clause herein, the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

The aircraft of any clause herein, the unducted fan propulsor is undermounted to the airfoil, such as a wing, with one or more intermediate structures.

The aircraft of any clause herein, the unducted fan propulsor has a cruise flight Mach $M_0$ of between 0.70 and 0.85, between 0.5 and 0.9, between 0.7 and 0.9, or between 0.75 and 0.9.

The aircraft of any clause herein, the rotating blades diameter is between 8 to 16 feet or between 12 to 16 feet. In any of the preceding clauses, the aircraft having a wing defining the airfoil and one or two unducted fan propulsors are mounted to the wing.

The aircraft of any clause herein, wherein the aircraft are aircraft types A, B, C or G as defined in Tables 1 and 2.

Clause 2: An aircraft is provided including a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein 0.065<RL/D<1.98 and θ is between 187° and 340°, and wherein RL/D and θ of the P of the unducted fan propulsor adhere to the following expressions:

$$\frac{RL}{D}+\frac{\left(\sqrt{1.4161*[1.88978*\sin^2(\theta)-0.0875*\cos^2(\theta)+0.477*\sin(\theta)*\cos(\theta)]}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*[1.88978*\sin^2(\theta)-0.0875*\cos^2(\theta)+0.477*\sin(\theta)*\cos(\theta)]}+1.764*\sin(\theta)+0.19146*\cos(\theta)\right)}{1.96*\sin^2(\theta)+0.7225*\cos^2(\theta)}<0.$$

The aircraft of any clause herein, 0.254<RL/D<1.86 and θ is between 199° and 306°, and the P of the unducted fan propulsor is defined by the following expressions:

$$\frac{RL}{D}+\frac{\left(\sqrt{0.52621*[0.7205*\sin^2(\theta)-0.352*\cos^2(\theta)+0.7448*\sin(\theta)*\cos(\theta)]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*[0.7205*\sin^2(\theta)-0.352*\cos^2(\theta)+0.7448*\sin(\theta)*\cos(\theta)]}+0.8476*\sin(\theta)+0.23119*\cos(\theta)\right)}{0.8649*\sin^2(\theta)+0.6084*\cos^2(\theta)}<0.$$

The aircraft of any clause herein, 0.369<RL/D<1.43 and θ is between 204° and 291°, and the P of the unducted fan propulsor is defined by the following expressions:

$$\frac{RL}{D}+\frac{\left(\sqrt{0.52621*[0.7205*\sin^2(\theta)-0.352*\cos^2(\theta)+0.7448*\sin(\theta)*\cos(\theta)]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*[0.7205*\sin^2(\theta)-0.352*\cos^2(\theta)+0.7448*\sin(\theta)*\cos(\theta)]}+0.8476*\sin(\theta)+0.23119*\cos(\theta)\right)}{0.8649*\sin^2(\theta)+0.6084*\cos^2(\theta)}<0.$$

The aircraft of any clause herein: 0.477<RL/D<0.9455 and θ is between 211° and 274°, and the P of the unducted fan propulsor is defined by the following expressions:

$$\frac{RL}{D}+\frac{\left(\sqrt{0.01069156*[0.036*\sin^2(\theta)-0.3485*\cos^2(\theta)+0.5418*\sin(\theta)*\cos(\theta)]}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{0.01069156*[0.036*\sin^2(\theta)-0.3485*\cos^2(\theta)+0.5418*\sin(\theta)*\cos(\theta)]}+0.139167*\sin(\theta)+0.020812*\cos(\theta)\right)}{0.2209*\sin^2(\theta)+0.0484*\cos^2(\theta)}<0.$$

The aircraft of any clause herein, the unducted fan propulsor is undermounted to the airfoil, such as a wing, with one or more intermediate structures.

The aircraft of any clause herein, the unducted fan propulsor has a cruise flight Mach $M_0$ of between 0.70 and 0.85, between 0.5 and 0.9, between 0.7 and 0.9, or between 0.75 and 0.9.

Clause 3: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein RL/D≤2 and θ is between 187° and 342°.

The aircraft of any clause herein, 0.15≤RL/D.

The aircraft of any clause herein, 0.35≤RL/D, and preferably RL/D is about 0.72.

The aircraft of any clause herein, wherein 0 is between 198° and 310°, and preferably between 205° and 285°.

The aircraft of any clause herein, the unducted fan propulsor operates at a cruise flight Mach $M_0$ of between 0.5 and 0.9, preferably between 0.7 and 0.9, and more preferably between 0.75 and 0.9.

The aircraft of any clause herein, the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The aircraft of any clause herein, the unducted fan propulsor is undermounted to the airfoil with one or more intermediate structures.

The aircraft of any clause herein, the P of the unducted fan propulsor is variable to accommodate different operating conditions.

The aircraft of any clause herein, the aircraft includes a plurality of the unducted fan propulsors.

The aircraft of any clause herein, the plurality of the unducted fan propulsors may be each mounted to the same airfoil, such as a wing or horizontal stabilizer; or the plurality of the unducted fan propulsors may be each mounted to different airfoils, such as a wing or horizontal stabilizer; or combinations thereof.

The aircraft of any clause herein, wherein the unducted propulsor has two arrays of blades and only one of the array of blades is rotating.

Clause 4: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of counterclockwise rotating blades arranged in a forward array and a plurality clockwise rotating blades arranged in a rearward array, wherein one of the forward and rearward array of blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 5: An aircraft is provided that includes a fuselage; an airfoil extending from the fuselage, the airfoil having an airfoil section and the airfoil section having an effective quarter chord point (QC), and a plurality of rotating blades defining a maximum outer diameter (D); a point (P) located at an intersection of the CL and a line perpendicular to the CL that passes through a midpoint between leading and trailing edges nearest the root of one of the plurality of blades, and an ellipse origin positioning line (EOR) having a length (EORL) extending from the QC to an ellipse origin (OR) and at an angle θ measured positive in a counter-clockwise direction when the high pressure side of the airfoil section is below the airfoil section, and measured positive in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 6: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein 0.065<RL/D<1.98 and θ is between 187° and 340°; and wherein RL/D and θ of the P of the unducted fan propulsor adhere to the following expressions:

$$\frac{RL}{D} + \frac{\left(\sqrt{\begin{array}{c}1.4161*\left[1.88978*\sin^2(\theta) - \right.\\ \left.0.0875*\cos^2(\theta) + 0.477*\sin(\theta)*\cos(\theta)\right]\end{array}} + 1.764*\sin(\theta) + 0.19146*\cos(\theta)\right)}{1.96*\sin^2(\theta) + 0.7225*\cos^2(\theta)} > 0$$

and $$\frac{RL}{D} + \frac{\left(-\sqrt{\begin{array}{c}1.4161*\left[1.88978*\sin^2(\theta) - \right.\\ \left.0.0875*\cos^2(\theta) + 0.477*\sin(\theta)*\cos(\theta)\right]\end{array}} + 1.764*\sin(\theta) + 0.19146*\cos(\theta)\right)}{1.96*\sin^2(\theta) + 0.7225*\cos^2(\theta)} < 0.$$

The aircraft of any clause herein, wherein:

0.254<RL/D<1.86 and θ is between 199° and 306°, and the P of the unducted fan propulsor is defined by the following expressions:

$$\frac{RL}{D}+\frac{\left(\sqrt{\begin{array}{c}0.52621*[0.7205*\sin^2(\theta)-\\0.352*\cos^2(\theta)+0.7448*\sin(\theta)*\cos(\theta)]\end{array}}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{\begin{array}{c}0.52621*[0.7205*\sin^2(\theta)-\\0.352*\cos^2(\theta)+0.7448*\sin(\theta)*\cos(\theta)]\end{array}}+0.8476*\sin(\theta)+0.23119*\cos(\theta)\right)}{0.8649*\sin^2(\theta)+0.6084*\cos^2(\theta)}<0.$$

The aircraft of any clause herein, wherein:

0.369<RL/D<1.43 and θ is between 204° and 291°, and the P of the unducted fan propulsor is defined by the following expressions:

$$\frac{RL}{D}+\frac{\left(\sqrt{\begin{array}{c}0.09923*[0.2964*\sin^2(\theta)-\\0.36*\cos^2(\theta)+0.66*\sin(\theta)*\cos(\theta)]\end{array}}+0.3675*\sin(\theta)+0.0891*\cos(\theta)\right)}{0.49*\sin^2(\theta)+0.2025*\cos^2(\theta)}>0$$

and $$\frac{RL}{D}+\frac{\left(-\sqrt{\begin{array}{c}0.09923*[0.2964*\sin^2(\theta)-\\0.36*\cos^2(\theta)+0.66*\sin(\theta)*\cos(\theta)]\end{array}}+0.3675*\sin(\theta)+0.0891*\cos(\theta)\right)}{0.49*\sin^2(\theta)+0.2025*\cos^2(\theta)}<0.$$

The aircraft of any clause herein, wherein:

0.477<RL/D<0.9455 and θ is between 211° and 274°, and the P of the unducted fan propulsor is defined by the following expressions:

$$\frac{RL}{D}+\frac{\left(\sqrt{\begin{array}{c}0.01069156*[0.036*\sin^2(\theta)-\\0.3485*\cos^2(\theta)+0.5418*\sin(\theta)*\cos(\theta)]\end{array}}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{\begin{array}{c}0.01069156*[0.036*\sin^2(\theta)-\\0.3485*\cos^2(\theta)+0.5418*\sin(\theta)*\cos(\theta)]\end{array}}+0.139167*\sin(\theta)+0.020812*\cos(\theta)\right)}{0.2209*\sin^2(\theta)+0.0484*\cos^2(\theta)}<0.$$

The aircraft of any clause herein, wherein the unducted fan propulsor is undermounted to the airfoil with one or more intermediate structures.

The aircraft of any clause herein, wherein the P of the unducted fan propulsor is variable to accommodate different operating conditions.

Clause 7: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein RL/D≤2 and θ is between 187° and 342°.

The aircraft of any clause herein, wherein 0.15≤RL/D.

The aircraft of any clause herein, wherein 0.35≤RL/D, and preferably RL/D is about 0.72.

The aircraft of any clause herein, wherein 0 is between 198° and 310°, and preferably between 205° and 285°.

The aircraft of any clause herein, wherein the unducted fan propulsor operates at a cruise flight Mach $M_0$ of between 0.5 and 0.9, preferably between 0.7 and 0.9, and more preferably between 0.75 and 0.9.

The aircraft of any clause herein, wherein the unducted fan propulsor has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The aircraft of any clause herein, wherein the unducted fan propulsor is undermounted to the airfoil with one or more intermediate structures.

The aircraft of any clause herein, wherein the P of the unducted fan propulsor is variable to accommodate different operating conditions.

Clause 8: A method of assembly, comprising: using an aircraft body comprising a fuselage and an airfoil extending from the fuselage, wherein the airfoil has an airfoil section defining an effective quarter chord point (QC); and attaching an unducted fan propulsor to the aircraft body relative to the airfoil section on a high pressure side thereof; the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a line HP perpendicular to the axial centerline CL that passes through the axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position; wherein 0.07≤RL/D≤2.0 and θ is between 187° and 342°.

The method of any clause herein, wherein 0.15≤RL/D.

The method of any clause herein, wherein 0.35≤RL/D, and preferably RL/D is about 0.72.

The method of any clause herein, wherein θ is between 198° and 310°, and preferably between 205° and 285°.

The method of any clause herein, wherein the unducted fan propulsor operates at a cruise flight Mach $M_0$ of between 0.5 and 0.9, preferably between 0.7 and 0.9, and more preferably between 0.75 and 0.9.

The method of any clause herein, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The method of any clause herein, wherein the unducted fan propulsor is undermounted to the airfoil with one or more intermediate structures.

The method of any clause herein, wherein the P of the unducted fan propulsor is variable to accommodate different operating conditions.

Clause 9: A method of assembly, comprising: using an aircraft body comprising a fuselage and an airfoil extending from the fuselage, the airfoil having an airfoil section with a leading edge (LE) and a trailing edge (TE), a chord extending between the LE and TE, and an effective quarter chord point (QC) along the chord measured from the LE, wherein the airfoil has an airfoil section defining an effective quarter chord point (QC); and attaching an unducted fan propulsor to the aircraft body relative to the airfoil section on a high pressure side thereof; the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

The method of any clause herein, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The method of any clause herein, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The method of any clause herein, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

Clause 10: An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°.

Clause 11: An aircraft comprising:

a fuselage;

a pair of horizontal stabilizers extending relative to the fuselage, two or more unducted fan propulsors, each of the unducted fan propulsors is mounted relative to one of the horizontal stabilizers on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a clockwise direction when the high pressure side of the airfoil section is above the airfoil section when viewed looking from an outboard position towards an inboard position of the wing; wherein 0.07≤RL/D≤2.0 and θ is between 187° and 342°.

The aircraft of any clause herein, the unducted fan propulsor is undermounted to the airfoil, such as a wing, with one or more intermediate structures.

The aircraft of any clause herein, the P of the unducted fan propulsor is variable to accommodate different operating conditions.

The aircraft of any clause herein, the drive mechanism may be a gas turbine engine and associated transmission to delivers torque from the drive mechanism to the propeller assembly.

The aircraft of any clause herein, the unducted fan propulsor is incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9.

The aircraft of any clause herein, the unducted fan propulsors is connected to the wing (or horizontal stabilizer) through a pylon.

The aircraft of any clause herein, the rotating blades diameter (D) may be between 8 to 16 feet or 12 to 16 feet.

The aircraft of any clause herein, each of the propulsors including a drive mechanism comprising a gas turbine engine assembly comprising in serial order a compressor, combustor, high pressure turbine and power turbine.

The aircraft of any clause herein, the propulsor having a pitch angle between −5 and +5 degrees, or −3 and 0 degrees.

The aircraft of any clause herein, the propulsor having an inward toe angle of between 0 and 5 degrees, or 1 and 3 degrees.

The aircraft of any clause herein, the rotating blades diameter is between 8 to 16 feet or between 12 to 16 feet.

The aircraft of any clause herein, the aircraft having a wing defining the airfoil and one or two unducted fan propulsors are mounted to the wing.

The aircraft of any clause herein, wherein the aircraft are aircraft types A, B, C or G as defined in Tables 1 and 2.

Clause 12: A turbomachinery engine comprising an unducted rotor assembly, a low-pressure turbine, a low-pressure shaft, a gearbox, and an engine correlation parameter. The unducted rotor assembly comprises a plurality of rotor blades arranged in a single row and defining a blade diameter. The low-pressure turbine comprises a stage count defined by a number of rows of rotating blades of the low-pressure turbine. The low-pressure shaft is coupled to the low-pressure turbine. The gearbox comprises an input, an output, and a gear ratio. The input of the gearbox is coupled to the low-pressure shaft, and the output of the gearbox is coupled to the unducted rotor assembly. The engine correlation parameter is greater than 0.17 and less than 0.83. The engine correlation parameter equals D/N/GR, where D is the blade tip diameter measured in feet, N is the stage count of the low-pressure turbine, and GR is the gear ratio of the gearbox.

The turbomachinery engine of any clause herein, wherein the engine correlation parameter is greater than 0.17 and less than 0.63.

The turbomachinery engine of any clause herein, wherein the gear ratio is within a range of 4:1 to 12:1.

The turbomachinery engine of any clause herein, wherein the stage count of the low-pressure turbine is between 3 and 8.

The turbomachinery engine of any clause herein, wherein the stage count of the low-pressure turbine is between 4 and 6.

The turbomachinery engine of any clause herein, wherein the unducted rotor assembly comprises 8-20 rotor blades.

The turbomachinery engine of any clause herein, wherein the unducted rotor assembly comprises 8-14 rotor blades.

The turbomachinery engine of any clause herein, further comprising a plurality of non-rotating outlet guide vanes disposed aft of the rotor blades of the unducted rotor assembly.

The turbomachinery engine of any clause herein, wherein the blade tip diameter is within a range of 10-16 feet.

The turbomachinery engine of any clause herein, wherein the blade tip diameter is within a range of 11-14 feet.

The turbomachinery engine of any clause herein, wherein the blade tip diameter is within a range of 12-13 feet.

The turbomachinery engine of any clause herein, wherein the unducted rotor assembly is configured to rotate at less than 1000 rpm and greater than 450 rpm at a cruise flight condition.

The turbomachinery engine of any clause herein, wherein the turbomachinery engine is configured to operate at a cruise flight condition greater than 0.6 Mach and less than 0.9 Mach.

The turbomachinery engine of any clause herein, further comprising a net thrust within a range of 10,000-100,000 pounds force at a max takeoff condition.

The turbomachinery engine of any clause herein, further comprising a net thrust within a range of 20,000-35,000 pounds force at a max takeoff condition.

The turbomachinery engine of any clause herein, wherein the unducted rotor assembly comprises a disk loading within a range of 60-180 HP/$ft^2$ at a takeoff flight condition.

The turbomachinery engine of any clause herein, wherein the fan comprises a solidity within a range of 0.5-1.0.

The turbomachinery engine of any clause herein, wherein the fan comprises a solidity within a range of 0.6-1.0.

The turbomachinery engine of any clause herein, wherein the fan comprises a solidity within a range of 1.1-1.5.

The turbomachinery engine of any clause herein, wherein the fan comprises a solidity within a range of 1.1-1.3.

Clause 13: A single unducted rotor turbomachinery engine includes a low-pressure turbine, a low-pressure spool, a gearbox, and an unducted rotor assembly. The low-pressure turbine defines a stage count. The low-pressure spool is coupled to the low-pressure turbine. The gearbox defines a gear ratio. The unducted rotor assembly includes a plurality of rotor blades defining a blade tip diameter, and the unducted rotor assembly is coupled to the low-pressure spool via the gearbox. The single unducted rotor turbomachinery engine defines an engine correlation parameter equal to the blade tip diameter measured in feet, divided by the stage count of the low-pressure turbine, divided by the gear ratio of the gearbox, and the engine correlation parameter is greater than 0.17 and less than 0.83.

The single unducted rotor turbomachinery engine of any clause herein, wherein the engine correlation parameter is greater than 0.17 and less than 0.63.

The single unducted rotor turbomachinery engine of any clause herein, wherein the gear ratio is between 4:1 and 12:1.

The single unducted rotor turbomachinery engine of any clause herein, wherein the stage count is between 3 and 8.

The single unducted rotor turbomachinery engine of any clause herein, wherein the stage count of the low-pressure turbine is between 4 and 6.

The single unducted rotor turbomachinery engine of any clause herein, wherein the unducted rotor assembly comprises 8-20 rotor blades.

The single unducted rotor turbomachinery engine of any clause herein, wherein the unducted rotor assembly comprises 8-14 rotor blades.

The single unducted rotor turbomachinery engine of any clause herein, further comprise a plurality of non-rotating outlet guide vanes disposed aft of the rotor blades of the unducted rotor assembly.

The single unducted rotor turbomachinery engine of any clause herein, wherein the blade tip diameter is within a range of 10-16 feet.

The single unducted rotor turbomachinery engine of any clause herein, wherein the blade tip diameter is within a range of 11-14 feet.

The single unducted rotor turbomachinery engine of any clause herein, wherein the blade tip diameter is within a range of 12-13 feet.

The single unducted rotor turbomachinery engine of any clause herein, wherein the unducted rotor assembly is configured to rotate at less than 1000 rpm and greater than 450 rpm at a cruise flight condition.

The single unducted rotor turbomachinery engine of any clause herein, wherein the single unducted rotor turbomachinery engine is configured to operate at a cruise flight condition greater than 0.7 Mach and less than 0.9 Mach.

The single unducted rotor turbomachinery engine of any clause herein, further comprising a net thrust within a range of 10,000-100,000 pounds force at a max takeoff condition.

The single unducted rotor turbomachinery engine of any clause herein, further comprising a net thrust within a range of 20,000-35,000 pounds force at a max takeoff condition.

The single unducted rotor turbomachinery engine of any clause herein, wherein the unducted rotor assembly comprises a disk loading within a range of 60-180 HP/ft$^2$ at a takeoff flight condition.

The single unducted rotor turbomachinery engine of any clause herein, wherein the fan comprises a solidity within a range of 0.5-1.0.

The single unducted rotor turbomachinery engine of any clause herein, wherein the fan comprises a solidity within a range of 0.6-1.0.

The single unducted rotor turbomachinery engine of any clause herein, wherein the fan comprises a solidity within a range of 1.1-1.5.

The single unducted rotor turbomachinery engine of any clause herein, wherein the fan comprises a solidity within a range of 1.1-1.3.

Clause 14: A turbomachinery engine includes an unducted propulsor assembly, a low-pressure compressor, a low-pressure turbine, a low-pressure shaft, a high-pressure compressor, a high-pressure turbine, a high-pressure shaft, a gearbox, and an engine correlation parameter. The unducted propulsor assembly includes a plurality of propulsor blades arranged in a single row and defining a blade diameter, and the blade tip diameter is within a range of 8-16 feet. The low-pressure compressor includes one or more LPC rotors which define a LPC stage count. The low-pressure turbine includes a plurality of LPT rotors which define a LPT stage count, and the LPT stage count is within a range of 3-8. The low-pressure shaft is coupled to the low-pressure compressor and the low-pressure turbine. The high-pressure compressor includes a plurality of HPC rotors which define a HPC stage count. The high-pressure turbine includes one or more HPT rotors which define a HPT stage count. The high-pressure shaft is coupled to the high-pressure compressor and the high-pressure turbine. The gearbox includes an input, an output, and a gear ratio. The input is coupled to the low-pressure shaft and is configured to rotate at a first rotational speed. The output is coupled to the unducted propulsor assembly and is configured to rotate at a second rotational speed, which is less than the first rotational speed. The gear ratio is defined by a ratio of the first rotational speed to the second rotational speed and is within a range of 4-12. The engine correlation parameter is within a range of 0.17-0.83, where the engine correlation parameter equals D/N/GR, D is the blade tip diameter of the propulsor blades measured in feet, N is the LPT stage count of the low-pressure turbine, and GR is the gear ratio of the gearbox.

The turbomachinery engine of any clause herein, wherein the engine correlation parameter is within a range of 0.17-0.63.

The turbomachinery engine of any clause herein, wherein the unducted propulsor assembly comprises 8-20 propulsor blades.

The turbomachinery engine of any clause herein, wherein the unducted propulsor assembly comprises 8-14 propulsor blades.

The turbomachinery engine of any clause herein, further comprise a plurality of stationary outlet guide vanes disposed aft of the propulsor blades.

The turbomachinery engine of any clause herein, wherein the blade tip diameter is within a range of 8-14 feet, 11-14 feet, or 10-16 feet.

The turbomachinery engine of any clause herein, wherein the blade tip diameter is within a range of 12-13 feet.

The turbomachinery engine of any clause herein, wherein the unducted propulsor assembly is configured to rotate within a range of 450-1000 rpm at a cruise flight condition.

The turbomachinery engine of any clause herein, wherein the turbomachinery engine is configured to operate at a cruise flight condition within a range of 0.6-0.9 Mach.

The turbomachinery engine of any clause herein, further comprising a net thrust within a range of 10,000-100,000 pounds force at a max takeoff condition.

The turbomachinery engine of any clause herein, further comprising a net thrust within a range of 20,000-35,000 pounds force at a max takeoff condition.

The turbomachinery engine of any clause herein, wherein the propulsor assembly comprises a disk loading within a range of 60-180 HP/ft$^2$ at a takeoff flight condition.

The turbomachinery engine of any clause herein, wherein the gearbox is an epicyclic gearbox comprising a sun gear, a plurality of planet gears, and a ring gear, wherein the sun gear is the input, and wherein the ring gear is the output.

The turbomachinery engine of any clause herein, wherein the gearbox is an epicyclic gearbox comprising a sun gear, a plurality of planet gears, and a ring gear, wherein the sun gear is the input, wherein the planet gears are coupled to a planet carrier, and wherein the planet carrier is the output.

The turbomachinery engine of any clause herein, wherein the gearbox is a multi-stage gearbox.

The turbomachinery engine of any clause herein, wherein the gearbox is a two-stage gearbox.

The turbomachinery engine of any clause herein, wherein the gearbox is a compound gearbox.

The turbomachinery engine of any clause herein, wherein the LPC stage count is within a range of 1-3.

The turbomachinery engine of any clause herein, wherein the HPC stage count is within a range of 10-11.

The turbomachinery engine of any clause herein, wherein the HPT stage count is two.

The turbomachinery engine of any clause herein, wherein the LPT stage count is four.

The turbomachinery engine of any clause herein, wherein the low-pressure turbine is a counter-rotating low-pressure turbine, wherein the LPT rotors include a plurality of inner rotors and a plurality of outer rotors arranged in an alternating configuration.

The turbomachinery engine of any clause herein, wherein the fan comprises a solidity within a range of 0.5-1.0.

The turbomachinery engine of any clause herein, wherein the fan comprises a solidity within a range of 0.6-1.0.

The turbomachinery engine of any clause herein, wherein the fan comprises a solidity within a range of 1.1-1.5.

The turbomachinery engine of any clause herein, wherein the fan comprises a solidity within a range of 1.1-1.3.

The turbomachinery engine of any clause herein, wherein the turbomachinery engine comprises a third stream.

The turbomachinery engine of any clause herein, wherein the propulsor assembly has a disk loading of 60-180 HP/ft$^2$ and a net efficiency within a range of 0.57-0.75 at a takeoff flight condition.

The turbomachinery engine of any clause herein, wherein a net efficiency of the propulsor assembly is within a range of 0.64-0.75 and a disk loading of the propulsor assembly is within a range of 60-80 HP/ft$^2$ at a takeoff flight condition.

The turbomachinery engine of any clause herein, wherein a net efficiency of the propulsor assembly is within a range of 0.57-0.68 and a disk loading of the propulsor assembly is within a range of 160-180 HP/ft$^2$ at a takeoff flight condition.

The turbomachinery engine of any clause herein, wherein a net efficiency of the propulsor assembly is within a range of 0.58-0.72 and the disk loading of the propulsor assembly is within a range of 100-160 HP/ft$^2$ at a takeoff flight condition.

Clause 15: An aircraft comprising: a fuselage; a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), wherein each of the unducted fan propulsors further comprises an engine correlation parameter that is greater than 0.17 and less than 0.83, wherein the engine correlation parameter equals D/N/GR, wherein D is the maximum outer diameter of the rotating blades, wherein N is a stage count of a low-pressure turbine of the unducted fan propulsor, and wherein GR is a gear ratio of a gearbox of the unducted fan propulsor operably coupling the low pressure turbine and the rotating blades; a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; an airfoil section having an effective quarter chord point QC; and a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°.

The aircraft of any clause herein, wherein 0.15≤RL/D.

The aircraft of any clause herein, wherein 0.35≤RL/D, and preferably RL/D is about 0.72.

The aircraft of any clause herein, wherein 0 is between 198° and 310°, and preferably between 205° and 285°.

The aircraft of any clause herein, wherein the two or more unducted fan propulsors are configured to operate at a cruise flight Mach $M_0$ of between 0.7 and 0.9, and more preferably between 0.75 and 0.9; or the two or more unducted fan propulsors are configured to propel the aircraft at a cruise flight Mach $M_0$ of between 0.7 and 0.9, and more preferably between 0.75 and 0.85.

The aircraft of any clause herein, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The aircraft of any clause herein, wherein the unducted fan propulsor is undermounted to the airfoil with one or more intermediate structures.

The aircraft of any clause herein, wherein the P of the unducted fan propulsor is variable to accommodate different operating conditions.

Clause 16: An aircraft, comprising: a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), wherein each of the unducted fan propulsors further comprises an engine correlation parameter that is greater than 0.17 and less than 0.83, wherein the engine correlation parameter equals D/N/GR, wherein D is the maximum outer diameter of the rotating blades, wherein N is a stage count of a low-pressure turbine of the unducted fan propulsor, and wherein GR is a gear ratio of a gearbox of the unducted fan propulsor operably coupling the low pressure turbine and the rotating blades; a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

The aircraft of any clause herein, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The aircraft of any clause herein, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The aircraft of any clause herein, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

Clause 17: An aircraft, comprising: a fuselage; an airfoil extending from the fuselage, the airfoil having an airfoil section defining an effective quarter-chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D), wherein each of the unducted fan propulsors further comprises an engine correlation parameter that is greater than 0.17 and less than 0.83, wherein the engine correlation parameter equals D/N/GR, wherein D is the maximum outer diameter of the rotating blades, wherein N is a stage count of a low-pressure turbine of the unducted fan propulsor, and wherein GR is a gear ratio of a gearbox of the unducted fan propulsor operably coupling the low pressure turbine and the rotating blades; a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°; and wherein RL/D and θ of the P of the unducted fan propulsor adhere to the following expressions:

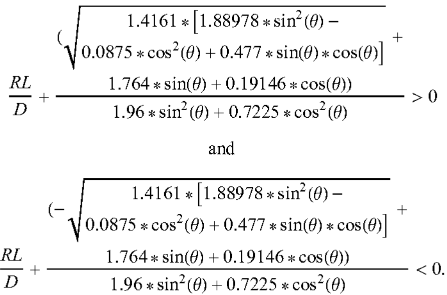

$$\frac{RL}{D}+\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0.$$

The invention claimed is:

1. An aircraft comprising:

a fuselage;

a pair of wings extending from the fuselage;

two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), wherein each of the unducted fan propulsors further comprises an engine correlation parameter that is greater than 0.17 and less than 0.83, wherein the engine correlation parameter equals D/N/GR, wherein D is the maximum outer diameter of the rotating blades, wherein N is a stage count of a low-pressure turbine of the unducted fan propulsor, and wherein GR is a gear ratio of a gearbox of the unducted fan propulsor operably coupling the low pressure turbine and the rotating blades;

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an airfoil section having an effective quarter chord point QC; and a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°.

2. The aircraft of claim 1, wherein 0.15≤RL/D.

3. The aircraft of claim 1, wherein 0.35≤RL/D, and preferably RL/D is about 0.72.

4. The aircraft of claim 1, wherein θ is between 198° and 310°, and preferably between 205° and 285°.

5. The aircraft of claim 1, wherein the two or more unducted fan propulsors are configured to operate at a cruise flight Mach $M_0$ of between 0.7 and 0.9, and more preferably between 0.75 and 0.9; or the two or more unducted fan propulsors are configured to propel the aircraft at a cruise flight Mach $M_0$ of between 0.7 and 0.9, and more preferably between 0.75 and 0.85.

6. The aircraft of claim 1, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

7. The aircraft of claim 1, wherein the unducted fan propulsor is undermounted to the airfoil with one or more intermediate structures.

8. The aircraft of claim 1, wherein the P of the unducted fan propulsor is variable to accommodate different operating conditions.

9. An aircraft, comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), wherein each of the unducted fan propulsors further comprises an engine correlation parameter that is greater than 0.17 and less than 0.83, wherein the engine correlation parameter equals D/N/GR, wherein D is the maximum outer diameter of the rotating blades, wherein N is a stage count of a low-pressure turbine of the unducted fan propulsor, and wherein GR is a gear ratio of a gearbox of the unducted fan propulsor operably coupling the low pressure turbine and the rotating blades;

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

10. The aircraft of claim 9, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

11. The aircraft of claim 9, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

12. The aircraft of claim 9, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

13. An aircraft, comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D), wherein each of the unducted fan propulsors further comprises an engine correlation parameter that is greater than 0.17 and less than 0.83, wherein the engine correlation parameter equals D/N/GR, wherein D is the maximum outer diameter of the rotating blades, wherein N is a stage count of a low-pressure turbine of the unducted fan propulsor, and wherein GR is a gear ratio of a gearbox of the unducted fan propulsor operably coupling the low pressure turbine and the rotating blades;

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein $0.065<RL/D<1.98$ and θ is between 187° and 340°; and wherein RL/D and θ of the P of the unducted fan propulsor adhere to the following expressions:

$$\frac{RL}{D} + \frac{\left(\sqrt{1.4161*\left[1.88978*\sin^2(\theta) - 0.0875*\cos^2(\theta) + 0.477*\sin(\theta)*\cos(\theta)\right]} + 1.764*\sin(\theta) + 0.19146*\cos(\theta)\right)}{1.96*\sin^2(\theta) + 0.7225*\cos^2(\theta)} > 0$$

and

-continued $$\frac{RL}{D}+\frac{\left(-\sqrt{\begin{array}{c}1.4161*[1.88978*\sin^2(\theta)-\\0.0875*\cos^2(\theta)+0.477*\sin(\theta)*\cos(\theta)]\end{array}}+1.764*\sin(\theta)+0.19146*\cos(\theta)\right)}{1.96*\sin^2(\theta)+0.7225*\cos^2(\theta)}<0.$$

* * * * *